United States Patent
Torii et al.

(10) Patent No.: US 7,191,027 B2
(45) Date of Patent: Mar. 13, 2007

(54) PRODUCTION CONTROL SYSTEM, PRODUCTION CONTROL METHOD AND PRODUCTION CONTROL PROGRAM

(75) Inventors: Kentaro Torii, Shinagawa-ku (JP); Katsumi Narimatsu, Yokohama (JP); Hisashi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/431,628

(22) Filed: May 11, 2006

(65) Prior Publication Data

US 2006/0206226 A1    Sep. 14, 2006

Related U.S. Application Data

(62) Division of application No. 10/628,343, filed on Jul. 29, 2003, now Pat. No. 7,092,776.

(30) Foreign Application Priority Data

| Jul. 30, 2002 | (JP) | ............................. 2002-221814 |
| Jul. 30, 2002 | (JP) | ............................. 2002-221949 |
| Jul. 30, 2002 | (JP) | ............................. 2002-221994 |

(51) Int. Cl.
*G06F 19/00* (2006.01)

(52) U.S. Cl. .......................................... 700/99; 705/29

(58) Field of Classification Search .......... 700/99–102, 700/106, 107; 705/8, 10, 29
See application file for complete search history.

(56) References Cited

U.S. PATENT DOCUMENTS 4,646,238 A * 2/1987 Carlson et al. ............... 700/95
5,237,495 A    8/1993 Morii .............................. 705/8
5,268,838 A   12/1993 Ito ................................ 700/99

(Continued)

FOREIGN PATENT DOCUMENTS

JP    2000-040099    2/2000

(Continued)

OTHER PUBLICATIONS

Yuanhui Zhang, et al. "A Macro-Level Scheduling Method Using Langrangian Relaxation", IEEE Transactions on Robotics and Automation, vol. 17, No. 1, Feb. 2001, pp. 70-79.

(Continued)

*Primary Examiner*—Leo Picard
*Assistant Examiner*—Chad Rapp
(74) *Attorney, Agent, or Firm*—Oblon, Spivak, McClelland, Maier & Neustadt, P.C.

(57) ABSTRACT

A production control system for producing products from parts, the production control system including a product data obtaining module configured to obtain product data including an effective surplus production quantity from a parent product production location, which is a location producing parent products using the products as direct parts; a part data obtaining module configured to obtain part data including a surplus production quantity from a part production location producing parts; an effective surplus production quantity calculation module configured to calculate an effective surplus production quantity of a production department which produces the products from the parts based on the effective surplus production quantity and the surplus production quantity; and a part data transmission module configured to transmit part data including an effective surplus production quantity of the production department to the part production location.

7 Claims, 43 Drawing Sheets

U.S. PATENT DOCUMENTS

| | | | |
|---|---|---|---|
| 5,893,076 A | 4/1999 | Hafner et al. | 705/28 |
| 5,983,194 A | 11/1999 | Hogge et al. | 705/7 |
| 6,088,626 A | 7/2000 | Lilly et al. | 700/100 |
| 7,092,776 B2* | 8/2006 | Torii et al. | 700/99 |
| 7,092,929 B1* | 8/2006 | Dvorak et al. | 705/28 |
| 2002/0133368 A1* | 9/2002 | Strutt et al. | 705/1 |
| 2003/0115090 A1 | 6/2003 | Mujtaba et al. | 705/8 |
| 2003/0204455 A1 | 10/2003 | Eck et al. | 705/29 |
| 2004/0093101 A1* | 5/2004 | Torii et al. | 700/95 |
| 2006/0129461 A1* | 6/2006 | Pankl et al | 705/26 |
| 2006/0206226 A1* | 9/2006 | Torii et al. | 700/99 |

FOREIGN PATENT DOCUMENTS

| | | |
|---|---|---|
| JP | 2001-312588 | 11/2001 |
| JP | 2002-049449 | 2/2002 |
| JP | 2002-099710 | 4/2002 |
| JP | 2002-117216 | 4/2002 |
| JP | 2002-123635 | 4/2002 |
| JP | 2002-140395 | 5/2002 |
| JP | 2002-140591 | 5/2002 |

OTHER PUBLICATIONS

Tatsuhiko Hayashi, "Improvement of factory by apparent improvement-reduction in leadtime by information sharing and business Improvement", Nikkel Digital Engineering, Nikkel BP, Jul. 15, 1998, pp. 78-82.

Taigen Sato, "Utilization of information tool for optimization of distribution", Keiso, Kogyo Gijutsu Sha, May 1, 2001, vol. 44, No. 6, pp. 76-80.

Shigeki Ohyama, "Group Information strategies for surviving consolidation age,", Nikkei Information Strategy, Nikkei BP, Jan. 24, 2000, vol. 9, No. 1, pp. 20-37.

Katsumi Shigematsu, "Innovative Algorithm of Scheduling-Lagranglan Decomposition and Coordination Method", Science of Management, Operations Research, Operations of Japan, Jun. 1, 2000, vol. 45, No. 6, pp. 282-286.

Mitsuru Kuroda, "Innovative Algorithm of Scheduling-Lagranglan Decomposition and Coordination Method", Science of Management, Operations Research, Operations Research of Japan, Jun. 1, 2000, vol. 45, No. 6, pp. 263-269.

* cited by examiner

FIG. 4

| PRODUCT ID | PROCESS ID | PROCESS ORDER | MINIMUM PERIOD | MAXIMUM PERIOD | PROCESS OFFSET | RESOURCE ID | RESOURCE USAGE |
|---|---|---|---|---|---|---|---|
| A | A001 | 1 | 0.5 | 20 | 0 | R01 | 1 |
| A | A002 | 2 | 0.5 | 20 | 1 | R02 | 2 |
| B | B001 | 1 | 0.5 | 20 | 0 | R01 | 1 |
| B | B002 | 2 | 0.5 | 20 | 1 | R02 | 1 |
| B | B003 | 3 | 0.5 | 20 | 2 | R01 | 0.5 |

FIG. 5

| RESOURCE ID | INSIDE / OUTSIDE CLASSIFICATION |
|---|---|
| R01 | INSIDE RESOURCE |
| R02 | OUTSIDE RESOURCE |

FIG. 6A

| PRODUCT ID | TERM | a<br>PRICE | b<br>PRODUCTION DIRECT COST | c<br>MARGINAL PROFIT |
|---|---|---|---|---|
| P1 | 1 | 1 | 0.5 | 0.5 |
| | 2 | 1 | 0.5 | 0.5 |
| | 3 | 1.5 | 1 | 0.5 |
| | 4 | 1.2 | 0.6 | 0.6 |
| | 5 | 1 | 0.5 | 0.5 |

FIG. 6B

| PRODUCT ID | TERM | d<br>PLANNED SALES QUANTITY | e<br>PLANNED PRODUCTION QUANTITY | f<br>FIXED SALES QUANTITY | g<br>INVENTORY QUANTITY |
|---|---|---|---|---|---|
| P1 | 1 | 2 | 1.5 | 1 | 0.5 |
| | 2 | 2 | 1.8 | 0.8 | 1.5 |
| | 3 | 3 | 2 | 1 | 2.5 |
| | 4 | 3 | 2.5 | 2 | 3 |
| | 5 | 2 | 2 | 1 | 4 |

FIG. 6C

| PRODUCT ID | TERM | h<br>SURPLUS PRODUCTION QUANTITY | i<br>UPSTREAM CONSOLIDATED CONTRIBUTION PROFIT | j<br>EFFECTIVE SURPLUS PRODUCTION QUANTITY | k<br>CONSOLIDATED CONTRIBUTION PROFIT |
|---|---|---|---|---|---|
| P1 | 1 | 0.3 | 0.3 | 0.3 | 0.6 |
| | 2 | 0.5 | 0.3 | 0.3 | 0.6 |
| | 3 | 0.4 | 0.3 | 0.3 | 0.6 |
| | 4 | 0.6 | 0.2 | 0.4 | 0.5 |
| | 5 | 0.7 | 0.2 | 0.6 | 0.5 |

FIG. 7

| PART ID | TERM | a<br>SURPLUS PRODUCTION QUANTITY | b<br>UPSTREAM CONSOLIDATED CONTRIBUTION PROFIT | c<br>EFFECTIVE SURPLUS PRODUCTION QUANTITY | d<br>CONSOLIDATED CONTRIBUTION PROFIT |
|---|---|---|---|---|---|
| X1 | 1 | 0.4 | 0.2 | 0.3 | 0.4 |
| | 2 | 0.6 | 0.2 | 0.3 | 0.4 |
| | 3 | 0.6 | 0.2 | 0.3 | 0.4 |
| | 4 | 0.7 | 0.15 | 0.4 | 0.3 |
| | 5 | 0.7 | 0.15 | 0.6 | 0.4 |

FIG. 8

| TERM | DEPARTMENT EXPENDITURE ||| DEPARTMENT SALES ||| DEPARTMENT MARGINAL PROFIT ||| DEPARTMENT CASH FLOW ||||
|---|---|---|---|---|---|---|---|---|---|---|---|---|---|
| | COMMON FIXED COST | TOTAL INVENTORY COST | RESOURCE FIXED COST | SALES PLAN | PRODUCTION PLAN | FIXED SALES | SALES PLAN | PRODUCTION PLAN | FIXED SALES | EXISTING CF | PRODUCTION PLAN CF | SALES PLAN CF | etc |
| 1 | 0.1 | 0.01 | 0.3 | 0.5 | 0.5 | 0.3 | 0.3 | 0.3 | 0.3 | 0.20 | 0.20 | 0.20 | - |
| 2 | 0.1 | 0.01 | 0.2 | 0.5 | 0.45 | 0.45 | 0.2 | 0.15 | 0.15 | 0.29 | 0.29 | 0.29 | - |
| 3 | 0.1 | 0.02 | 0.2 | 0.4 | 0.4 | 0.4 | 0.2 | 0.2 | 0.2 | 0.38 | 0.38 | 0.38 | - |
| 4 | 0.1 | 0.01 | 0.3 | 0.5 | 0.45 | 0.4 | 0.3 | 0.25 | 0.2 | 0.47 | 0.47 | 0.47 | - |
| 5 | 0.1 | 0.01 | 0.3 | 0.6 | 0.5 | 0 | 0.3 | 0.25 | 0 | 0.07 | 0.07 | 0.07 | - |

FIG. 9

| ORDER ID | START DATE | END DATE | PRODUCT ID | FIXED QUANTITY FOR PARENT PRODUCTS | REQUESTED QUANTITY OF PARENT PRODUCTS | SURPLUS PRODUCTION QUANTITY FOR PARENT PRODUCTS |
|---|---|---|---|---|---|---|
| A-1 | 1/1 | 1/10 | A | 0 | 0 | 0 |
| A-2 | 1/11 | 1/20 | A | 0 | 2 | 0 |
| A-3 | 1/21 | 1/31 | A | 0 | 0 | 0 |
| B-1 | 1/1 | 1/10 | B | 0 | 0 | 0 |
| B-2 | 1/11 | 1/20 | B | 0 | 0 | 0 |
| B-3 | 1/21 | 1/31 | B | 0 | 5 | 0 |

FIG. 10

| RESOURCE ID | START DATE | END DATE | FIXED QUANTITY OF PARTS | DESIRED QUANTITY FOR PARTS | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0 |
| R01 | 1/21 | 1/31 | 10 | 0 | 0 | 0 |
| R02 | 1/1 | 1/10 | 0 | 0 | 2 | 0 |
| R02 | 1/11 | 1/20 | 0 | 0 | 6 | 0 |
| R02 | 1/21 | 1/31 | 0 | 0 | 10 | 0 |

FIG. 11

| ORDER ID | PROCESS ID | START DATE | END DATE | OFFSET | RESOURCE ID | QUANTITY | COST |
|---|---|---|---|---|---|---|---|
| A-1 | A001 | - | - | 0 | R01 | 0 | |
| A-1 | A002 | 1/1 | 1/10 | 1 | R02 | 0 | |
| A-2 | A001 | - | - | 0 | R01 | 0 | |
| A-2 | A002 | 1/11 | 1/20 | 1 | R02 | 0 | |
| A-3 | A001 | - | - | 0 | R01 | 0 | |
| A-3 | A002 | 1/21 | 1/31 | 1 | R02 | 0 | |
| B-1 | B001 | - | - | 0 | R01 | 0 | |
| B-1 | B002 | - | - | 1 | R02 | 0 | |
| B-1 | B003 | 1/1 | 1/10 | 2 | R01 | 0 | |
| B-2 | B001 | - | - | 0 | R01 | 0 | |
| B-2 | B002 | - | - | 1 | R02 | 0 | |
| B-2 | B003 | 1/11 | 1/20 | 2 | R01 | 0 | |
| B-3 | B001 | - | - | 0 | R01 | 0 | |
| B-3 | B002 | - | - | 1 | R02 | 0 | |
| B-3 | B003 | 1/21 | 1/31 | 2 | R01 | 0 | |

FIG. 18

| ORDER ID | PROCESS ID | START DATE | END DATE | OFFSET | RESOURCE ID | QUANTITY |
|---|---|---|---|---|---|---|
| A-2 | A001 | - | - | 0 | R01 | 2 |
| A-2 | A002 | 1/11 | 1/20 | 1 | R02 | 4 |
| B-3 | B001 | - | - | 0 | R01 | 5 |
| B-3 | B002 | - | - | 1 | R02 | 5 |
| B-3 | B003 | 1/21 | 1/31 | 2 | R01 | 3 |

FIG. 19

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0 |
| R01 | 1/21 | 1/31 | 10 | 0 | 0 | 3 |
| R02 | 1/1 | 1/10 | 0 | 0 | 2 | 0 |
| R02 | 1/11 | 1/20 | 0 | 0 | 6 | 4 |
| R02 | 1/21 | 1/31 | 0 | 0 | 10 | 0 |

FIG. 20

| ORDER ID | PROCESS ID | START DATE | END DATE | OFFSET | RESOURCE ID | QUANTITY |
|---|---|---|---|---|---|---|
| A-2 | A001 | - | - | 0 | R01 | 2 |
| A-2 | A002 | 1/11 | 1/20 | 1 | R02 | 4 |
| B-3 | B001 | - | - | 0 | R01 | 5 |
| B-3 | B002 | 1/19 | 1/29 | 1 | R02 | 5 |
| B-3 | B003 | 1/21 | 1/31 | 2 | R01 | 3 |

FIG. 21

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0 |
| R01 | 1/21 | 1/31 | 10 | 0 | 0 | 3 |
| R02 | 1/1 | 1/10 | 0 | 0 | 2 | 0 |
| R02 | 1/11 | 1/20 | 0 | 0 | 6 | 4 + 1 |
| R02 | 1/21 | 1/31 | 0 | 0 | 10 | 0 + 4 |

FIG. 22

| ORDER ID | PROCESS ID | START DATE | END DATE | OFFSET | RESOURCE ID | QUANTITY |
|---|---|---|---|---|---|---|
| A-2 | A001 | - | - | 0 | R01 | 2 |
| A-2 | A002 | 1/11 | 1/20 | 1 | R02 | 4 |
| B-3 | B001 | 1/18 | 1/28 | 0 | R01 | 5 |
| B-3 | B002 | 1/19 | 1/29 | 1 | R02 | 5 |
| B-3 | B003 | 1/21 | 1/31 | 2 | R01 | 3 |

FIG. 23

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0+1 |
| R01 | 1/21 | 1/31 | 10 | 0 | 0 | 3+4 |
| R02 | 1/1 | 1/10 | 0 | 0 | 2 | 0 |
| R02 | 1/11 | 1/20 | 0 | 0 | 6 | 5 |
| R02 | 1/21 | 1/31 | 0 | 0 | 10 | 4 |

FIG. 24

| ORDER ID | PROCESS ID | START DATE | END DATE | OFFSET | RESOURCE ID | QUANTITY |
|---|---|---|---|---|---|---|
| A-2 | A001 | 1/10 | 1/19 | 0 | R01 | 2 |
| A-2 | A002 | 1/11 | 1/20 | 1 | R02 | 4 |
| B-3 | B001 | 1/18 | 1/28 | 0 | R01 | 5 |
| B-3 | B002 | 1/19 | 1/29 | 1 | R02 | 5 |
| B-3 | B003 | 1/21 | 1/31 | 2 | R01 | 3 |

FIG. 25

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 1+2 |
| R01 | 1/21 | 1/31 | 10 | 0 | 0 | 7 |
| R02 | 1/1 | 1/10 | 0 | 0 | 2 | 0 |
| R02 | 1/11 | 1/20 | 0 | 0 | 6 | 5 |
| R02 | 1/21 | 1/31 | 0 | 0 | 10 | 4 |

FIG. 26

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 3 | 0 | 3 |
| R01 | 1/21 | 1/31 | 10 | 7 | 0 | 7 |
| R02 | 1/1 | 1/10 | 0 | 0 | 2 | 0 |
| R02 | 1/11 | 1/20 | 0 | 5 | 6 | 5 |
| R02 | 1/21 | 1/31 | 0 | 4 | 10 | 4 |

FIG. 27

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R02 | 1/1 | 1/10 | 0 | 0 | 2 | 0 |
| R02 | 1/11 | 1/20 | 0 | 5 | 6 | 0 |
| R02 | 1/21 | 1/31 | 0 | 4 | 10 | 0 |

FIG. 28

| ORDER ID | START DATE | END DATE | PRODUCT ID | FIXED QUANTITY FOR PARENT PRODUCTS | REQUESTED QUANTITY (FOR CHANGE) OF PARENT PRODUCTS | SURPLUS PRODUCTION QUANTITY FOR PARENT PRODUCTS |
|---|---|---|---|---|---|---|
| A-1 | 1/1 | 1/10 | A | 0 | 0 | 1 |
| A-2 | 1/11 | 1/20 | A | 2 | 0 | 0 |
| A-3 | 1/21 | 1/31 | A | 0 | 0 | 3 |
| B-1 | 1/1 | 1/10 | B | 0 | 0 | 2 |
| B-2 | 1/11 | 1/20 | B | 0 | 0 | 1 |
| B-3 | 1/21 | 1/31 | B | 5 | 0 | 2 |

FIG. 29

| ORDER ID | START DATE | END DATE | PRODUCT ID | FIXED QUANTITY FOR PARENT PRODUCTS | REQUESTED QUANTITY OF PARENT PRODUCTS | SURPLUS PRODUCTION QUANTITY FOR PARENT PRODUCTS | PREDICTED DEMAND QUANTITY | CERTAINTY FACTOR |
|---|---|---|---|---|---|---|---|---|
| A-1 | 1/1 | 1/10 | A | 0 | 0 | 0 | 0 | 0 |
| A-2 | 1/11 | 1/20 | A | 0 | 2 | 0 | 3 | 0.5 |
| A-3 | 1/21 | 1/31 | A | 0 | 0 | 0 | 5 | 0.2 |
| B-1 | 1/1 | 1/10 | B | 0 | 0 | 0 | 0 | 0 |
| B-2 | 1/11 | 1/20 | B | 0 | 0 | 0 | 0 | 0 |
| B-3 | 1/21 | 1/31 | B | 0 | 5 | 0 | 3 | 0.2 |

FIG. 30

| ORDER ID | START DATE | END DATE | PRODUCT ID | FIXED QUANTITY FOR PARENT PRODUCTS | REQUESTED QUANTITY OF PARENT PRODUCTS | SURPLUS PRODUCTION QUANTITY FOR PARENT PRODUCTS | PREDICTED DEMAND QUANTITY | CERTAINTY FACTOR | INSIDE QUANTITY |
|---|---|---|---|---|---|---|---|---|---|
| A-1 | 1/1 | 1/10 | A | 0 | 0 | 0 | 0 | 0 | 0 |
| A-2 | 1/11 | 1/20 | A | 0 | 2 | 0 | 3 | 0.5 | 2.5 |
| A-3 | 1/21 | 1/31 | A | 0 | 0 | 0 | 5 | 0.2 | 1 |
| B-1 | 1/1 | 1/10 | B | 0 | 0 | 0 | 0 | 0 | 0 |
| B-2 | 1/11 | 1/20 | B | 0 | 0 | 0 | 0 | 0 | 0 |
| B-3 | 1/21 | 1/31 | B | 0 | 5 | 0 | 3 | 0.2 | 5 |

FIG. 31

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0 |
| R01 | 1/21 | 1/31 | 10 | 0 | 0 | 0 |
| R02 | 1/1 | 1/10 | 0 | 0 | 2 | 0 |
| R02 | 1/11 | 1/20 | 0 | 0 | 6 | 0 |
| R02 | 1/21 | 1/31 | 0 | 0 | 10 | 0 |

FIG. 32

| ORDER ID | PROCESS ID | START DATE | END DATE | OFFSET | RESOURCE ID | QUANTITY |
|---|---|---|---|---|---|---|
| A-2 | A001 | - | - | 0 | R01 | 2.5=3 |
| A-2 | A002 | 1/11 | 1/20 | 1 | R02 | 5 |
| A-3 | A001 | - | - | 0 | R01 | 1 |
| A-3 | A002 | 1/21 | 1/31 | 1 | R02 | 2 |
| B-3 | B001 | - | - | 0 | R01 | 5 |
| B-3 | B002 | - | - | 1 | R02 | 5 |
| B-3 | B003 | 1/21 | 1/31 | 2 | R01 | 3 |

FIG. 33

| RESOURCE ID | START DATE | END DATE | FIXED QUANTITY OF PARTS | DESIRED QUANTITY FOR PARTS (FOR CHANGE) | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 0 |
| R01 | 1/21 | 1/31 | 10 | 0 | 0 | 3 |
| R02 | 1/1 | 1/10 | 0 | 0 | 2 | 0 |
| R02 | 1/11 | 1/20 | 0 | 0 | 6 | 5 |
| R02 | 1/21 | 1/31 | 0 | 0 | 10 | 2 |

FIG. 34

| ORDER ID | PROCESS ID | START DATE | END DATE | OFFSET | RESOURCE ID | QUANTITY |
|---|---|---|---|---|---|---|
| A-2 | A001 | 1/10 | 1/19 | 0 | R01 | 3 |
| A-2 | A002 | 1/11 | 1/20 | 1 | R02 | 5 |
| A-3 | A001 | 1/20 | 1/30 | 0 | R01 | 1 |
| A-3 | A002 | 1/21 | 1/31 | 1 | R02 | 2 |
| B-3 | B001 | 1/17 | 1/27 | 0 | R01 | 5 |
| B-3 | B002 | 1/18 | 1/28 | 1 | R02 | 5 |
| B-3 | B003 | 1/21 | 1/31 | 2 | R01 | 3 |

FIG. 35

| RESOURCE ID | START DATE | END DATE | FIXED QUANTITY OF PARTS | DESIRED QUANTITY FOR PARTS | SURPLUS PRODUCTION QUANTITY OF PARTS | PLANNED QUANTITY |
|---|---|---|---|---|---|---|
| R01 | 1/1 | 1/10 | 10 | 0 | 0 | 0 |
| R01 | 1/11 | 1/20 | 10 | 0 | 0 | 2 |
| R01 | 1/21 | 1/31 | 10 | 0 | 0 | 7 |
| R02 | 1/1 | 1/10 | 0 | 0 | 2 | 0 |
| R02 | 1/11 | 1/20 | 0 | 2 | 6 | 6 |
| R02 | 1/21 | 1/31 | 0 | 10 | 10 | 6 |

FIG. 36

| ORDER ID | START DATE | END DATE | PRODUCT ID | PRICE @ FIXED QUANTITY FOR PARENT PRODUCTS | PRICE @ REQUESTED QUANTITY OF PARENT PRODUCTS | PRICE @ SURPLUS PRODUCTION QUANTITY FOR PARENT PRODUCTS |
|---|---|---|---|---|---|---|
| A-1 | 1/1 | 1/10 | A | 0 | 0 | 0 |
| A-2 | 1/11 | 1/20 | A | 0 | 2 @ 50 | 0 |
| A-3 | 1/21 | 1/31 | A | 0 | 0 | 0 |
| B-1 | 1/1 | 1/10 | B | 0 | 0 | 0 |
| B-2 | 1/11 | 1/20 | B | 0 | 0 | 0 |
| B-3 | 1/21 | 1/31 | B | 0 | 5 @ 60 | 0 |

FIG. 37

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARENT PRODUCTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 0 |
| R01 | 1/21 | 1/31 | 10 @ 20 | 0 | 0 | 0 |
| R02 | 1/1 | 1/10 | 0 | 0 | 2 @ 10 | 0 |
| R02 | 1/11 | 1/20 | 0 | 0 | 6 @ 10 | 0 |
| R02 | 1/21 | 1/31 | 0 | 0 | 10 @ 10 | 0 |

FIG. 38

| ORDER ID | PROCESS ID | START DATE | END DATE | OFFSET | RESOURCE ID | QUANTITY | COST |
|---|---|---|---|---|---|---|---|
| A-2 | A001 | - | - | 0 | R01 | 2 | |
| A-2 | A002 | 1/1 | 1/20 | 1 | R02 | 4 | @ 10 |
| B-3 | B001 | - | - | 0 | R01 | 5 | |
| B-3 | B002 | - | - | 1 | R02 | 5 | |
| B-3 | B003 | 1/21 | 1/31 | 2 | R01 | 3 | @ 20 |

FIG. 39

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 0 |
| R01 | 1/21 | 1/31 | 10 @ 20 | 0 | 0 | 3 |
| R02 | 1/1 | 1/10 | 0 | 0 | 2 @ 10 | 0 |
| R02 | 1/11 | 1/20 | 0 | 0 | 6 @ 10 | 4 |
| R02 | 1/21 | 1/31 | 0 | 0 | 10 @ 10 | 0 |

FIG. 40

| ORDER ID | PROCESS ID | START DATE | END DATE | OFFSET | RESOURCE ID | QUANTITY | COST |
|---|---|---|---|---|---|---|---|
| A-2 | A001 | - | - | 0 | R01 | 2 | |
| A-2 | A002 | 1/11 | 1/20 | 1 | R02 | 4 | @ 10 |
| B-3 | B001 | - | - | 0 | R01 | 5 | |
| B-3 | B002 | 1/19 | 1/29 | 1 | R02 | 5 | @ 10 |
| B-3 | B003 | 1/21 | 1/31 | 2 | R01 | 3 | @ 20 |

FIG. 41

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 0 |
| R01 | 1/21 | 1/31 | 10 @ 20 | 0 | 0 | 3 |
| R02 | 1/1 | 1/10 | 0 | 0 | 2 @ 10 | 0 |
| R02 | 1/11 | 1/20 | 0 | 0 | 6 @ 10 | 4 + 1 |
| R02 | 1/21 | 1/31 | 0 | 0 | 10 @ 10 | 0 + 4 |

FIG. 42

| ORDER ID | PROCESS ID | START DATE | END DATE | OFFSET | RESOURCE ID | QUANTITY | COST |
|---|---|---|---|---|---|---|---|
| A-2 | A001 | - | - | 0 | R01 | 2 | |
| A-2 | A002 | 1/11 | 1/20 | 1 | R02 | 4 | @ 10 |
| B-3 | B001 | 1/18 | 1/28 | 0 | R01 | 5 | @ 20 |
| B-3 | B002 | 1/19 | 1/29 | 1 | R02 | 5 | @ 10 |
| B-3 | B003 | 1/21 | 1/31 | 2 | R01 | 3 | @ 20 |

FIG. 43

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 0 + 1 |
| R01 | 1/21 | 1/31 | 10 @ 20 | 0 | 0 | 3 + 4 |
| R02 | 1/1 | 1/10 | 0 | 0 | 2 @ 10 | 0 |
| R02 | 1/11 | 1/20 | 0 | 0 | 5 @ 10 | 5 |
| R02 | 1/21 | 1/31 | 0 | 0 | 10 @ 10 | 4 |

FIG. 44

| ORDER ID | PROCESS ID | START DATE | END DATE | OFFSET | RESOURCE ID | QUANTITY | COST |
|---|---|---|---|---|---|---|---|
| A-2 | A001 | 1/10 | 1/19 | 0 | R01 | 2 | @20 |
| A-2 | A002 | 1/11 | 1/20 | 1 | R02 | 4 | @10 |
| B-3 | B001 | 1/18 | 1/28 | 0 | R01 | 5 | @20 |
| B-3 | B002 | 1/19 | 1/29 | 1 | R02 | 5 | @10 |
| B-3 | B003 | 1/21 | 1/31 | 2 | R01 | 3 | @20 |

FIG. 45

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 1 + 2 |
| R01 | 1/21 | 1/31 | 10 @ 20 | 0 | 0 | 7 |
| R02 | 1/1 | 1/10 | 0 | 0 | 2 @ 10 | 0 |
| R02 | 1/11 | 1/20 | 0 | 0 | 5 @ 10 | 5 |
| R02 | 1/21 | 1/31 | 0 | 0 | 10 @ 10 | 4 |

FIG. 46

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R01 | 1/1 | 1/10 | 10 @ 20 | 0 | 0 | 0 |
| R01 | 1/11 | 1/20 | 10 @ 20 | 0 | 0 | 3 |
| R01 | 1/21 | 1/31 | 10 @ 20 | 0 | 0 | 7 |
| R02 | 1/1 | 1/10 | 0 | 0 | 2 @ 10 | 0 |
| R02 | 1/11 | 1/20 | 0 | 1 | 5 @ 10 | 5 |
| R02 | 1/21 | 1/31 | 0 | 7 | 10 @ 10 | 4 |

FIG. 47

| ORDER ID | START DATE | END DATE | PRODUCT ID | PRICE @ FIXED QUANTITY FOR PARENT PRODUCTS | PRICE @ REQUESTED QUANTITY OF PARENT PRODUCTS | PRICE @ SURPLUS PRODUCTION QUANTITY FOR PARENT PRODUCTS |
|---|---|---|---|---|---|---|
| A-1 | 1/1 | 1/10 | A | 0 | 0 | 1 @ 40 |
| A-2 | 1/11 | 1/20 | A | 2 @ 50 | 0 | 0 @ 50 |
| A-3 | 1/21 | 1/31 | A | 0 | 0 | 3 @ 50 |
| B-1 | 1/1 | 1/10 | B | 0 | 0 | 2 @ 40 |
| B-2 | 1/11 | 1/20 | B | 0 | 0 | 1 @ 60 |
| B-3 | 1/21 | 1/31 | B | 5 @ 60 | 0 | 2 @ 60 |

FIG. 48

| RESOURCE ID | START DATE | END DATE | PRICE @ FIXED QUANTITY OF PARTS | PRICE @ DESIRED QUANTITY FOR PARTS | PRICE @ SURPLUS PRODUCTION QUANTITY OF PARTS | PLANNED QUANTITY |
|---|---|---|---|---|---|---|
| R02 | 1/1 | 1/10 | 0 | 0 | 2 @ 10 | 0 |
| R02 | 1/11 | 1/20 | 0 | 5 @ 10 | 5 @ 10 | 0 |
| R02 | 1/21 | 1/31 | 0 | 4 @ 10 | 10 @ 10 | 0 |

FIG. 53A

| TERM | EFFECTIVE SURPLUS PRODUCTION QUANTITY | |
|---|---|---|
| | P1 | P2 |
| 1 | 0.2 | 0.1 |
| 2 | 0.1 | 0.1 |
| 3 | 0.2 | 0.2 |
| 4 | 0.1 | 0.3 |
| 5 | 0.2 | 0.4 |

FIG. 53B

| TERM | SURPLUS PRODUCTION QUANTITY | | |
|---|---|---|---|
| | X1 | X2 | X3 |
| 1 | 0.4 | 0.3 | 0.2 |
| 2 | 0.5 | 0.3 | 0.3 |
| 3 | 0.4 | 0.3 | 0.4 |
| 4 | 0.5 | 0.3 | 0.5 |
| 5 | 0.4 | 0.3 | 0.6 |

FIG. 53C

| TERM | EFFECTIVE SURPLUS PRODUCTION QUANTITY | | |
|---|---|---|---|
| | X1 | X2 | X3 |
| 1 | 0.2 | 0.3 | 0.1 |
| 2 | 0.1 | 0.2 | 0.1 |
| 3 | 0.2 | 0.3 | 0.2 |
| 4 | 0.1 | 0.3 | 0.3 |
| 5 | 0.2 | 0.3 | 0.4 |

FIG. 55

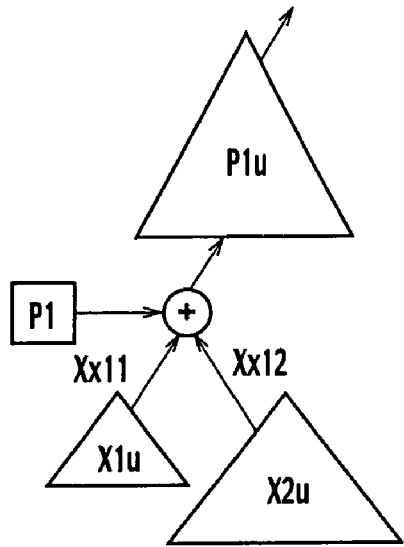

△ Piu : UPSTREAM CONSOLIDATED CONTRIBUTION PROFIT PER PRODUCT Pi

□ Pi : UNCONSOLIDATED CONTRIBUTION PROFIT PER PRODUCT P $$\triangle_{Piu} = \sum_i \triangle_{Xiu} \cdot x_{ij} + \square_{Pi}$$

⇩

△ Piu TRANSMIT Piu TO PARENT PRODUCT PRODUCTION LOCATION (PRODUCT DATA)

FIG. 56

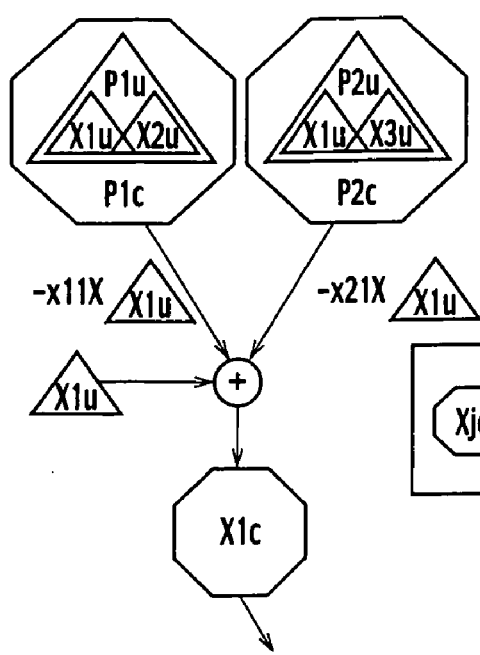

⬡ Pic : CONSOLIDATED CONTRIBUTION PROFIT PER PRODUCT Pi

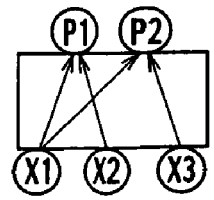

$$\bigcirc_{Xjc} = \sum_i \left( \bigcirc_{Pic} - \triangle_{Xju} \cdot x_{ij} \right) \cdot \alpha_{ij} + \triangle_{Xju}$$

⇩

⬡ Xjc TRANSMIT Xjc TO PART PRODUCTION LOCATION (PART DATA)

| PRODUCTION LOCATION | PRODUCT ID | BELONGING DEPARTMENT SET | |
|---|---|---|---|
| B | X1 | B | D |
| C | X2 | C | E |
|   | X3 | C | E |
| A | P1 | A | D |
|   | P2 | A |   |
| F | Q1 | A | F |
| D | Y1 | D |   |
| E | Y2 | E |   |

| PRODUCTION LOCATION | PRODUCT ID | UPSTREAM BELONGING DEPARTMENT SET | | | | | |
|---|---|---|---|---|---|---|---|
| B | X1 | B | D | | | | |
| C | X2 | C | E | | | | |
|   | X3 | C | E | | | | |
| A | P1 | A | B | C | D | E | |
|   | P2 | A | B | C | D | E | |
| F | Q1 | A | F | | | | |
| D | Y1 | A | B | C | D | E | |
| E | Y2 | A | B | C | D | E | F |

FIG. 60

| PRODUCTION LOCATION | PRODUCT ID | CONSOLIDATED BELONGING DEPARTMENT SET | | | | | |
|---|---|---|---|---|---|---|---|
| B | X1 | A | B | C | D | E | F |
| C | X2 | A | B | C | D | E |   |
| C | X3 | A | B | C | D | E | F |
| A | P1 | A | B | C | D | E |   |
| A | P2 | A | B | C | D | E | F |
| F | Q1 | A | B | C | D | E | F |
| D | Y1 | A | B | C | D | E |   |
| E | Y2 | A | B | C | D | E | F |

FIG. 61

| PRODUCTION LOCATION | PRODUCT ID | | | CONSOLIDATED BELONGING DEPARTMENT SET | | | | | |
|---|---|---|---|---|---|---|---|---|---|
| B | X1 | BELONGING DEPARTMENT | AX1 | A | B | C | D | E | F |
|   |    | CONTRIBUTION PROFIT | RX1 |   | 1.00 |   | 1.00 |   |   |
| C | X2 | BELONGING DEPARTMENT | AX2 | A | B | C | D | E | F |
|   |    | CONTRIBUTION PROFIT | RX2 |   |   | 1.00 |   | 1.00 |   |
|   | X3 | BELONGING DEPARTMENT | AX3 | A | B | C | D | E | F |
|   |    | CONTRIBUTION PROFIT | RX3 |   |   | 1.00 |   | 1.00 |   |
| A | P1 | BELONGING DEPARTMENT | AP1 | A | B | C | D | E | F |
|   |    | CONTRIBUTION PROFIT | RP1 | 1.00 |   |   | 1.00 |   |   |
|   | P2 | BELONGING DEPARTMENT | AP2 | A | B | C | D | E | F |
|   |    | CONTRIBUTION PROFIT | RP2 | 1.00 |   |   |   |   |   |
| F | Q1 | BELONGING DEPARTMENT | AQ1 | A | B | C | D | E | F |
|   |    | CONTRIBUTION PROFIT | RQ1 | 1.00 |   |   |   |   | 1.00 |
| D | Y1 | BELONGING DEPARTMENT | AY1 | A | B | C | D | E | F |
|   |    | CONTRIBUTION PROFIT | RY1 |   |   |   | 1.00 |   |   |
| E | Y2 | BELONGING DEPARTMENT | AY2 | A | B | C | D | E | F |
|   |    | CONTRIBUTION PROFIT | RY2 |   |   |   |   | 1.00 |   |

FIG. 62

| PRODUCT ID | PART ID | USAGE |
|---|---|---|
| P1 | X1 | 2 |
|    | X2 | 2 |
| P2 | X1 | 2 |
|    | X3 | 3 |
| Y1 | P1 | 2 |
| Y2 | P2 | 3 |
|    | Q1 | 2 |

FIG. 63

| PRODUCTION LOCATION | PRODUCT ID | | | CONSOLIDATED BELONGING DEPARTMENT SET | | | | | |
|---|---|---|---|---|---|---|---|---|---|
| B | X1 | BELONGING DEPARTMENT | AuX1 | A | B | C | D | E | F |
|   |    | CONTRIBUTION PROFIT | RuX1 |   | 1.00 |   | 1.00 |   |   |
| C | X2 | BELONGING DEPARTMENT | AuX2 | A | B | C | D | E | F |
|   |    | CONTRIBUTION PROFIT | RuX2 |   |   | 1.00 |   | 1.00 |   |
|   | X3 | BELONGING DEPARTMENT | AuX3 | A | B | C | D | E | F |
|   |    | CONTRIBUTION PROFIT | RuX3 |   |   | 1.00 |   | 1.00 |   |
| A | P1 | BELONGING DEPARTMENT | AuP1 | A | B | C | D | E | F |
|   |    | CONTRIBUTION PROFIT | RuP1 | 1.00 | 2.00 | 2.00 | 3.00 | 2.00 |   |
|   | P2 | BELONGING DEPARTMENT | AuP2 | A | B | C | D | E | F |
|   |    | CONTRIBUTION PROFIT | RuP2 | 1.00 | 2.00 | 3.00 | 2.00 | 3.00 |   |
| F | Q1 | BELONGING DEPARTMENT | AuQ1 | A | B | C | D | E | F |
|   |    | CONTRIBUTION PROFIT | RuQ1 | 1.00 |   |   |   |   | 1.00 |
| D | Y1 | BELONGING DEPARTMENT | AuY1 | A | B | C | D | E | F |
|   |    | CONTRIBUTION PROFIT | RuY1 | 2.00 | 4.00 | 4.00 | 7.00 | 4.00 |   |
| E | Y2 | BELONGING DEPARTMENT | AuY2 | A | B | C | D | E | F |
|   |    | CONTRIBUTION PROFIT | RuY2 | 5.00 | 6.00 | 9.00 | 6.00 | 10.00 | 2.00 |

FIG. 64

| PRODUCTION LOCATION | PRODUCT ID | | | CONSOLIDATED BELONGING DEPARTMENT SET | | | | | |
|---|---|---|---|---|---|---|---|---|---|
| B | X1 | BELONGING DEPARTMENT | AuX1 | A | B | C | D | E | F |
|   |    | CONTRIBUTION PROFIT | RuX1 | 0.67 | 1.00 | 1.25 | 1.38 | 1.33 | 0.17 |
| C | X2 | BELONGING DEPARTMENT | AuX2 | A | B | C | D | E | F |
|   |    | CONTRIBUTION PROFIT | RuX2 | 0.50 | 1.00 | 1.00 | 1.75 | 1.00 |   |
|   | X3 | BELONGING DEPARTMENT | AuX3 | A | B | C | D | E | F |
|   |    | CONTRIBUTION PROFIT | RuX3 | 0.56 | 0.67 | 1.00 | 0.67 | 1.11 | 0.22 |
| A | P1 | BELONGING DEPARTMENT | AuP1 | A | B | C | D | E | F |
|   |    | CONTRIBUTION PROFIT | RuP1 | 1.00 | 2.00 | 2.00 | 3.50 | 2.00 |   |
|   | P2 | BELONGING DEPARTMENT | AuP2 | A | B | C | D | E | F |
|   |    | CONTRIBUTION PROFIT | RuP2 | 1.67 | 2.00 | 3.00 | 2.00 | 3.33 | 0.67 |
| F | Q1 | BELONGING DEPARTMENT | AuQ1 | A | B | C | D | E | F |
|   |    | CONTRIBUTION PROFIT | RuQ1 | 2.50 | 3.00 | 4.50 | 3.00 | 5.00 | 1.00 |
| D | Y1 | BELONGING DEPARTMENT | AuY1 | A | B | C | D | E | F |
|   |    | CONTRIBUTION PROFIT | RuY1 | 2.00 | 4.00 | 4.00 | 7.00 | 4.00 |   |
| E | Y2 | BELONGING DEPARTMENT | AuY2 | A | B | C | D | E | F |
|   |    | CONTRIBUTION PROFIT | RuY2 | 5.00 | 6.00 | 9.00 | 6.00 | 10.00 | 2.00 |

FIG. 66

| TERM | PRODUCT 1 | | | | | PRODUCT 2 | | | | |
|---|---|---|---|---|---|---|---|---|---|---|
| | PLANNED SALES QUANTITY | PLANNED PRODUCTION QUANTITY | FIXED SALES QUANTITY | SURPLUS PRODUCTION QUANTITY | INVENTORY QUANTITY | PLANNED SALES QUANTITY | PLANNED PRODUCTION QUANTITY | FIXED SALES QUANTITY | SURPLUS PRODUCTION QUANTITY | INVENTORY QUANTITY |
| 0 | 0 | 0 | 0 | 0 | 0 | 0 | 0 | 0 | 0 | 0 |
| 1 | 0 | 0 | 0 | 0 | 0 | 1 | 1 | 0.6 | 0 | 0.4 |
| 2 | 0 | 0 | 0 | 0 | 0 | 1 | 1 | 1 | 0 | 0.4 |
| 3 | 0 | 0 | 0 | 0 | 0 | 1 | 1 | 1 | 0 | 0.4 |
| 4 | 0.4 | 0.4 | 0 | 0 | 0.4 | 0.6 | 0.6 | 1 | 0 | 0 |
| 5 | 1 | 1 | 0 | 0 | 1.4 | 0 | 0 | 0 | 0 | 0 |
| 6 | 0 | 0 | 1 | 0 | 0.4 | 1 | 1 | 0 | 0 | 1 |
| 7 | 1 | 1 | 0 | 0 | 1.4 | 0 | 0 | 0 | 0 | 1 |
| 8 | 0 | 0 | 0 | 0 | 1.4 | 1 | 1 | 0 | 0 | 2 |
| 9 | 1 | 1 | 0 | 0 | 2.4 | 0 | 0 | 2 | 0 | 0 |
| 10 | 1 | 1 | 3.4 | 0 | 0 | 0 | 0 | 0 | 0 | 0 |
| 11 | 0.5 | 0 | 0 | 0.9 | 0 | 0.5 | 0.1 | 0 | 0.9 | 0.1 |
| 12 | 0 | 0 | 0 | 0 | 0 | 1 | 1 | 0 | 0 | 1.1 |
| 13 | 0 | 0 | 0 | 0 | 0 | 1 | 1 | 0 | 0 | 2.1 |
| 14 | 0 | 0 | 0 | 0.5 | 0 | 0.5 | 0.5 | 0 | 0.5 | 2.6 |
| 15 | 0 | 0 | 0 | 0.5 | 0 | 0.5 | 0.5 | 0 | 0.5 | 3.1 |
| 16 | 0 | 0 | 0 | 0.5 | 0 | 0.5 | 0.5 | 0 | 0.5 | 3.6 |
| 17 | 0 | 0 | 0 | 0.5 | 0 | 0.5 | 0.5 | 0 | 0.5 | 4.1 |
| 18 | 0 | 0 | 0 | 0.5 | 0 | 0.5 | 0.5 | 0 | 0.5 | 4.6 |
| 19 | 0 | 0 | 0 | 0.5 | 0 | 0.5 | 0.5 | 0 | 0.5 | 5.1 |
| 20 | 0 | 0 | 0 | 1 | 0 | 0 | 0 | 0 | 1 | 5.1 |
| 21 | 0 | 0 | 0 | 1 | 0 | 0 | 0 | 0 | 1 | 5.1 |
| 22 | 0 | 0 | 0 | 1 | 0 | 0 | 0 | 1 | 1 | 4.1 |
| 23 | 0 | 0 | 0 | 1 | 0 | 0 | 0 | 1 | 1 | 3.1 |
| 24 | 0 | 0 | 0 | 1 | 0 | 0 | 0 | 1 | 1 | 2.1 |
| 25 | 0 | 0 | 0 | 1 | 0 | 0 | 0 | 1 | 1 | 1.1 |
| 26 | 0 | 0 | 0 | 1 | 0 | 0 | 0 | 0 | 1 | 1.1 |
| 27 | 0 | 0 | 0 | 1 | 0 | 0 | 0 | 0 | 1 | 1.1 |
| 28 | 0 | 0 | 0 | 1 | 0 | 0 | 0 | 0 | 1 | 1.1 |
| 29 | 0 | 0 | 0 | 1 | 0 | 0 | 0 | 0 | 1 | 1.1 |

FIG. 67

| TERM | PRODUCT 1 | | | PRODUCT 2 | | |
|---|---|---|---|---|---|---|
| | INVENTORY QUANTITY | CARRIED-OVER INVENTORY QUANTITY | SALABLE INVENTORY QUANTITY | INVENTORY QUANTITY | CARRIED-OVER INVENTORY QUANTITY | SALABLE INVENTORY QUANTITY |
| 0 | 0 | 0 | 0 | 0 | 0 | 0 |
| 1 | 0 | 0 | 0 | 0.4 | 0.4 | 0 |
| 2 | 0 | 0 | 0 | 0.4 | 0.4 | 0 |
| 3 | 0 | 0 | 0 | 0.4 | 0.4 | 0 |
| 4 | 0.4 | 0.4 | 0 | 0 | 0 | 0 |
| 5 | 1.4 | 1.4 | 0 | 0 | 0 | 0 |
| 6 | 0.4 | 0.4 | 0 | 1 | 1 | 0 |
| 7 | 1.4 | 1.4 | 0 | 1 | 1 | 0 |
| 8 | 1.4 | 1.4 | 0 | 2 | 2 | 0 |
| 9 | 2.4 | 2.4 | 0 | 0 | 0 | 0 |
| 10 | 0 | 0 | 0 | 0 | 0 | 0 |
| 11 | 0 | 0 | 0 | 0.1 | 0 | 0.1 |
| 12 | 0 | 0 | 0 | 1.1 | 0 | 1.1 |
| 13 | 0 | 0 | 0 | 2.1 | 1 | 1.1 |
| 14 | 0 | 0 | 0 | 2.6 | 1.5 | 1.1 |
| 15 | 0 | 0 | 0 | 3.1 | 2 | 1.1 |
| 16 | 0 | 0 | 0 | 3.6 | 2.5 | 1.1 |
| 17 | 0 | 0 | 0 | 4.1 | 3 | 1.1 |
| 18 | 0 | 0 | 0 | 4.6 | 3.5 | 1.1 |
| 19 | 0 | 0 | 0 | 5.1 | 4 | 1.1 |
| 20 | 0 | 0 | 0 | 5.1 | 4 | 1.1 |
| 21 | 0 | 0 | 0 | 5.1 | 4 | 1.1 |
| 22 | 0 | 0 | 0 | 4.1 | 3 | 1.1 |
| 23 | 0 | 0 | 0 | 3.1 | 2 | 1.1 |
| 24 | 0 | 0 | 0 | 2.1 | 1 | 1.1 |
| 25 | 0 | 0 | 0 | 1.1 | 0 | 1.1 |
| 26 | 0 | 0 | 0 | 1.1 | 0 | 1.1 |
| 27 | 0 | 0 | 0 | 1.1 | 0 | 1.1 |
| 28 | 0 | 0 | 0 | 1.1 | 0 | 1.1 |
| 29 | 0 | 0 | 0 | 1.1 | 0 | 1.1 |

FIG. 68

| TERM | PRODUCT 1 | | | PRODUCT 2 | | |
|---|---|---|---|---|---|---|
| | PRICE | DIRECT PRODUCTION COST | INVENTORY COST COEFFICIENT | PRICE | DIRECT PRODUCTION COST | INVENTORY COST COEFFICIENT |
| 0 | 0 | 0 | 0 | 0 | 0 | 0 |
| 1 | 0.6 | 0.3 | 0.01 | 0.5 | 0.3 | 0.01 |
| 2 | 0.595 | 0.3 | 0.01 | 0.496 | 0.3 | 0.01 |
| 3 | 0.59 | 0.3 | 0.01 | 0.492 | 0.3 | 0.01 |
| 4 | 0.585 | 0.3 | 0.01 | 0.488 | 0.3 | 0.01 |
| 5 | 0.58 | 0.3 | 0.01 | 0.484 | 0.3 | 0.01 |
| 6 | 0.575 | 0.3 | 0.01 | 0.48 | 0.3 | 0.01 |
| 7 | 0.57 | 0.3 | 0.01 | 0.476 | 0.3 | 0.01 |
| 8 | 0.565 | 0.3 | 0.01 | 0.472 | 0.3 | 0.01 |
| 9 | 0.56 | 0.3 | 0.01 | 0.468 | 0.3 | 0.01 |
| 10 | 0.555 | 0.3 | 0.01 | 0.464 | 0.3 | 0.01 |
| 11 | 0.565 | 0.3 | 0.01 | 0.46 | 0.3 | 0.01 |
| 12 | 0.575 | 0.3 | 0.01 | 0.456 | 0.3 | 0.01 |
| 13 | 0.585 | 0.3 | 0.01 | 0.452 | 0.3 | 0.01 |
| 14 | 0.595 | 0.3 | 0.01 | 0.448 | 0.3 | 0.01 |
| 15 | 0.605 | 0.3 | 0.01 | 0.444 | 0.3 | 0.01 |
| 16 | 0.615 | 0.3 | 0.01 | 0.44 | 0.3 | 0.01 |
| 17 | 0.625 | 0.3 | 0.01 | 0.436 | 0.3 | 0.01 |
| 18 | 0.635 | 0.3 | 0.01 | 0.432 | 0.3 | 0.01 |
| 19 | 0.645 | 0.3 | 0.01 | 0.428 | 0.3 | 0.01 |
| 20 | 0.655 | 0.3 | 0.01 | 0.424 | 0.3 | 0.01 |
| 21 | 0.665 | 0.3 | 0.01 | 0.42 | 0.3 | 0.01 |
| 22 | 0.675 | 0.3 | 0.01 | 0.416 | 0.3 | 0.01 |
| 23 | 0.685 | 0.3 | 0.01 | 0.412 | 0.3 | 0.01 |
| 24 | 0.695 | 0.3 | 0.01 | 0.408 | 0.3 | 0.01 |
| 25 | 0.705 | 0.3 | 0.01 | 0.404 | 0.3 | 0.01 |
| 26 | 0.715 | 0.3 | 0.01 | 0.4 | 0.3 | 0.01 |
| 27 | 0.725 | 0.3 | 0.01 | 0.396 | 0.3 | 0.01 |
| 28 | 0.735 | 0.3 | 0.01 | 0.392 | 0.3 | 0.01 |
| 29 | 0.745 | 0.3 | 0.01 | 0.388 | 0.3 | 0.01 |

FIG. 69A

| TERM | DEPARTMENT EXPENDITURE ||| SALES ||| MARGINAL PROFIT |||
| --- | --- | --- | --- | --- | --- | --- | --- | --- | --- |
| | COMMON FIXED COST | TOTAL INVENTORY COST | FIXED RESOURCE COST | SALES PLAN | PRODUC-TION PLAN | FIXED SALES | SALES PLAN | PRODUC-TION PLAN | FIXED SALES |
| 0 | | | | | | | | | |
| 1 | 0.1 | 0.004 | 0.3 | 0.5 | 0.5 | 0.3 | 0.5 | 0.5 | 0.3 |
| 2 | 0.1 | 0.004 | 0.2975 | 0.496 | 0.496 | 0.496 | 0.196 | 0.196 | 0.196 |
| 3 | 0.1 | 0.004 | 0.2925 | 0.492 | 0.492 | 0.492 | 0.1945 | 0.1945 | 0.1945 |
| 4 | 0.1 | 0.004 | 0.2875 | 0.5268 | 0.5268 | 0.488 | 0.2343 | 0.2343 | 0.1955 |
| 5 | 0.1 | 0.014 | 0.2825 | 0.58 | 0.58 | 0 | 0.2925 | 0.2925 | 0 |
| 6 | 0.1 | 0.014 | 0.2775 | 0.48 | 0.48 | 0.575 | 0.1975 | 0.1975 | 0.2925 |
| 7 | 0.1 | 0.024 | 0.2725 | 0.57 | 0.57 | 0 | 0.2925 | 0.2925 | 0 |
| 8 | 0.1 | 0.034 | 0.2675 | 0.472 | 0.472 | 0 | 0.1995 | 0.1995 | 0 |
| 9 | 0.1 | 0.024 | 0.2656 | 0.56 | 0.56 | 0.936 | 0.2925 | 0.2925 | 0.401 |
| 10 | 0.1 | 0 | 0.02575 | 0.555 | 0.555 | 1.887 | 0.2925 | 0.2925 | 0.9945 |
| 11 | 0.1 | 0.001 | 0.2525 | 0.5125 | 0.5125 | 0 | 0.255 | 0.02025 | 0 |
| 12 | 0.1 | 0.011 | 0.2475 | 0.456 | 0.456 | 0 | 0.2035 | 0.2035 | 0 |
| 13 | 0.1 | 0.021 | 0.12125 | 0.452 | 0.452 | 0 | 0.2045 | 0.2045 | 0 |
| 14 | 0.1 | 0.026 | 0.11875 | 0.224 | 0.224 | 0 | 0.10275 | 0.10275 | 0 |
| 15 | 0.1 | 0.031 | 0.11625 | 0.222 | 0.222 | 0 | 0.10325 | 0.10325 | 0 |
| 16 | 0.1 | 0.036 | 0.11375 | 0.22 | 0.22 | 0 | 0.10375 | 0.10375 | 0 |
| 17 | 0.1 | 0.041 | 0.11125 | 0.218 | 0.218 | 0 | 0.10425 | 0.10425 | 0 |
| 18 | 0.1 | 0.046 | 0.10875 | 0.216 | 0.216 | 0 | 0.10475 | 0.10475 | 0 |
| 19 | 0.1 | 0.051 | 0 | 0.214 | 0.214 | 0 | 0.10525 | 0.10525 | 0 |
| 20 | 0.1 | 0.051 | 0 | 0 | 0 | 0 | 0 | 0 | 0 |
| 21 | 0.1 | 0.051 | 0 | 0 | 0 | 0 | 0 | 0 | 0 |
| 22 | 0.1 | 0.041 | 0 | 0 | 0 | 0.416 | 0 | 0 | 0.2135 |
| 23 | 0.1 | 0.031 | 0 | 0 | 0 | 0.412 | 0 | 0 | 0.2145 |
| 24 | 0.1 | 0.021 | 0 | 0 | 0 | 0.408 | 0 | 0 | 0.2155 |
| 25 | 0.1 | 0.011 | 0 | 0 | 0 | 0.404 | 0 | 0 | 0.2165 |
| 26 | 0.1 | 0.011 | 0 | 0 | 0 | 0 | 0 | 0 | 0 |
| 27 | 0.1 | 0.011 | 0 | 0 | 0 | 0 | 0 | 0 | 0 |
| 28 | 0.1 | 0.011 | 0 | 0 | 0 | 0 | 0 | 0 | 0 |
| 29 | 0.1 | 0.011 | 0 | 0 | 0 | 0 | 0 | 0 | 0 |

FIG. 69B

| DEPARTMENT CASH FLOW | | | | | | |
|---|---|---|---|---|---|---|
| TERM | EXISTING CF | PRODUCTION PLAN CF | SALES PLAN CF | INVENTORY SALES CF AT PRESENT TIME | P1 SURPLUS CAPACITY CF | P2 SURPLUS CAPACITY CF |
| 0 | | | | | | |
| 1 | 0.196 | 0.196 | 0.196 | 0.196 | 0.196 | 0.196 |
| 2 | 0.288 | 0.288 | 0.288 | 0.288 | 0.288 | 0.288 |
| 3 | 0.3785 | 0.3785 | 0.3785 | 0.3785 | 0.3785 | 0.3785 |
| 4 | 0.47 | 0.47 | 0.47 | 0.47 | 0.47 | 0.47 |
| 5 | 0.0685 | 0.0685 | 0.0685 | 0.0685 | 0.0685 | 0.0685 |
| 6 | 0.247 | 0.247 | 0.247 | 0.247 | 0.247 | 0.247 |
| 7 | -0.1545 | -0.1545 | -0.1545 | -0.1545 | -0.1545 | 0.02775 |
| 8 | -0.561 | -0.561 | -0.561 | -0.561 | -0.561 | -0.37875 |
| 9 | -0.0165 | -0.0165 | -0.0165 | -0.0165 | -0.0165 | 0.16575 |
| 10 | 1.508 | 1.508 | 1.508 | 1.508 | 1.508 | 1.793 |
| 11 | 1.38125 | 1.42825 | 1.663 | 1.42725 | 1.705 | 1.8165 |
| 12 | 1.01775 | 1.53075 | 1.7655 | 0.51935 | 1.8075 | 2.02275 |
| 13 | 0.64925 | 1.16225 | 1.397 | 1.14645 | 1.439 | 1.7585 |
| 14 | 0.402 | 0.915 | 1.14975 | 0.8948 | 1.368 | 1.616 |
| 15 | 0.15225 | 0.66525 | 0.9 | 0.64065 | 1.302 | 1.4715 |
| 16 | -0.1 | 0.413 | 0.64775 | 0.384 | 1.241 | 1.43075 |
| 17 | -0.35475 | 0.15825 | 0.393 | 0.12485 | 1.185 | 1.3885 |
| 18 | -0.612 | -0.099 | 0.13575 | -0.1368 | 1.134 | 1.34475 |
| 19 | -0.87175 | -0.35875 | -0.124 | -0.40095 | 1.088 | 1.2995 |
| 20 | -1.02275 | -0.50975 | -0.275 | -0.55635 | 1.3795 | 1.364 |
| 21 | -1.17375 | -0.66075 | -0.426 | -0.71175 | 1.686 | 1.4295 |
| 22 | -0.89875 | -0.38575 | -0.151 | -0.44115 | 2.4335 | 1.922 |
| 23 | -0.61775 | -0.10475 | 0.13 | -0.16455 | 3.202 | 2.4215 |
| 24 | -0.33075 | 0.18225 | 0.417 | 0.11805 | 3.9915 | 2.928 |
| 25 | -0.03775 | 0.47525 | 0.71 | 0.40665 | 4.802 | 3.4415 |
| 26 | -0.14875 | 0.36425 | 0.599 | 0.29125 | 5.2235 | 3.3305 |
| 27 | -0.25975 | 0.25325 | 0.488 | 0.17585 | 5.66 | 3.2195 |
| 28 | -0.37075 | 0.14225 | 0.377 | 0.06045 | 6.1115 | 3.1085 |
| 29 | -0.48175 | 0.03125 | 0.266 | -0.05495 | 6.578 | 2.9975 |

PRODUCTION CONTROL SYSTEM, PRODUCTION CONTROL METHOD AND PRODUCTION CONTROL PROGRAM

CROSS REFERENCE TO RELATED APPLICATIONS

This application is a divisional of U.S. application Ser. No. 10/628,343, filed Jul. 29, 2003 now U.S. Pat. No. 7,092,776 and is based upon and claims the benefit of priority from the prior Japanese Patent Application Nos. P2002-221814, P2002-221949, and P2002-221994 filed on Jul. 30, 2002, the entire contents of each of which are incorporated herein by reference.

BACKGROUND OF THE INVENTION

1. Field of the Invention

The present invention relates to a production control system, a production control method and a production control program, which are for calculating an effective surplus production quantity, a consolidated contribution profit and a change in time of cash flows at each production location in the flow of producing a product.

2. Description of the Related Art

In the case of producing products at a certain production department in general, parts produced at various production locations, for instance, a lower-level department, another company or an outside manufacturer, are used. These parts, along with parts produced at the production department are then assembled. Thus, the products are produced. Moreover, the production department products may become parts of a plurality of products at a plurality of other production locations. As described above, through the various production locations, the products at a certain production department come to marketable final products.

A surplus production quantity for products P at a certain production department is determined by a surplus production capability of the production department with regard to the products P and a surplus production quantity of parts related to the products P. When a surplus production quantity of parent products using the products P as their parts is relatively smaller than the surplus production quantity of the products P of the certain production department, even if the products P are produced for the surplus production quantity, not all of the products P can be processed at production locations of the parent products. Consequently, inventory of the products occur. Thus, estimation for production/sales by the surplus production quantity is limited by the surplus production quantity of the parent products. Moreover, the parent products are also influenced by a surplus production quantity of their parent products. However, in the case where products of a certain department pass through a complex route before becoming final products, it is difficult to perform an appropriate estimation for production/sales by the surplus production quantity.

Meanwhile, when products are produced and sold in a certain production department, a profit contribution is made not only by a profit earned in the production department but also by production and sales of product parts in an upstream. The upstream profit is included, for example, in the material cost of the product and the product is sold in the production department by further accumulating the profit on the material cost. In such a manner, profits are earned at respective production locations in the flow of the product. When a plurality of production locations in the flow mutually belong to a department such as an entire company or an operational headquarter, profit contributions made at these locations mutually contribute to a consolidated profit of the department. However, it is difficult to calculate the profit contribution of each product, because, the profit contribution of each destination profits from the product of the production department in the flow of producing the product, and thus is complicated.

Furthermore, in production of a product at a certain production department, plans for production and inventory for the product based on a sales plan are required. However, in preparing the production and inventory plans, it is difficult to know the cash flows of the product in real time.

SUMMARY OF THE INVENTION

A first aspect of the present invention is to provide a production control system for producing products from parts, the production control system, comprising: a) a product data obtaining module configured to obtain product data including an effective surplus production quantity from a parent product production location, which is a location producing parent products using the products as their direct parts; b) a part data obtaining module configured to obtain part data including a surplus production quantity from a part production location producing the parts; c) an effective surplus production quantity calculation module configured to calculate an effective surplus production quantity of a production department which produces the products from the parts based on the effective surplus production quantity and the surplus production quantity; d) a part data transmission module configured to transmit part data including an effective surplus production quantity of the production department to the part production location; and, e) a product data transmission module configured to transmit product data including a surplus production quantity of their products to the parent production location.

A second aspect of the present invention is to provide a production control system for producing products from parts, the production control system, comprising: a) a product data obtaining module configured to obtain product data including a consolidated contribution profit from a parent product production location, which is a location producing parent products using the products as their direct parts; b) a part data obtaining module configured to obtain part data including an upstream consolidated contribution profit from a part production location producing the parts; c) a consolidated contribution profit calculation module configured to calculate an upstream consolidated contribution profit of a production department producing the products from the parts based on the upstream consolidated contribution profit, and calculate a consolidated contribution profit of the production department based on the consolidated contribution profit and the upstream consolidated contribution profit; d) a product data transmission module configured to transmit product data including the upstream consolidated contribution profit of the production department to the parent product production location; and, e) a part data transmission module configured to transmit part data including the consolidated contribution profit of the production department to the part production location.

A third aspect of the present invention is to provide a production control system for producing products from parts, the production control system comprising: a) a production scheduler configured to prepare a schedule table by use of data changed in an event where product data, part data, a process master and a resource table, which are required for preparing the schedule table of the products, are changed; and, b) a CF data calculation module configured to obtain product data, a resource table and department data concerning the department producing the product using the parts according to the schedule table, and calculate cash flows based on the product data, the resource table and the department data.

A forth aspect of the present invention is to provide a production control system for producing products from parts, the production control system comprising: a) an upper-level department CF data obtaining module configured to obtain upper-level organization CF data from a parent department, which is an upper-level department to which a production department producing the products by use of the parts belongs; b) an lower-level department CF data obtaining module configured to obtain lower-level department CF data from child departments, which are lower-level departments which belong to the production department; c) a CF data calculation module configured to calculate a cash flow of the production department based on product data, a resource table and department data of the production department, and calculate an upper-level consolidated cash flow based on the cash flows of the production department and the upper-level department CF data, and calculate a lower-level consolidated cash flows based on the cash flows of the production department and the lower-level department CF data; d) an upper-level department CF data transmission module configured to transmit any of the cash flows of the production department and the lower-level consolidated cash flows to the parent department; and, e) a lower-level department CF data transmission module configured to transmit any of the cash flows of the production department and the upper-level consolidated cash flows to the child department.

A fifth aspect of the present invention is to provide a production control system for producing products from parts, the production control system, comprising: a) means for obtaining product data including an effective surplus production quantity from a parent product production location, which is a location producing parent products using the products as their direct parts; b) means for obtaining part data including a surplus production quantity from a part production location producing the parts; c) means for calculating an effective surplus production quantity of a production department which produces the products from the parts based on the effective surplus production quantity and the surplus production quantity; d) means for transmitting part data including an effective surplus production quantity of the production department to the part production location; e) means for transmitting product data including a surplus production quantity of their products to the parent production location.

A sixth aspect of the present invention is to provide a production control system for producing products from parts, the production control system, comprising: a) means for obtaining product data including a consolidated contribution profit from a parent product production location, which is a location producing parent products using the products as their direct parts; b) means for obtaining part data including an upstream consolidated contribution profit from a part production location producing the parts; c) means for calculating an upstream consolidated contribution profit of a production department producing the products from the parts based on the upstream consolidated contribution profit, and calculating a consolidated contribution profit of the production department based on the consolidated contribution profit and the upstream consolidated contribution profit; d) means for transmitting product data including the upstream consolidated contribution profit of the production department to the parent product production location; and, e) means for transmitting part data including the consolidated contribution profit of the production department to the part production location.

A seventh aspect of the present invention is to provide a production control system for producing products from parts, the production control system comprising: a) means for preparing a schedule table by use of data changed in an event where product data, part data, a process master and a resource table, which are required for preparing the schedule table of the products, are changed; and, b) means for obtaining product data, a resource table and department data concerning the department producing the product using the parts according to the schedule table, and calculating cash flows based on the product data, the resource table and the department data.

A eighth aspect of the present invention is to provide a production control system for producing products from parts, the production control system comprising: a) means for obtaining upper-level organization CF data from a parent department, which is an upper-level department to which a production department producing the products by use of the parts belongs; b) means for obtaining lower-level department CF data from child departments, which are lower-level departments which belong to the production department; c) means for calculating a cash flow of the production department based on product data, a resource table and department data of the production department, and calculating an upper-level consolidated cash flow based on the cash flows of the production department and the upper-level department CF data, and calculating a lower-level consolidated cash flow based on the cash flows of the production department and the lower-level department CF data; d) means for transmitting any of the cash flows of the production department and the lower-level consolidated cash flows to the parent department; and, e) means for transmitting any of the cash flows of the production department and the upper-level consolidated cash flows to the child department.

A ninth aspect of the present invention is to provide a production control method for producing products from parts, the method comprising: a) obtaining product data including an effective surplus production quantity from a parent product production location, which is a location producing parent products using the products as their direct parts; b) obtaining part data including a surplus production quantity from a part production location producing the parts; c) calculating an effective surplus production quantity of a production department, which produces the products from the parts, based on the effective surplus production quantity and the surplus production quantity; and, d) transmitting part data including an effective surplus production quantity of the production department to the part production location.

A tenth aspect of the present invention is to provide a production control method for producing products from parts, the method, comprising: a) obtaining product data including a consolidated contribution profit from a parent product production location, which is a location producing parent products using the products as their direct parts; b) obtaining part data including an upstream consolidated contribution profit from a part production location producing the parts; c) calculating an upstream consolidated contribution profit of a production department producing the products from the parts based on the upstream consolidated contribution profit; d) calculating a consolidated contribution profit of the production department based on the consolidated contribution profit and the upstream consolidated contribution profit; e) transmitting product data including the upstream consolidated contribution profit of the production department to the parent product production location; and, f) transmitting part data including the consolidated contribution profit of the production department to the part production location.

A eleventh aspect of the present invention is to provide a production control method for producing products from parts, the method, comprising: a) changing product data, part data, a process master and a resource table, which are required for preparing a schedule table of the products; b) preparing the schedule table using data after the change; c) obtaining department data of a production department producing the products using product data, a resource table and the parts according to the schedule table; and, d) calculating cash flows based on the product data, the resource table and the department data.

A twelfth aspect of the present invention is to provide a production control method for producing products from parts, the method, comprising: a) obtaining upper-level department CF data from a parent department, which is an upper-level organization to which a production department producing the products from the parts belongs; b) obtaining lower-level department CF data from child departments, which are lower-level departments which belong to the production department; c) calculating cash flows of the production department based on product data, a resource table and department data of the production department; d) calculating an upper-level consolidated cash flow based on the cash flows of the production department and the upper-level department CF data; e) calculating a lower-level consolidated cash flow based on the cash flows of the production department and the lower-level department CF data; f) transmitting any of the cash flows of the production department and the lower-level consolidated cash flows to the parent department; and, g) transmitting any of the cash flows of the production department and the upper-level consolidated cash flows to the child department.

A thirteenth aspect of the present invention is to provide a production control computer program product to be executed by a computer for producing products from parts, comprising: a) instructions configured to obtain product data including an effective surplus production quantity from a parent product production location, which is a location producing parent products using the products as their direct parts; b) instructions configured to obtain part data including a surplus production quantity from a part production location producing the parts; c) instructions configured to calculate an effective surplus production quantity of a production department which produces the products from the parts based on the effective surplus production quantity and the surplus production quantity; and, d) instructions configured to transmit part data including an effective surplus production quantity of the production department to the part production location.

A fourteenth aspect of the present invention is to provide a production control computer program product to be executed by a computer for producing products from parts, comprising: a) instructions configured to obtain product data including a consolidated contribution profit from a parent product production location, which is a location producing parent products using the products as their direct parts; b) instructions configured to obtain part data including an upstream consolidated contribution profit from a part production location producing the parts; c) instructions configured to calculate an upstream consolidated contribution profit of a production department producing the products from the parts based on the upstream consolidated contribution profit; d) instructions configured to calculate a consolidated contribution profit of the production department based on the consolidated contribution profit and the upstream consolidated contribution profit; e) instructions configured to transmit product data including the upstream consolidated contribution profit of the production department to the parent product production location; and, f) instructions configured to transmit part data including the consolidated contribution profit of the production department to the part production location.

A fifteenth aspect of the present invention is to provide a production control computer program product to be executed by a computer for managing production from parts to products, comprising: a) instructions configured to change product data, part data, a process master and a resource table, which are required for preparing a schedule table of the products; b) instructions configured to prepare the schedule table using data after the change; c) instructions configured to obtain department data of a production department producing the products from product data, a resource table and the parts according to the schedule table; and, d) instructions configured to calculate cash flows based on the product data, the resource table and the department data.

A sixteenth aspect of the present invention is to provide a production control computer program product to be executed by a computer for managing production from parts to products, comprising: a) instructions configured to obtain upper-level department CF data from a parent department, which is an upper-level department to which a production department producing the products using the parts belongs; b) instructions configured to obtain lower-level department CF data from child departments, which are lower-level departments which belong to the production department; c) instructions configured to calculate cash flows of the production department based on product data, a resource table and department data of the production department; d) instructions configured to calculate an upper-level consolidated cash flow based on the cash flows of the production department and the upper-level department CF data; e) instructions configured to calculate a lower-level consolidated cash flow from the cash flows of the production department and the lower-level department CF data; f) instructions configured to transmit any of the cash flows of the production department and the lower-level consolidated cash flows to the parent department; and, f) instructions configured to transmit any of the cash flows of the production department and the upper-level consolidated cash flows to the child department.

BRIEF DESCRIPTION OF DRAWINGS

FIG. 4 is a table showing an example of a process master according to the embodiment of the present invention.

FIG. 5 is a table showing an example of a resource master according to the embodiment of the present invention.

FIGS. 6A to 6C are tables showing an example of product data according to the embodiment of the present invention.

FIG. 7 is a table showing an example of part data according to the embodiment of the present invention.

FIG. 8 is a table showing an example of department data according to the embodiment of the present invention.

FIG. 9 is a table showing an example of an order table according to the embodiment of the present invention.

FIG. 10 is a table showing an example of a resource table according to the embodiment of the present invention.

FIG. 11 is a table showing an example of a schedule table according to the embodiment of the present invention.

FIG. 18 is a table partially extracted from the schedule table according to the embodiment of the present invention.

FIG. 19 is a table showing an update of the resource table according to the embodiment of the present invention.

FIG. 20 is a table showing an update of the schedule table according to the embodiment of the present invention.

FIG. 21 is a table showing an update of the resource table according to the embodiment of the present invention.

FIG. 22 is a table showing an update of the schedule table according to the embodiment of the present invention.

FIG. 23 is a table showing an update of the resource table according to the embodiment of the present invention.

FIG. 24 is a table showing an update of the schedule table according to the embodiment of the present invention.

FIG. 25 is a table showing an update of the resource table according to the embodiment of the present invention.

FIG. 26 is a table showing an update of the resource table according to the embodiment of the present invention.

FIG. 27 is a table showing an update of the resource table according to the embodiment of the present invention.

FIG. 28 is a table showing an update of the order table according to the embodiment of the present invention.

FIG. 29 is an order table with items of an expected demand quantity and its certainty factor added according to the embodiment of the present invention.

FIG. 30 is an order table with an item of an internal quantity added according to the embodiment of the present invention.

FIG. 31 is a table showing an update of the resource table according to the embodiment of the present invention.

FIG. 32 is a table showing an update of the schedule table according to the embodiment of the present invention.

FIG. 33 is a table showing an update of the resource table according to the embodiment of the present invention.

FIG. 34 is a table showing an update of the schedule table according to the embodiment of the present invention.

FIG. 35 is a table showing an update of the resource table according to the embodiment of the present invention.

FIG. 36 is a table showing an update of the order table with an item of price added according to the embodiment of the present invention.

FIG. 37 is a table showing an update of the resource table with an item of price added according to the embodiment of the present invention.

FIG. 38 is a table partially extracted from the schedule table according to the embodiment of the present invention.

FIG. 39 is a table showing an update of the resource table according to the embodiment of the present invention.

FIG. 40 is a table showing an update of the schedule table according to the embodiment of the present invention.

FIG. 41 is a table showing an update of the resource table according to the embodiment of the present invention.

FIG. 42 is a table showing an update of the schedule table according to the embodiment of the present invention.

FIG. 43 is a table showing an update of the resource table according to the embodiment of the present invention.

FIG. 44 is a table showing an update of the schedule table according to the embodiment of the present invention.

FIG. 45 is a table showing an update of the resource table according to the embodiment of the present invention.

FIG. 46 is a table showing an update of the resource table according to the embodiment of the present invention.

FIG. 47 is a table showing an update of the order table according to the embodiment of the present invention.

FIG. 48 is a table showing an update of the resource table according to the embodiment of the present invention.

FIGS. 53A to 53C are tables showing an example of data used for the calculation of the effective surplus production quantity according to the first embodiment of the present invention.

FIG. 55 is a view showing a method for calculating an upstream consolidated contribution profit according to the second embodiment of the present invention.

FIG. 56 is a view showing a method for calculating a consolidated contribution profit according to the second embodiment of the present invention.

FIG. 60 is a table showing an aggregation of consolidated departments according to the second embodiment of the present invention.

FIG. 61 is a table showing unconsolidated contribution profits according to the second embodiment of the present invention.

FIG. 62 is a table showing quantities of parts used according to the second embodiment of the present invention.

FIG. 63 is a table showing the upstream consolidated contribution profit according to the second embodiment of the present invention.

FIG. 64 is a table showing the consolidated contribution profit according to the second embodiment of the present invention.

FIG. 66 is a table showing an example of product data according to the third embodiment of the present invention.

FIG. 67 is a table showing breakdowns of quantities of inventory shown in FIG. 66.

FIG. 68 is a table showing examples of product price, production direct cost and inventory cost coefficient according to the third embodiment of the present invention.

FIGS. 69A and 69B are tables showing calculation examples of department data according to the third embodiment of the present invention.

DETAILED DESCRIPTION OF THE INVENTION

Figure 1:
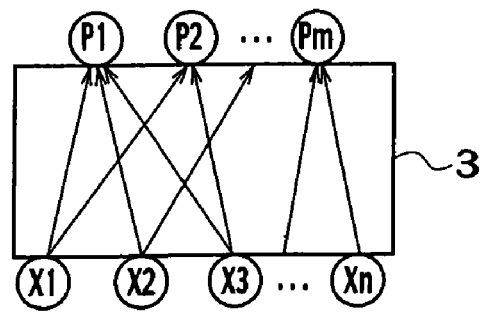
FIG. 1 is a view showing a relationship between products and parts according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Mode Example of Production)

First, description will be given of a relationship between products and parts in a production control method according to an embodiment of the present invention. In the following description, as to the product P produced in a certain production department, it is assumed that parts directly constituting the product P are "parts of product P" and production locations where the parts are produced are "part production locations of product P." Similarly, it is assumed that a product using the product P as a direct part thereof is "a parent product of product P" and a production location where the parent product is produced is "a parent product production location of product P." In addition, it is assumed that the parent product of the product P and a parent product further using the parent product of the product P as its part are "downstream products of product P" and production locations thereof are "downstream product production locations of product P." Moreover, it is assumed that the parts of the product P and a grandchild product using the parts of the product P to produce a product are "upstream products of product P" and production locations thereof are "upstream product production locations of product P."

In a certain production department, the department is assumed to produce m kinds of products Pi (i=1, 2, ... m). In order to produce these products, the department purchases n kinds of parts Xj (j=1, 2, ... n) from the outside. Each of the parts Xj becomes parts of one or more of the products Pi of the department. This relationship will be shown in FIG. 1. In FIG. 1, the square in the center of the drawing indicates a production location 3 (the department in this case) and the arrows show relationships regarding how the parts Xj become parts of the products Pi. For example, the part X1 becomes parts of the products P1 and P2.

Figure 2:
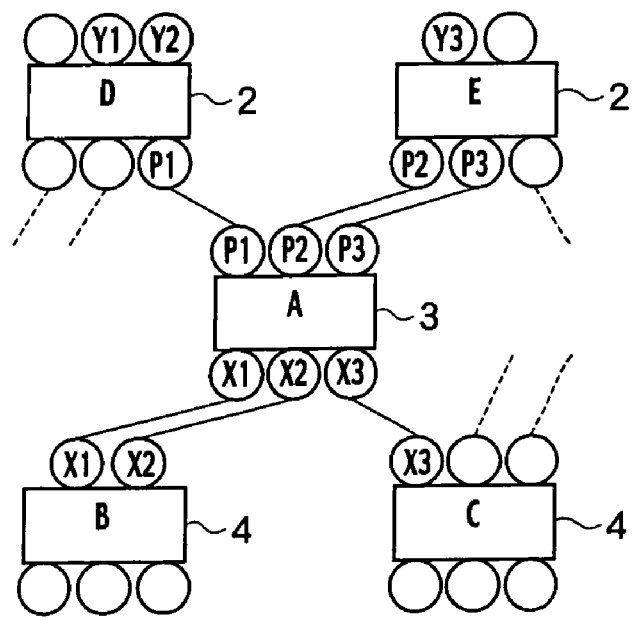
FIG. 2 is a view showing flows of the products according to the embodiment of the present invention.

Connection of such productions in multiple stages creates flows of the products as shown in FIG. 2. Herein, it is shown that the product P1 of the production location A becomes a part of the production location D and that the products P2 and P3 of the department A become parts of the production location E. The production location D becomes the parent product production location 2 of the product P1, and the production location E becomes the parent product production location 2 of the products P2 and P3. Moreover, it is shown that the parts X1 and X2 of the production location A are products of the production location B and that the part X3 of the production location A is a product of the production location C. The production location B becomes the part production location 3 of the parts X1 and X2, and the production location C becomes the part production location 3 of the part X3. Even if the products are of the same kind, those products are assumed to be different from each other if the production locations where the products are incorporated as parts are different from each other.

(Constitutional Example of Department)

Figure 3:
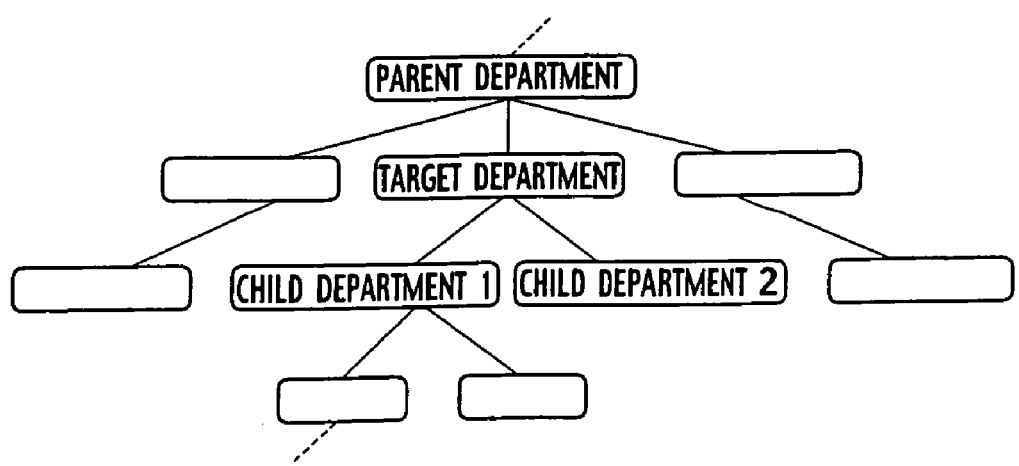
FIG. 3 is a view showing an example of a department structure according to the embodiment of the present invention.

Next, description will be given of a relationship between departments in the production control method according to the embodiment of the present invention. The term "department" used herein represents a department in a relationship wherein it belongings to another department when a flow of capital and profit is considered independently of the flow of products and parts. For example, the relationship can be such that a factory is in a lower-level department of a head office and a manufacturing department is in a lower-level department of the factory. In the following description, it is assumed that an upper-level department to which a target department (hereinafter referred to as a "target department") directly belongs is a "parent department" and a lower-level department that directly belongs to the target department is a "child department." The respective departments include a maximum of one parent department and more than zero child department(s). FIG. 3 is a constitutional example of the departments and shows that the target department has one parent department and two child departments. In the embodiment of the present invention, description will be given of a department, as a target, which has the parent and child departments and produces and sells products in the target department. Among the departments, there may be one which has no parent or child department or one which does not perform the production/sales in the target department. However, the present invention is also applicable to these departments.

EXAMPLE OF EACH DATA

Next, description will be given of a process master, a resource master, product data, part data, department data, a resource table, an order table and a schedule table, all of which are used in the production control method according to the embodiment of the present invention.

The process master is data concerning production processes of respective products A, B, . . . at a certain production location. As shown in FIG. 4, in the process master, recorded are: a product ID inherent in each product; a process ID inherent in a process required to produce the product; a process order showing an order relation among the processes; minimum and maximum periods required for executing the processes; a process offset; a resource ID inherent in a resource provided to execute each process; and a resource usage that indicates a unit quantity required by each process in using the resource. Here, the "process offset" indicates how many days it has to wait to start the next process after the previous process has started, or within how many days the next process has to be finished after the previous process is finished. Moreover, "resource" means, for example, parts, and in this case, the number of necessary parts is indicated as the "resource usage." Alternatively, when "resource" means a machine, the time of the machine usage is indicated as the "resource usage."

As shown in FIG. 5, in the resource master, it is recorded whether each resource is an internal resource in the production location (inside resource), or a subcontract resource outside the production location (outside resource). When the resource is a subcontract resource, it is handing an order of parts to the production location of the parts is required.

As shown in FIG. 6A, the product data is data of the respective products Pi (i=1, 2, . . . ) for each production period, the data including (a) product price, (b) production direct cost, (c) marginal profit and the like. Moreover, as shown in FIG. 6B, the product data also retains data concerning production and sales quantities in each production period, the data including (d) planned sales quantity, (e) planned production quantity, (f) fixed sales quantity, (g) inventory quantity and the like. Furthermore, as shown in FIG. 6C, the product data also retains (h) surplus production quantity, (i) upstream consolidated contribution profit, (j) effective surplus production quantity and (k) consolidated contribution profit, all of which follow the production flow. Besides the above, the product data also retains a fixed quantity for parent products and a requested quantity of parent products, which will be described later. Here, the "upstream consolidated contribution profit" means a contribution profit per product to the target department from the upstream product production location. The "consolidated contribution profit" means a contribution profit per product to the downstream production location from the target department. Moreover, "surplus production quantity" means a surplus quantity of machines or parts at the target department and the upstream product production location. "Effective surplus production quantity" means an amount in the surplus production quantity, which can be actually used by being passed on to other departments.

As shown in FIG. 7, the part data is data of each part for each production period, the data including (a) surplus production quantity, (b) upstream consolidated contribution profit, (c) effective surplus production quantity, (d) consolidated contribution profit and the like. Besides the above, the part data also retains a fixed quantity of parts and a desired quantity for parts, which will be described later.

As shown in FIG. 8, the department data is data of the whole department for each production period, the data including costs, sales, profits, various cash flows and the like. The costs include: a common fixed cost of the department in each production period; an inventory cost required for inventory control of all products at the department or of delivered parts; and a fixed resource cost required to purchase a resource such as parts. The common fixed cost may be retained and calculated, for example, by further detailed items such as the salary of an employee in each production period and the heating and lighting cost. Moreover, the sales and profits may be retained and calculated in detail by each product, and by each related department or the like. As to the profits, the department data may retain and calculate a net profit and the like besides the marginal profit.

The order table is a table obtained by extracting data required to make an ordering plan from the product data. As shown in FIG. 9, the order table includes: an order ID inherent in an order from a parent product production location; start time of each production period; end time thereof, a production ID; a fixed quantity for parent products; a requested quantity of parent products; a surplus production quantity for the parent products; and the like.

As to each of the resources required to produce products, such as machines, labor and parts, the resource table retains situations of using these resources in each production period and the like. As shown in FIG. 10, the resource table includes: start time of each production period; end time thereof, a fixed quantity of parts; a desired quantity for parts; a surplus production quantity of parts; a planned quantity; and the like. The fixed quantity of parts, the desired quantity for parts and surplus production quantity of parts are extracted from the part data.

The schedule table is a table obtained by scheduling production periods of processes corresponding to order IDs in production locations. As shown in FIG. 11, the schedule table includes: an order ID; a process ID; start time of each process; end time thereof, a process offset; a resource ID; a number of types of resources used; costs; and the like.

Figure 12:
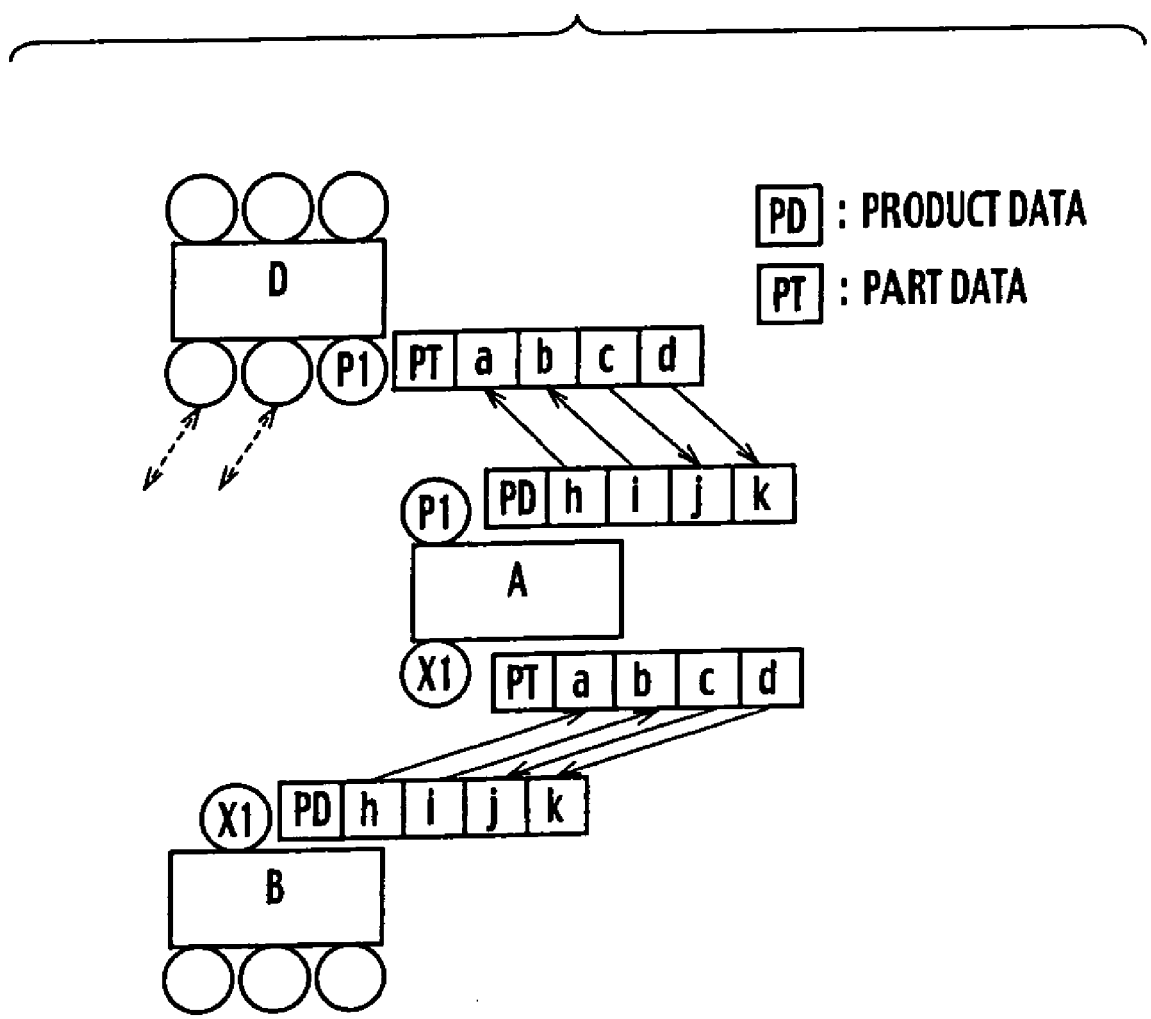
FIG. 12 is a view showing a flow of the product and part data according to the embodiment of the present invention.

Next, along with the production flow, description will be given of transmission/reception of the product data and part data with reference to FIG. 12. Assuming the department to be A, the product P1 is produced from the part X1 in A. It is assumed that the part production location of the product P1 is B and the parent product production location of the product P1 is D. Between the department A and the part production location B, the data is exchanged as follows.

From the department A, as to the part X1, (c) effective surplus production quantity and (d) consolidated contribution profit of the part data are transmitted to the part production location B. The part production location B obtains this transmitted data by a product data obtaining module 11 and retains the data as (j) effective surplus production quantity and (k) consolidated contribution profit of the product data. The part production location B transmits (h) surplus production quantity and (i) upstream consolidated contribution profit of the part X1, as the product data, to the department A from a product data transmission module 13. The department A obtains this transmitted data by a part data obtaining module 18 and retains the data as (a) surplus production quantity and (b) upstream consolidated contribution profit of the part data. Between the department A and the parent product production location D, data exchange similar to the above is performed.

EXAMPLE OF PRODUCTION CONTROL SYSTEM CONFIGURATION

Figure 13:
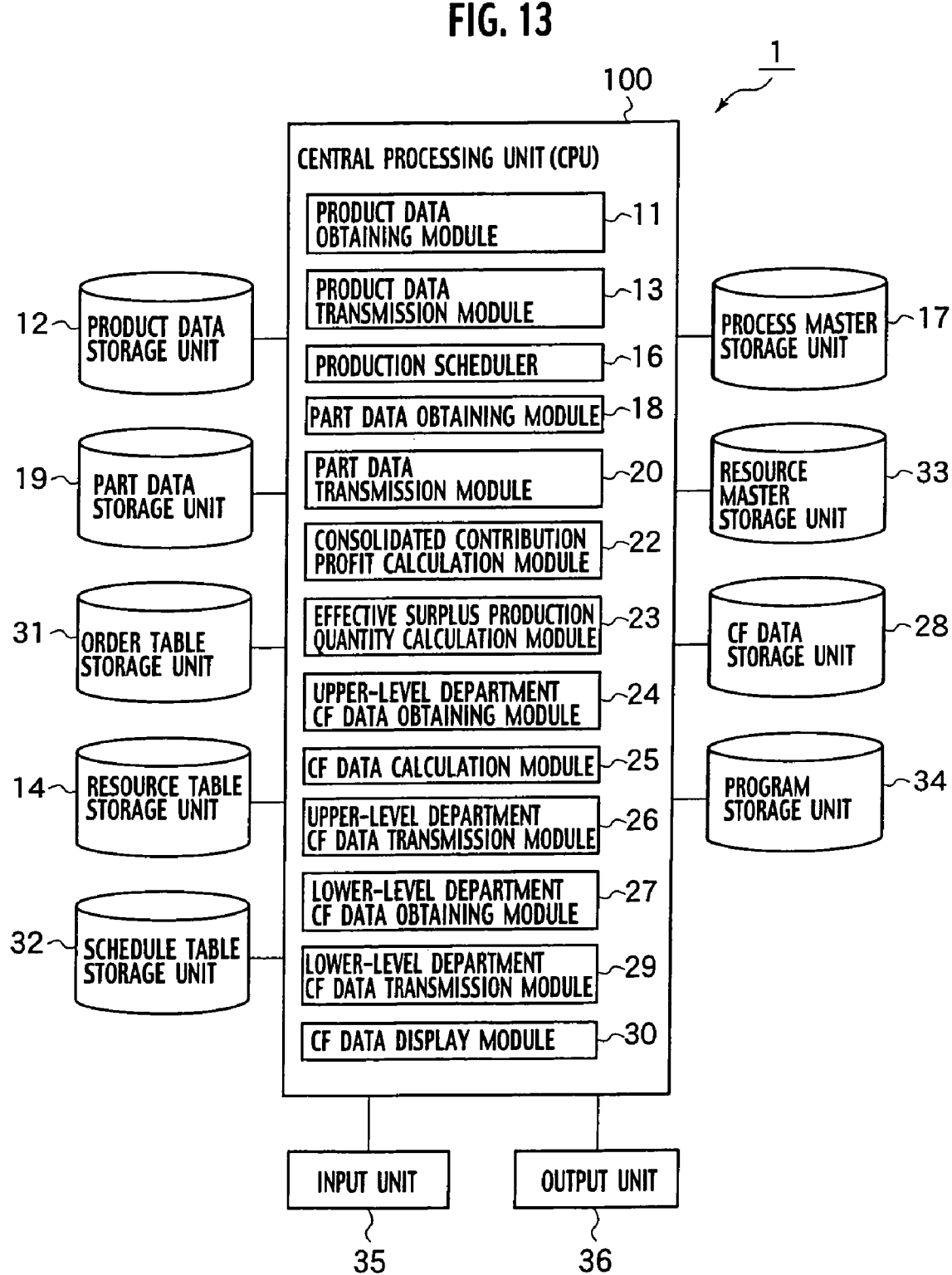
FIG. 13 is a block diagram of a production control system according to the embodiment of the present invention.
Figure 14:
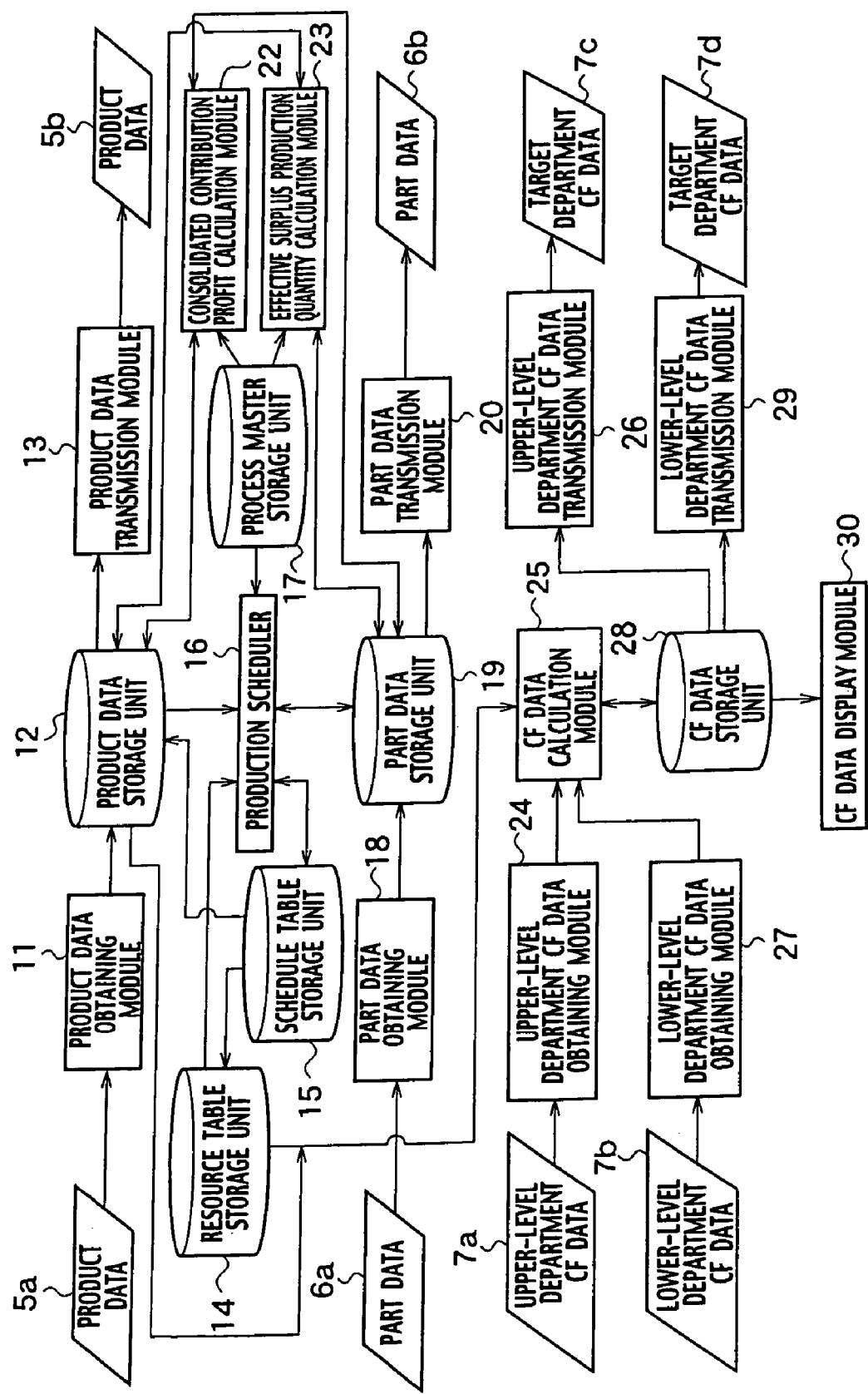
FIG. 14 is a data flow diagram of the production control system according to the embodiment of the present invention.

As shown in FIGS. 13 and 14, a production control system 1 according to the embodiment of the present invention includes: a product data obtaining module 11 which obtains product data 5a from a parent product production location; a product data storage unit 12 which retains and edits the product data; a product data transmission module 13 which transmits product data 5b to the parent product production location; a part data obtaining module 18 which obtains part data 6a from a part production location; a part data storage unit 19 which retains and edits the part data; and a part data transmission module 20 which transmits part data 6b to the part production location. Moreover, the production control system 1 also includes: a consolidated contribution profit calculation module 22 which calculates an upstream consolidated contribution profit and a consolidated contribution profit from the product data, a process master and the part data; and an effective surplus production quantity calculation module 23 which calculates an effective surplus production quantity from the product data 5a, the process master and the part data 6a. Furthermore, the production control system 1 also includes a production scheduler 16 which prepares a schedule table of a desired production period by use of the product data 5a, the part data 6a, the process master, a schedule table and a resource table as inputs. The production scheduler 16 may use cash flow data as its input.

A process master storage unit 17 retains the process master. A resource table storage unit 14 retains the resource table. A schedule table storage unit 15 retains schedule tables of products of the production department, such as a schedule for use of machines and a schedule for use of parts, which are prepared by the production scheduler 16. When the schedule tables are prepared by the production scheduler 16, the following quantities are changed along therewith, including: planned quantities and the like of the resource table; (e) planned production quantity and (g) inventory quantity of the production data; and the like. An order table storage unit 31 retains order tables. A schedule table storage unit 32 retains the schedule tables. A resource master storage unit 33 retains a resource master.

Furthermore, the production control system 1 according to the embodiment of the present invention includes: an upper-level department CF data obtaining module 24 which obtains upper-level department CF data 7a such as various cash flows, profits and sales of an upper-level department; a lower-level department CF data obtaining module 27 which obtains lower-level department CF data 7b such as various cash flows, profits and sales of a lower-level department; a CF data calculation module 25 which calculates data such as various cash flows, profits and sales of a target department from the product data, the resource tables, the upper-level department CF data 7a and the lower-level department CF data 7b; a CF data storage unit 28 which retains CF data and department data of the target department; a CF data display module 30 which displays the CF data of the target department, the CF data including the upper-level department or the lower-level department and the like on an output unit 36; an upper-level department CF data transmission module 26 which transmits the CF data 7c of the target department to the upper-level department; and a lower-level department CF data transmission module 29 which transmits the CF data 7d of the target department to the lower-level department. The term "CF data" used herein represents cash flow data.

Moreover, the production control system 1 according to the embodiment of the present invention may include a program storage unit 34, an input unit 35 and the output unit 36. The program storage unit 34 retains programs for executing calculations of the effective surplus production quantity, the consolidated contribution profit or the cash flows. For the program storage unit 34, an internal storage such as a RAM may be used and an external storage such as an HD or an FD may be also used. The input unit 35 specifically means instruments such as a keyboard and a mouse. When an input operation is performed by the input unit 35, corresponding key information is transmitted to a central processing unit (CPU) 100. The output unit 36 means a screen such as a monitor and a liquid crystal display (LCD), a light emitting diode (LED) panel, an electroluminescence (EL) panel and the like. Moreover, the output unit 36 may be a printer or the like.

(Ordering Plan Supporting Method)

Next, on the premise of the production control method according to the embodiment of the present invention, description will be given of an ordering plan supporting method for performing an ordering plan at the production location 3 based on the product data received as the part data of the parent product production location 2.

Figure 15:
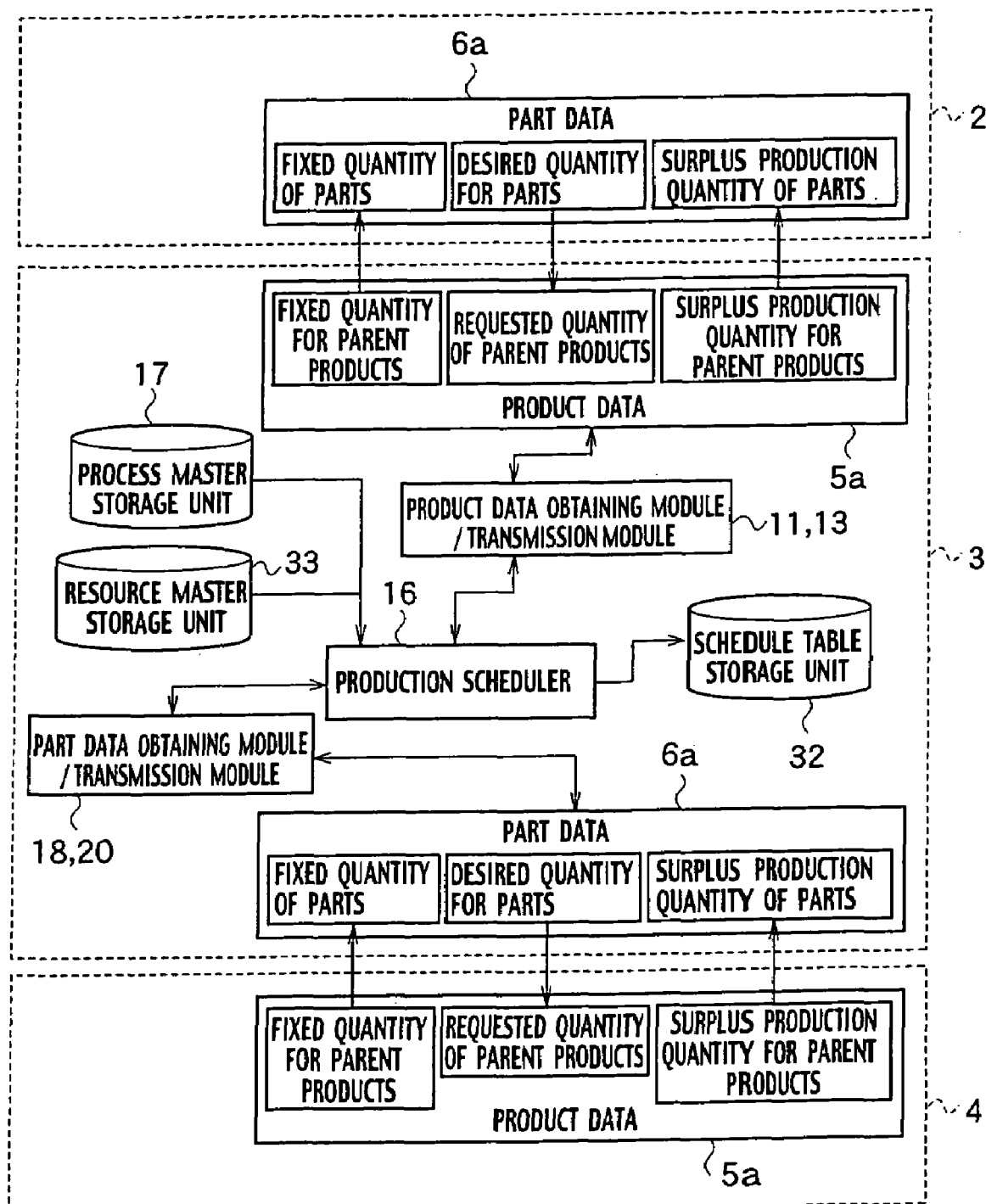
FIG. 15 is a schematic view explaining an ordering plan of the production control system according to the embodiment of the present invention.

As shown in FIG. 15, the ordering plan made for producing products is performed, for example, in the production control system in which an ordering origin A that is a product manufacturer passes an order of parts to an own company/ target department B that is a part manufacturer and the own company/ target department B further passes an order of detailed parts to a resource supplier C that is a part manufacturer. Here, the own company/ target department B corresponds to the production location 3, the ordering origin A corresponds to the parent product production location 2 and the resource supplier C corresponds to the part production location 4.

The production location 3 obtains the product data 5a including the fixed quantity for parent products, the requested quantity of parent products and the surplus production quantity for parent products from the parent product production location 2 and transmits the part data 6a including the fixed quantity of parts, the desired quantity for parts and surplus production quantity of parts to the part production location 4. The requested quantity of parent products in the product data 5a is updated by the desired quantity for parts in the part data 6a, the fixed quantity for parent products in the part data 6a is updated by the fixed quantity of parts in the product data 5a, and surplus production quantity of parts in the part data 6a is updated by the surplus production quantity for parent products in the product data 5a.

In the production location 3, when the product data obtaining module 11 receives the requested quantity of parent products from the parent product production location 2, the production scheduler 16 writes the changed contents thereof to the schedule table. The production scheduler 16 performs calculations by use of the order indicated in the requested quantity of parent products as a target order. After a series of calculations, the part data transmission module 20 transmits the part data 6a, to which the desired quantity for parts is written, to the part production location 4.

The outline of the calculations by the production scheduler 16 is, for example, described as follows.

First, scheduling is performed for orders of products transmitted from the parent product production location by changing quantities within the requested quantity of parent products. Accordingly, by comparing feasibility, costs and the like between a schedule of the current fixed quantity for parent products and a schedule established by the requested quantity of parent products, it is determined whether or not the requested quantity of parent products is accepted. Thus, a new fixed quantity for parent products is determined. Furthermore, based on a margin for the fixed quantity of parts, which can be used by each order, or surplus production quantity of parts, the surplus production quantity for parent products of each order is calculated.

Figure 16:
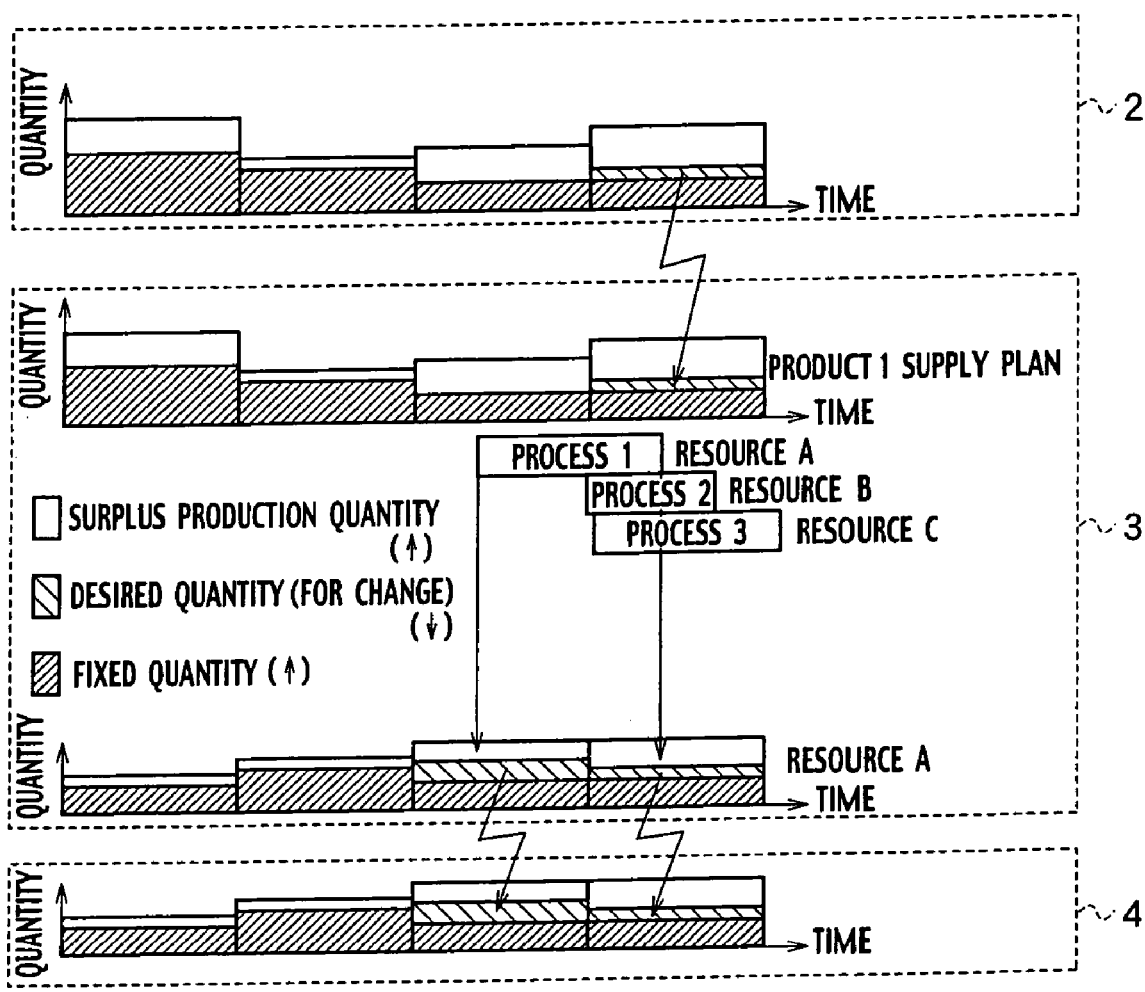
FIG. 16 is a view showing a relationship between a resource plan and scheduling according to the embodiment of the present invention.

FIG. 16 is a view showing a relationship between a resource plan and scheduling. In FIG. 16, respective quantity data of the product data and part data shown in FIG. 15 are shown by graphs for each period. The lateral axis indicates time and is sectioned for each period. The longitudinal axis indicates quantities and shows surplus production quantities and fixed quantities. Here, regarding a change of a newly generated desired quantity, an ordering plan is examined.

In an order table, an ordering quantity for each period is registered as a table for each specified product (product 1 in FIG. 16). Basically, each period can be allowed to correspond to one order, and process development of each order is made possible. For example, as shown in FIG. 16, it is assumed that, in order to produce a specified quantity for the last period, processes 1 to 3 are required and resources A to C are required for the respective processes. In this case, as to the resource A, the resource usage including resources used by other orders and other products is calculated as shown in FIG. 2 and the quantity is adjusted with the resource supplier C supplying the resource A.

The above-described resource usage is calculated similarly for various products, orders and resources. Thus, it is possible to establish plans of resources required to produce respective products. The schedule of the processes 1 to 3 shown in FIG. 16 is not fixed but is adjustable depending on situations of resources used.

Figure 17:
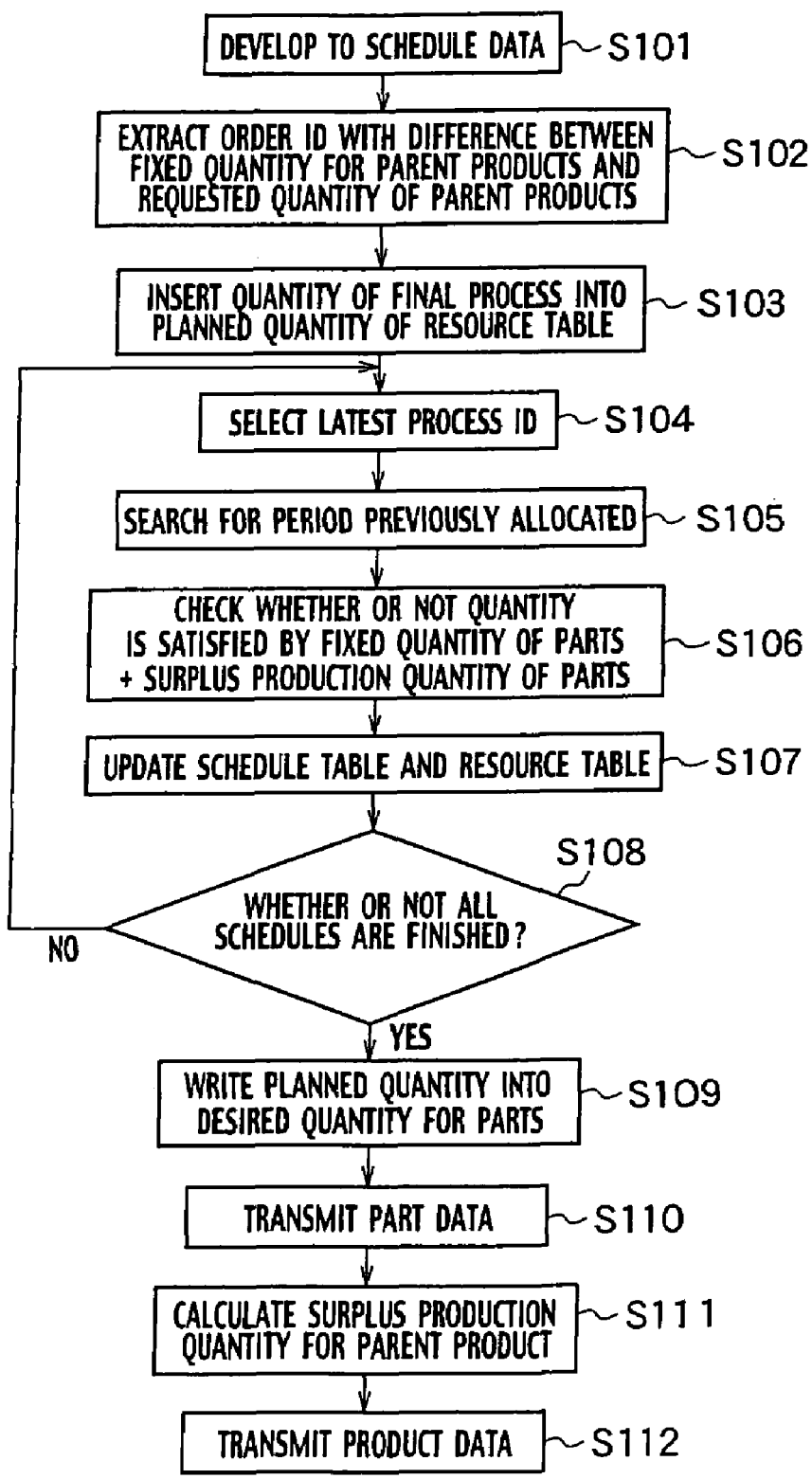
FIG. 17 is a flowchart of a scheduling method according to the embodiment of the present invention.

Next, with reference to FIG. 17, the ordering plan supporting method using the foregoing system will be described in detail. At this time, it is assumed that the order table is as that shown in FIG. 9 and the resource table is as that shown in FIG. 10.

Here, R01 is an inside resource and is assumed to be a fixed resource amount. Thus, in FIG. 10, values are entered only in the fixed quantity of parts regarding R01. Moreover, R02 is an outside resource and thus a quantity negotiation with the part production location 4 is carried out. In this example, R02 is still in a stage prior to carrying out the quantity negotiation, and thus values are entered only in the surplus production quantity of parts.

(a) In Step S101, as an initial condition, the production scheduler 16 refers to the order table (FIG. 9), process master (FIG. 4) and resource master (FIG. 5) and develops these tables into a schedule table as shown in FIG. 11. In the schedule table, processes, process periods (start and end dates), process offsets, resource IDs, resource usage, costs and the like for orders of products are recorded. In this example, for simplicity, the period of the last process is fixed in accordance with the process period to the order. However, the period of the last process may be basically set in any way as long as the last process is within the period of the order.

(b) Next, in Step S102, the production scheduler 16 extracts an order ID, which has a difference between the fixed quantity for parent products and the requested quantity of parent products in the order table, as an order ID with a change. In FIG. 9, the requested quantity of parent products of the order IDs "A-2" and "B-3" are changed, and thus these two order IDs are developed. In order to recalculate this schedule, these orders are extracted and a quantity of required resources is calculated on the basis of the requested quantity of parent products. The result of the calculation is shown in FIG. 18. Here, "quantity" means a value obtained by multiplying the requested quantity of parent products by the resource usage. The calculations are performed by rounding numbers after the decimal point. In the order ID "A-2", the requested quantity of parent products is "2", and thus, with reference to FIG. 4, a quantity of R01 for the process ID "A001" is 2×1=2 and a quantity of R02 for the process ID "A002" is 2×2=4. Similarly, in the order ID "B-3", the requested quantity of parent products is "5", and thus, with reference to FIG. 4, a quantity of R01 for the process ID "B001" is 5×1=5, a quantity of R02 for the process ID "B002" is 5×1=5 and a quantity of R01 for the process ID "B003" is 5×0.5=2.5 (3 as rounded up).

(c) Next, in Step S103, in the schedule table of FIG. 18, the quantities "4" and "3" of the respective last processes "A002" and "B003" of the order IDs "A-2" and "B-3" are entered into the planned quantities of resource data. This resource data is shown in FIG. 19. Here, resource use plans of other orders are all 0 and thus are not considered. However, if another resource use plan exists, the resource usage thereof is calculated and resource ID quantities of the already fixed processes of a target order are further calculated.

(d) Next, a schedule of the above-described orders is prepared. Here, for simplicity, only a simple backward calculation is performed. However, much better solutions are obtained by use of Lagrangian Relaxation (Y. Zhang, et al, "A Macro-level Scheduling Method Using Lagrangian Relaxation," IEEE Transactions on Robotics and Automation, Vol. 17, No. 1, pp. 70-79, February 2001). The simple backward calculation is performed as follows.

(1) One of processes is selected. The process is selected from the previous ones and thus B-3/B002 in the schedule table is first selected (S104).

(2) A period which has the same time range as that of a period of a later process B-3/B003, a previously allocated one, is searched (S105). In this case, since the offset of the later process is 2, the period is from 1/19 to 1/29. It is checked whether or not the quantity 5 is satisfied by the sum of the fixed quantity of parts, plus surplus production quantity of parts during this period (satisfied in this case) (S106). Accordingly, the schedule table is updated as shown in FIG. 20 and the resource table is updated as shown in FIG. 21 (S107). Here, as shown in FIG. 21, the quantity 5 is allocated to the periods of R02, which includes the one from 1/11 to 1/20 and the one from 1/21 to 1/31, in the proportion of 1:4.

(3) One of the processes is selected to be next. The process is selected from the previous ones and thus B-3/B001 is selected.

(4) A period which has the same time range as that of a period of a later process B-3/B002, a previously allocated one, is searched. In this case, since the offset of the later process is 1, the period is from 1/18 to 1/28. Also, during this period, it is checked whether or not the quantity 5 is satisfied by the sum of the fixed quantity of parts, plus surplus production quantity of parts (satisfied in this case). Accordingly, the schedule table is updated as shown in FIG. 22 and the resource table is updated as shown in FIG. 23. Here, the quantity 5 is allocated to the periods of R01, which includes the one from 1/11 to 1/20 and the one from 1/21 to 1/31, in the proportion of 1:4.

(5) One of the processes is selected to be next. The process is selected from the previous ones and thus A-2/A001 is selected.

(6) A period which has the same time range as that of a period of a later process A-2/A002, a previously allocated one, is searched. In this case, since the offset of the later process is 1, the period is from 1/10 to 1/19. It is checked whether or not the quantity 2 is satisfied by the sum of the fixed quantity of parts, plus surplus production quantity of parts during this period (satisfied in this case). Accordingly, the schedule table is updated as shown in FIG. 24 and the resource table is updated as shown in FIG. 25.

When all of the schedules are completed (S108) as described above, a schedule with the requested quantity of parent products added is prepared. In this case, all quantity requests are accepted without any shortage of resources. However, if the resources come short or the costs run high, a schedule will not be accepted for the requested quantity of parent products.

(e) Next, in Step S109, as shown in FIG. 26, planned quantities are written into the desired quantities for parts in the resource table. The desired quantities for parts are transmitted to the part production location 4 where R02 as the outside resource is produced (S110), thus prompting the parent product side to readjust. The part data transmitted to the part production location 4 of R02 is as that shown in FIG. 27.

(f) Next, in Step S111, a surplus production quantity for parent products by use of available resources is calculated in this state. An order table with the result of the calculation added is shown in FIG. 28. Various methods are conceivable for calculating the available resources. For example, there is a method in which trial scheduling is performed by changing quantities in several patterns, and the largest acceptable quantity is set to be the surplus production quantity for parent products. However, here, for simplicity of the description, quantities of resources required for the respective processes are calculated by starting from the last process and a quantity of an order corresponding to a quantity of the most critical resource is set to be the surplus production quantity.

For example, when the order 3-A is considered, the period is fixed in the case of A-3/A002 and thus a remaining quantity is as few as six. Going back to the previous processes, nineteen of the resources of A-3/A001 can be secured. Thus, A-3/A002 is considered to be the most critical. Therefore, a quantity coefficient of A002 is 2 and the surplus production quantity is 3. Thereafter, in Step S112, the calculated surplus production quantity for parent products is transmitted to the parent product production location 4 as the product data.

In the above-described manner, a schedule is calculated for the requested quantity of parent products by use of fixed quantity for parts and surplus production quantity of parts of necessary resources, which are calculated by the process development. Thus fixed quantity for parent products and surplus production quantity for parent products are calculated and the desired quantity for parts is calculated by use of the requested quantity of parent products. Consequently, smooth quantity negotiations are made possible between the receiving side and the ordering side.

Moreover, in the embodiment, the two kinds of orders, the orders A and B, are addressed in the same table. However, these two orders may be data for different parent products from each other. Specifically, according to the embodiment of the present invention, the quantity negotiations for respective clients can be carried out independently, and each of the negotiations is based on actual implementation and delivery plans. Thus, it becomes unnecessary to prepare quantity plans and schedules by use of different modules as in the conventional case. As a result, an extremely efficient production control system is obtained.

Moreover, the production control system according to the embodiment of the present invention is suitable for a mode in which an ordering relationship is also established between departments, which are subsystems in the whole company, wherein each of the departments is responsible for its own decision making. Each of the departments can openly and independently make ordering plans for clients outside the company. Thus, it is possible to prevent confusion in decision making such as seen in a conventional centralized system, and to execute smooth production activities corresponding to demand fluctuations.

In the foregoing embodiment, the quantities of the lower-level parts are adjusted by use of the requested quantity of parent products of the upper level as a trigger. However, in this method, the upper-level quantities are not fixed unless the parts of the lowest level are confirmed each time the requested quantity of parent products is entered. Accordingly, if the parts of the intermediate level can be produced in advance to some extent by use of a demand prediction, the response is enhanced from a supply-chain point of view, although a risk of inventory increases still remains. Next, description will be given of an embodiment of calculating the desired quantity for parts by use of this demand prediction.

As an example, it is assumed that, from a state where predictions and certainty factors are all zero, the predictions and the certainty factors are entered as shown in FIG. 29. Here, internal quantities which are temporary quantities are calculated, based on the fixed quantity for parent products, the requested quantity of parent products, the predicted demand quantity and the certainty factor.

An example of a formula for the internal quantity is shown below.

```
If requested quantity of parent products
     < predicted demand quantity then
  requested quantity of parent products
  + (predicted demand quantity
  − (requested quantity of parent products)) ÷ certainty factor
Else
     Requested quantity of parent products
Endif
```

An order table with the calculation result of the internal quantities added by use of the above formula is shown in FIG. 30. Moreover, the resource table at the current point in time is assumed to be as that shown in FIG. 31.

The production scheduler 16 refers to these orders, process master and resource master as an initial state, and, as described above, develops this data into the schedule table as shown in FIG. 11. Note that the process master and the resource master are similar to those described in the foregoing embodiment and therefore description thereof will be omitted. In this example, for simplicity, the period of the last process is fixed in accordance with the process period of the order. However, the period of the last process may be basically set in any way as long as the last process is within the period of the order.

Here, the schedules are recalculated similarly to the foregoing embodiment, not based on the requested quantity of parent products in the order table but based on the internal quantities. Thus, these orders are extracted and the quantities are first developed based on the internal quantities. The result thereof is shown in FIG. 32. Moreover, the resource table is previously updated as the initial state. The result thereof is shown in FIG. 33.

Here, when the backward calculations are performed similarly to the foregoing embodiment, the schedule table as shown in FIG. 34 is obtained, and the resource table as shown in FIG. 35 is obtained. Note that a method for calculating the surplus production quantity for parent products is exactly the same as that used in the foregoing embodiment and therefore description thereof will be omitted.

In this embodiment, it is apparent that the desired quantities for parts of R02 are larger than those in the foregoing embodiment. This implies that, although the requested quantity of parent products are the same, the resource R02 is ordered in advance by carrying out calculations in consideration for the demand prediction.

As described above, corresponding to the demand prediction of each period, the resource can be ordered in advance. Accordingly, the fixed quantity of parts can be increased in advance without changing the fixed quantity for parent products. Thus, when the requested quantity of parent products is increased later, the fixed quantity can be immediately answered without changing and adjusting the desired quantity for parts. Consequently, the response of the supply chain can be enhanced.

Next, description will be given of another embodiment in which costs are simultaneously considered.

It is assumed that the order table at the current point in time is as that shown in FIG. 36. Here, @50 after the quantity indicates that a price per product is 50. Furthermore, it is assumed that the resource table at the current point in time is as that shown in FIG. 37.

The production scheduler 16 refers to these orders, process master and resource master as an initial state, and, similarly to the foregoing embodiment, develops this data into the schedule table as shown in FIG. 11. Note that the process master and the resource master are similar to those described in the foregoing embodiment and therefore, description thereof will be omitted.

Here, in the order table, the orders, each of which has a difference between the fixed quantity for parent products and the requested quantity of parent products, are treated as those with changes. These orders are extracted in order to recalculate the schedules thereof and the quantities are previously developed based on the requested quantity of parent products. The result thereof is shown in FIG. 38. Moreover, the resource table is previously updated as the initial state. The result thereof is shown in FIG. 39.

Next, schedule data of these orders is prepared. Here, similar to the simple backward calculation described above, the following calculation is carried out.

(1) One of the processes is selected. Since a later process is selected first, B-3/B002 is selected first.

(2) A period which has the same time range as that of a period of the later process B-3/B003, a previously allocated one, is searched for. In this case, since the offset of the later process is 2, the period of B-3/B002 is from 1/19 to 1/29. It is checked whether or not the quantity 5 is satisfied by the sum of the fixed quantity of parts, and surplus production quantity of parts during this period (satisfied in this case). Accordingly, the schedule table is updated as shown in FIG. 40 and the resource table is updated as shown in FIG. 41. Here, as shown in FIG. 11, the quantity 5 is allocated to the period of R02 from 1/11 to 1/20, and to the period of R02 from 1/21 to 1/31, in the proportion of 1 to 4, respectively.

(3) Next process is selected. Since a later process is selected first, B-3/B001 is selected.

(4) A period which has the same time range as that of a period of the later process B-3/B002, a previously allocated one, is searched for. In this case, since the offset of the later process is 1, the period of B-3/B001 is from 1/18 to 1/28. It is checked whether or not the quantity 5 is satisfied by the sum of the fixed quantity of parts, and surplus production quantity of parts also during this period (satisfied in this case). Accordingly, the schedule table is updated as shown in FIG. 42 and the resource table is updated as shown in FIG. 43. Here, the quantity 5 is allocated to the period of R01 from 1/11 to 1/20 and to the period of R01 from 1/21 to 1/31, in the proportion of 1 to 4, respectively.

(5) Next process is selected. Since a later process is selected first, A-2/A001 is selected.

(6) A period which has the same time range as that of a period of the later process A-2/A002, a previously allocated one, is searched for. In this case, since the offset of the later process is 1, the period of A-2/A001 is from 1/10 to 1/19. It is checked whether or not the quantity 2 is satisfied by the sum of the fixed quantity of parts, and surplus production quantity of parts during this period (satisfied in this case). Accordingly, the schedule table is updated as shown in FIG. 44 and the resource table is updated as shown in FIG. 45.

Schedule data added with the requested quantity of parent products is thus prepared. In this case, all the quantity requests are accepted without any shortage of resources. However, if a plan is short in resource or costs a lot, the plan cannot accept the requested quantity of parent products. Here, positive numbers obtained by subtracting the fixed quantities from the planned quantities are written into desired change quantities. The result thereof is shown in FIG. 46.

Furthermore, a surplus production quantity for parent products by use of available resources is calculated in this state.

Various methods are conceivable for calculating the available resources. For example, there is a method in which trial scheduling is performed in several patterns by changing quantities, and the largest acceptable quantity is set to be the surplus production quantity for parent products. However, here, for simplicity of the description, quantities of resources required for the respective processes are calculated by starting from the last process and a quantity of an order corresponding to a quantity of the most critical resource is set to be the surplus production quantity.

For example, when the order A-3 is considered, a remaining quantity in the case of A-3/A002 is only six since the period is fixed. Nineteen of the resources of A-3/A001 can be secured by going back to the previous processes. Thus, A-3/A002 is considered to be the most critical. The remaining quantity is divided by two, which is a quantity coefficient of A002, and three is thus obtained as the surplus production quantity.

Moreover, when the costs at this point in time are calculated, it is found that @40 per product is an estimated cost. However, the point in time is some time in the future. Therefore, if some clients buy the product at @60, as much as @20 is gained as a profit. Consequently, a strategy of advertising the products at the already fixed price is assumed.

Similarly, the calculations of the surplus production quantities of the respective orders are as follows. Only the first period is close to the time of a deal and therefore the advertised price is brought down to a price with minimum marginal profit.

The resource table thus obtained is shown in FIG. 47. The resource table is sent to the ordering side as a change.

Moreover, based on the resource table, a plan change, which is sent to the resource supplier side of R02, is prepared by replacing desired change quantities with the respective planned quantities. The contents thereof are shown in FIG. 48.

As described above, simultaneously with the schedules of the necessary resources, which are calculated by the process development, the product costs obtained by adding up the resource costs can be calculated. Thus, by utilizing the costs, the prices offered to the order receiving side and the ordering side can be also adjusted.

(First Embodiment)

Next, as a first embodiment of the present invention, description will be given of a production control method for calculating an effective surplus production quantity by use of the production control system according to the embodiment of the present invention, with reference to FIGS. 14 and 49.

Figure 49:
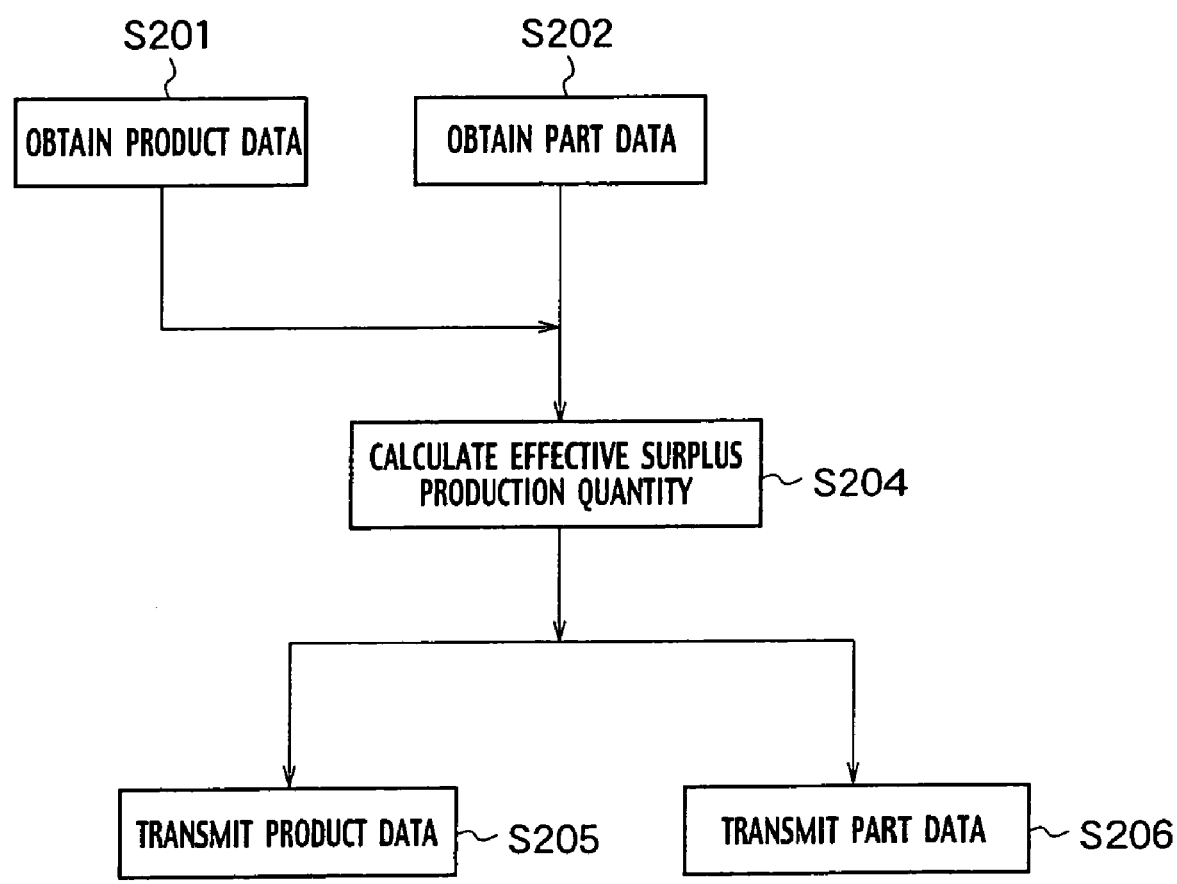
FIG. 49 is a flowchart of a production control method according to a first embodiment of the present invention.

(a) In Step S201 of FIG. 49, the production data obtaining unit 11 obtains the product data 5a from the parent product production location. This product data 5a is retained by the product data storage unit 12. Moreover, in Step S202, the part data obtaining module 18 obtains the part data 6a from the part production location. This part data is retained by the part data storage unit 19.

(b) Next, in Step S204, the effective surplus production quantity calculation module 23 calculates the effective surplus production quantity from the product data 5a retained by the product data storage unit 12, the part data 6a retained by the part data storage unit 19 and the process master retained by the process master storage unit 17. Specifically, the effective surplus production quantity is calculated by use of (a) surplus production quantity of the part data 6a, the resource usage of the process master and (j) effective surplus production quantity of the product data 5a. The effective surplus production quantity calculated herein is retained as (c) effective surplus production quantity of the part data 5b and is retained again by the part data storage unit 19. A calculation method for the effective surplus production quantity will be described later in detail. Moreover, the effective surplus production quantity calculation module 23 calculates the surplus production quantity from the part data retained by the part data storage unit 19 and the process master retained by the process master storage unit 17. The surplus production quantity calculated herein is retained as (h) surplus production quantity of the product data 5a and is retained again by the product data storage unit 12. A calculation method for the surplus production quantity will be described later in detail.

(c) Next, in Step S205, the product data transmission module 13 transmits the product data 5b including (h) surplus production quantity calculated by the effective surplus production quantity calculation module 23, to the parent product production location. Based on this product data 5b, the parent product production location can calculate the surplus production quantity at the parent product production location. Moreover, in Step S206, the part data transmission module 20 transmits the part data 6b including (c) effective surplus production quantity calculated by the effective surplus production quantity calculation module 23, to the part production location. Based on this part data 6b, the part production location can calculate the effective surplus production quantity at the part production location.

Figure 50:
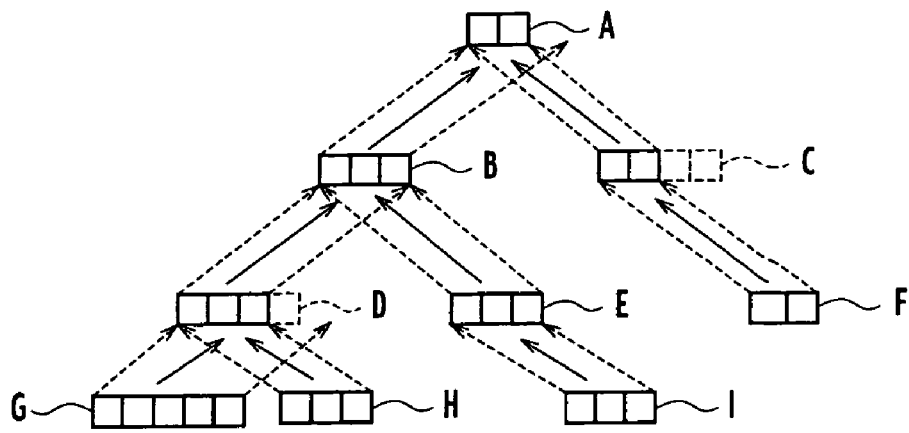
FIG. 50 is a view showing a flow of a surplus production quantity according to the first embodiment of the present invention.

Here, with reference to FIG. 50, a flow of the surplus production quantity will be described. In FIG. 50, surplus production quantities of products at respective production locations A to I are represented by the number of squares. The surplus production quantities of the production locations G and H, which are part production locations of the production location D, are 5 and 3, respectively. In consideration of the above numbers and part usage of the production location D, the surplus production quantity of the production location D is calculated to be 3. Similarly, the surplus production quantities of the production locations D and E, which are part production locations of the production location B, are both 3. In consideration of the above number and part usage of the production location B, the surplus production quantity of the production location B is calculated to be 3. Similarly, the surplus production quantities of the production locations B and C, which are part production locations of the production location A, are 3 and 2, respectively. In consideration of the above numbers and part usage of the production location A, the surplus production quantity of the production location A is calculated to be 2. In this manner, the surplus production quantities are sequentially determined based on data from the upstream.

Figure 51:
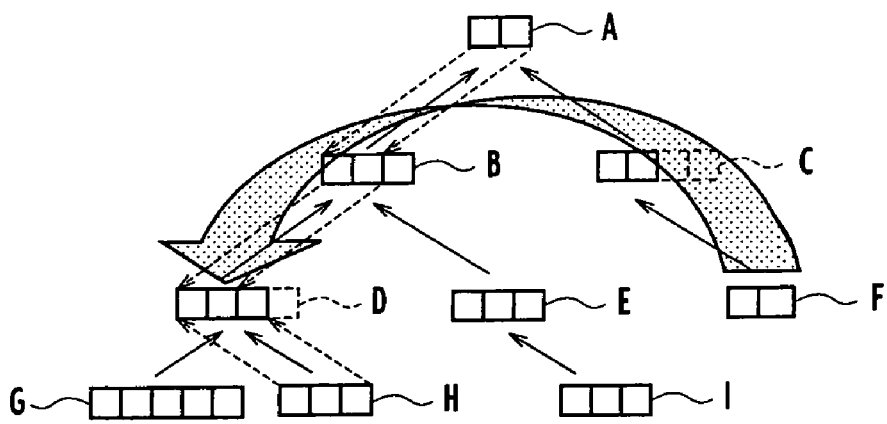
FIG. 51 is a view showing a flow of an effective surplus production quantity according to the first embodiment of the present invention.

Next, with reference to FIG. 51, a flow of the effective surplus production quantity will be described. In FIG. 51, similarly to those in FIG. 50, surplus production quantities of products at respective production locations A to I are represented by the number of squares. For example, the surplus production quantity at the production location D is 3, while the surplus production quantity at the production location A, which is a downstream production location, is 2. Therefore, an actually usable surplus production quantity is 2. Thus, the effective surplus production quantities are sequentially determined based on data from the downstream. Here, a value at the production location F, which has determined the surplus production quantity at the production location A to be 2, is referred to as a "bottleneck", that is, the minimum value of throughput in the production flow. In the case where the bottleneck exists in the product downstream including the target department, when the parts Xj are produced by the surplus production quantity, the parts Xj must be added to an inventory list at the target department or the production location of Xj. Accordingly, inventory management costs are increased. However, in general, it is difficult to keep track of proper production quantities at the respective production locations in a complex production flow.

By use of the production control method according to the embodiment of the present invention, the effective surplus production quantities including bottleneck information in the product downstream are passed on to the product upstream from the product downstream. Accordingly, a user can make a proper production plan for the surplus production quantities. Note that, as described above, the surplus production quantities of the products at the target department are determined by a surplus production capacity of the target department and surplus production quantities of parts related to the products. Therefore, the bottleneck information of the product upstream is included in the surplus production quantities and is passed on to the product downstream from the product upstream.

(Calculation Method for Effective Surplus Production Quantity)

Next, description will be given of a detailed calculation method for the effective surplus production quantity and a calculation method for a marginal profit and a cash flow by use of the effective surplus production quantity.

(a) Part Usage

First, in calculation of the effective surplus production quantity, it is necessary to know the quantities of parts used for each product. It is assumed that the products of the department are Pi (i=1, 2, . . . ) and parts of any of the products of the department are Xj (j=1, 2, . . . ). Each of the parts Xj may be a part of a plurality of products of the department. Information on which parts are used for each product is retained in the process master storage unit 17 as the process master.

The usage of the parts Xj per unit production quantity of the products Pi is assumed to be xij. Note that xij is a value obtained by conversion based on a unit production quantity of Xj. This value is retained in the process master storage unit 17. The number xij may vary from each other depending on production periods.

(b) Effective Surplus Production Quantity

When the surplus production quantities of the parts Xj are assumed to be $W_{Xj}[n]$, the effective surplus production quantities $W_{Xj}\text{-eff}[n]$, which are surplus quantities of the parts Xj acceptable in the department, are calculated as below.

$$W_{Xj}\text{-eff}[n]=\min\{W_{Xj}[n], \Sigma_i W_{Pi}\text{-eff}[n] \cdot xij\} \quad (1)$$

The effective surplus production quantities $W_{Xj}\text{-eff}[n]$ of the respective parts Xj are written in the part data and transmitted to the respective part production locations by the component data transmission unit 20.

As shown in the equation (1), the effective surplus production quantities are sequentially determined from the downstream of the products. In the equation (1), the effective surplus production quantities $W_{Pi}\text{-eff}[n]$ of the respective products Pi of the department are values similarly calculated as effective surplus production quantities of Pi in the parent product production locations of the respective products Pi. The values $W_{Pi}\text{-eff}[n]$ are obtained by the product data obtaining module 11 and retained in the product data. When the products Pi have no downstream products, the effective surplus production quantities $W_{Pi}\text{-eff}[n]$ of the products Pi in the equation (1) are equal to the surplus production quantities $W_{Pi}[n]$ of the products Pi.

Figure 52:
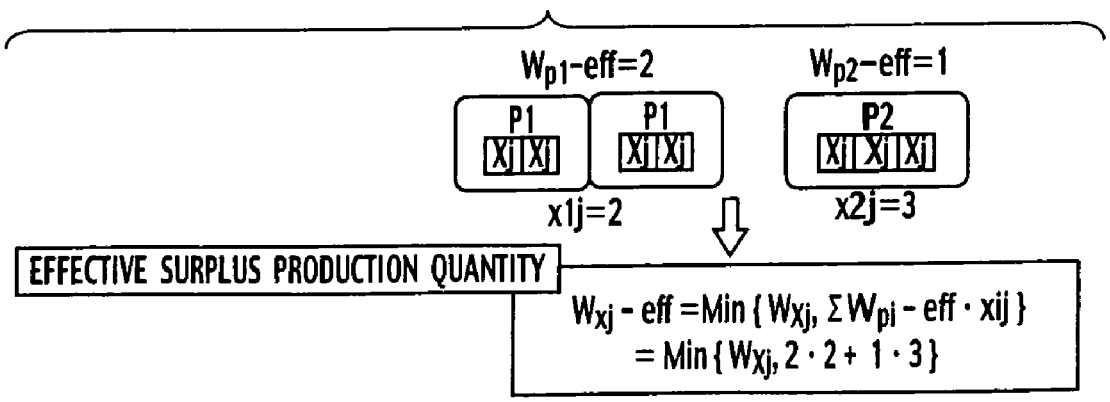
FIG. 52 is a view showing a calculation of the effective surplus production quantity according to the first embodiment of the present invention.

This calculation method will be described in detail with reference to FIG. 52. It is assumed that (a) surplus production quantities of the parts Xj included in the component data obtained from the component production locations are $W_{Xj}$, (j) effective surplus production quantities of the products Pi included in the product data obtained from the parent product production locations are $W_{Pi}\text{-eff}$, the usage of the components Xj included in the process master is xij and the effective surplus production quantities of the components xj which are calculated from the above data are $W_{Xj}\text{-eff}$. In FIG. 52, it is shown that the effective surplus production quantity $W_{P1}\text{-eff}$ of the product P1 is 2 and the effective surplus production quantity $W_{P2}\text{-eff}$ of the product P2 is 1. Moreover, it is shown that the usage x1j of the components Xj for the product P1 is 2 and the usage x2j of the components Xj for the product P2 is 3. From this data, the effective surplus production quantities $W_{Xj}\text{-eff}$ of the parts Xj becomes the minimum value obtained by adding $2(W_{P1}\text{-eff}) \times 2(x1j)$ and $1(W_{P2}\text{-eff}) \times 3(x2j)$. The calculated effective surplus production quantities $W_{Xj}\text{-eff}$ of the components Xj are stored in (c) effective surplus production quantities of the part data and are transmitted to the part production locations.

Next, a calculation example of the effective surplus production quantities by the equation (1) will be described with reference to the data. The product P1 of the department uses the components X1 and X2 as its parts and the product P2 uses the components X2 and X3 as its components. Here, data obtained by extracting the effective surplus quantities in the respective production periods (refer to the product data of FIG. 6C) from the product data of P1 and P2 is shown as an example in the table of FIG. 53A. Moreover, data obtained by extracting the surplus production quantities (refer to the part data of FIG. 7) from the component data of X1 to X3 is shown as an example in the table of FIG. 53B. Here, when the usage of the respective components for the products P1 and P2 is assumed to be 1, the effective surplus production quantities for each production period of the respective parts are calculated by the equation (1), as shown in FIG. 53C. This data is retained in the component data shown in FIG. 7 and transmitted to the respective component production locations from the component data transmission unit 20.

(c) Effective Surplus Production Quantities in Each Production Period

Next, description will be given of a method for calculating the effective surplus production quantities for each production period by use of the production control method according to the embodiment of the present invention. A lead time on a schedule until the products Pi are completed after the respective components Xj are received in the nth period is assumed to be $\Delta ij[n]$. In consideration of the lead time, the equation (1) is as below.

$$W_{Xj}\text{-eff}[n]=\min\{W_{Xj}[n], \Sigma_i W_{Pi}\text{-eff}[n+\Delta ij[n]] \cdot xij\} \quad (2)$$

Here, $\Delta ij[n]$ is retained in the schedule table storage unit 15. When $\Delta ij[n]$ is not yet determined, a standard lead time retained in the process master storage unit 17 may be used. Accordingly, the effective surplus production quantities for each production period can be realized.

(d) Effective Surplus Production Marginal Profit

A product of an effective surplus production quantity of the product P in a certain production period and a marginal profit of the product P is assumed to be an effective surplus production marginal profit of the product P in the production period. From this effective surplus production marginal profit, a marginal profit in the case of producing the products by the effective surplus production quantity can be obtained, and utilized as guidelines for making a production plan and the like.

(Second Embodiment)

Next, as a second embodiment of the present invention, description will be given of a production control method for calculating a consolidated contribution profit by use of the production control system according to the embodiment of the present invention, with reference to FIGS. 14 and 54.

Figure 54:
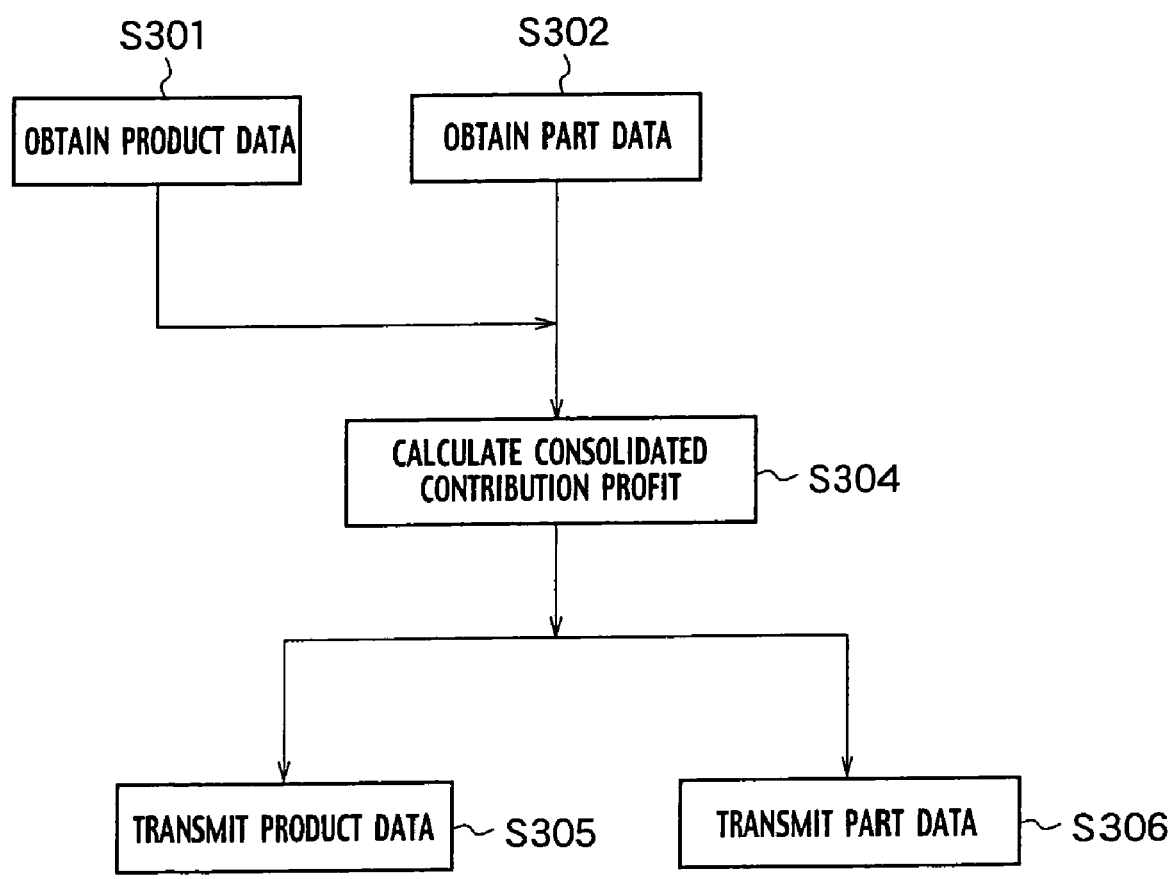
FIG. 54 is a flowchart of a production control method according to a second embodiment of the present invention.

(a) In Step S301 of FIG. 54, the product data obtaining module 11 obtains the product data 5a from the parent product production location. This product data 5a is retained by the product data storage unit 12. Moreover, in Step S302, the component data obtaining unit 18 obtains the component data 6a from the part production location. This component data is retained by the component data retention unit 19.

(b) Next, in Step S304, the consolidated contribution profit calculation module 22 calculates an upstream consolidated contribution profit and a consolidated contribution profit from the product data retained by the product data storage unit 12, the component data retained by the component data retention unit 19 and the process master retained by the process master storage unit 17. Specifically, the upstream consolidated contribution profit is calculated by use of (b) upstream consolidated contribution profit of the component data 6a, the resource usage of the process master and (c) marginal profit of the product data 5a. The upstream consolidated contribution profit calculated herein is retained as (i) upstream consolidated contribution profit of the part data 5b and is retained again in the product data storage unit 12. Moreover, the consolidated contribution profit is calculated by different coefficients depending on (b) upstream consolidated contribution profit of the component data 6a, the resource usage of the process master, and kinds of profits to be calculated (based on fixed sales amounts, planned production quantities, surplus production quantities and the like). The consolidated contribution profit calculated herein is retained as (d) consolidated contribution profit of the part data 6b and is retained again by the component data retention unit 19. A calculation method for the upstream consolidated contribution profit and consolidated contribution profit will be described later in detail.

(c) Next, in Step S305, the product data transmission module 13 transmits the product data 5b including (i) upstream consolidated contribution profit calculated by the consolidated contribution profit calculation module 22 to the parent product production location. Based on this product data 5b, the parent product production location can calculate the upstream consolidated contribution profit generated in the parent product production location. Moreover, in Step S306, the component data transmission unit 20 transmits the part data 6b including (d) consolidated contribution profit calculated by the consolidated contribution profit calculation module 22 to the part production location. Based on this part data 6b, the part production location can calculate the consolidated contribution profit generated in the part production location.

By use of the production control method according to the embodiment of the present invention, as to the respective products produced at the target department, not only a profit contribution gained solely by the production department but also profit contributions to commonly belonging organizations, which are gained at a plurality of locations in the production flow, are calculated. Thus, the user can precisely know a production value of each destination with respect to the profit contributions by the product. More specifically, as to the destination relating to the profit contributions of the products produced at the target department, it is generally considered that there are multiple destinations including, for example, a factory, and an operational headquarter which belongs to the company, a head office and the like. The destinations may be different from one another depending on the products. By use of the production control method according to the embodiment of the present invention, the consolidated contribution profit in the production flow is calculated for each of the multiple profit contribution destinations for all products.

(Calculation Method for Consolidated Contribution Profit)

Next, detailed calculation methods for obtaining the upstream consolidated contribution profit and consolidated profit will be explained.

(a) Set of Belonging Department

Production of products at a certain production department may contribute to not only a profit of the department but also a consolidated profit of an upper-level organization which is a set of a plurality of production departments such as an office and a factory, to which the division or the like belongs. Therefore, in calculations of the upstream consolidated contribution profit and the consolidated contribution profit, it is necessary to realize the relationship between these organizations.

In general, there is a plurality of organizations to which production of the products P conducted at a certain production department makes its profit contribution. Those organizations are assumed to be belonging organizations APij (j=1, 2, ...) of the products Pi. For example, there are AP11: the relevant department, AP12: a belonging operational headquarters, AP13: an office and the like. Moreover, the set {APij} is assumed to be the belonging organization set APi of the products Pi.

An upstream belonging department set AuPi of the products Pi (i=1, 2, ...) is a sum of sets including the upstream belonging department set AuXj of the all parts Xj and the belonging department set APi of the department. When the products Pi have no upstream products, the upstream belonging department set is equivalent to the belonging department set of the products Pi. The upstream belonging department set of the respective products Pi is retained in the product data storage unit 12 and is transmitted to the respective parent product production locations from the product data transmission module 13.

$$A_u Pi = (\cup_i A_u Xi) \cup APi \qquad (3)$$

The upstream belonging department set AuXi of the component Xi in the right side of the equation (3) is obtained from each component production location by the component data obtaining unit 18 and is retained in the component data retention unit 19.

Similarly, the consolidated belonging department set AcXj of the respective components Xj is a sum of sets including the consolidated belonging department set AcPij of the products Pij using the components Xj as their parts and the upstream belonging department set AuXj of the components Xj. The consolidated belonging department set of the respective components is retained in the component data retention unit 19 and is transmitted to each component production location from the component data transmission unit.

$$A_c Xj = (\cup_i A_c Pij) \cup A_u Xj \qquad (4)$$

The consolidated belonging department set AcPij of the product Pij in the right side of the equation (4) is obtained from each parent product production location by the product data obtaining module 11 and is retained in the product data storage unit 12.

In the department, for each of the products, the belonging department set, the upstream belonging department set and the consolidated belonging department set are retained as a list of department IDs.

(b) Part Usage

Moreover, in calculations of the upstream consolidated contribution profit and the consolidated contribution profit, it is necessary to realize quantities of components used for respective products. It is assumed that products of the production department are Pi (i=1, 2, ...) and components of any of the products of the department are Xj (j=1, 2, ...). The respective components Xj may be components used in a plurality of products of the department. Information on which components are used for each product is retained in the process master storage unit 17 as the process master.

The usage of the components Xj per unit production quantity of the products Pi is assumed to be xij. Note that xij is a value obtained by a conversion based on a unit production quantity of Xj. This value is retained in the process master storage unit 17. The numbers of xij may differ from each other depending on production periods.

(c) Upstream Consolidated Contribution Profit

When the products Pi (i=1, 2, ...) are produced and sold, profit contributions are made not only by a marginal profit gained at the production department but also by production and sales of components of the product P in the upstream. The upstream profit is included, for example, in material costs of P and, specifically at the relevant department, the sale is conducted after further profits are added to the material costs. In such a manner, in the production flow, profits are gained at the respective production locations. When the plurality of production locations in the flow commonly belong to an organization such as the entire company or the operational headquarters, profit contributions gained at these locations commonly contribute to a consolidated profit of the organization. In the case of producing a certain product P, by knowing not only a profit contribution gained solely by the relevant department but also profit contributions to the common belonging organization, which are gained at the plurality of locations in the flow of the product P, the user can precisely know the production value of the product. Here, a method for calculating an accumulation of profit contributions gained in the upstream of the product P is first shown.

As to the products Pi, data having the following structure is assumed to be upstream consolidated contribution profit data $RuPi[n]$.

$RuPi[n]=\{$belonging department ID, belonging department upstream consolidated contribution profit$\}(n;$ production period$)$ As to an element a (a: belonging operational headquarters and the like) among AuPi, belonging department ID; ID (a) and the belonging department upstream consolidated contribution profit in the $n^{th}$ period; $RuPi(a)[n]$ are expressed. The above expressions indicate a profit contribution to the department a by the entire upstream including the products Pi per unit production quantity of the products Pi.

Here, $RuPi(a)[n]$ is calculated as below. When $RPi(a)[n]$ is assumed to be a profit contribution (marginal profit) to a, which is made solely by the department through the production of Pi in the $n^{th}$ period, the following equation is obtained.

$$R_uPi(a)[n]=\Sigma_j R_u Xj(bj)[n] \cdot xij + RPi(a)[n], \ bj \in A_u Xj, \ ID(bj)=ID(a)$$
(5)

In the equation (5), $RuXj(bi)[n]$ is the belonging department upstream consolidated contribution profits of the respective part Xj and xij is the usage of Xj for the products Pi.

In FIG. 55, it is assumed that components used for the product P1 are X1u and X2u and usages of the respective components are x11 and x12. In calculation of the upstream consolidated contribution profit P1u per product P1, a product of the upstream consolidated contribution profit X1u per component X1 and the component usage x11 and a product of the upstream consolidated contribution profit X2u per component X2 and the component usage x12 are added together. This value is added with a sole contribution profit P1 per product P1.

When $RuX[n]$ and xi are expressed as follows, $$RuX[n]=(RuX1(b1)[n], RuX2(b2)[n], \ldots RuXn(bn)[n]) \ xi=(xi1, xi2, \ldots xin)$$

the equation (3) can be expressed as follows.

$$R_u Pi(a)[n]=RuX[n] \cdot xi^t + RPi(a)[n]$$
(6)

The respective parts Xj are used by xij per unit production quantity of the products Pi. Thus, in calculation of the profit contribution, one obtained by multiplying the upstream consolidated contribution profit per unit production quantity of the parts by the usage is added. As shown in the equation (6), the belonging department upstream consolidated contribution profit is determined starting from the product upstream.

When the marginal profit gained solely by the department with the products Pi does not contribute to a, that is, in the case of the following expression, $$a \in A_u Pi, \ a \notin APi$$
(7)

in the equation (5), $RPi(a)[n]=0$ and $RuPi(a)[n]=\Sigma j RuXj(bj)[n] \cdot xij \ (=RuX[n] \cdot xit)$ are established. Moreover, when all the upstream products including the components do not make profit contributions to a, the following expression, which satisfies $ID(bj)=ID(a)$, does not exist.

$$bi \in A_u Xi$$
(8)

Thus, $RuPi(a)[n]=RPi(a)[n]$ is established.

As to the respective products Pi (i=1, 2, ... ) produced in the relevant department, $RuPi(a)[n]$ is calculated and (i) upstream consolidated contribution profit is transmitted to the parent product production location from the product data transmission module 13.

(d) Consolidated Contribution Profit

Next, a method for calculation of a consolidated contribution profit, which is an accumulation of profit contributions gained in the downstream of the product P, is shown. As to the respective components Xj (j=1, 2, ... ) accepted at the production department, data having the following structure is assumed to be consolidated contribution profit data $RcXj[n]$.

$RcXi[n]=\{$belonging department ID, belonging department consolidated contribution profit$\}$ For the respective parts Xj, the consolidated contribution profit; $RcXj(a)[n]$ with respect to the department a in the $n^{th}$ period is calculated as below.

$$R_c Xj(a)[n]=\Sigma_i \{R_c Pi(a)[n] - R_u Xj(a)[n] \cdot xij\} \alpha ij + RuXj(a)[n]$$
(9)

In the equation (9), $RcPi(a)[n]$ is the belonging department consolidated contribution profit of the respective products Pi, and is a value calculated at the parent product production location by a similar calculation method and is obtained by the product data obtaining module. The coefficients $\alpha ij$ differ from one another depending on the kinds of profits as described later (based on fixed sales, planned production quantity, surplus production quantity and the like). Moreover, as shown in the equation (9), the belonging department consolidated contribution profits are sequentially determined starting from the product downstream.

FIG. 56 shows a state where the component X1 is a part used for the products P1 and P2. In FIG. 56, octagons represent consolidated contribution profits and triangles represent upstream consolidated contribution profits. P1c and P2c are consolidated contribution profits of the respective products P1 and P2 per product. P1u and P2u are upstream consolidated contribution profits of the respective products P1 and P2 per product. X1u, X2u and X3u are upstream consolidated contribution profits of the respective components X1, X2 and X3 per part. In calculation of the consolidated contribution profit X1c per part X1c, one obtained by subtracting a product of the upstream consolidated contribution profit X1u and the usage x11 from the consolidated contribution profit P1c per product P1 and one obtained by subtracting a product of the upstream consolidated contribution profit X1u and the usage x12 from the consolidated contribution profit P2c are added together. To a product of the above value and the coefficient $\alpha ij$, the upstream consolidated contribution profit X1u per part X1 is added again.

When RcP[n] and αj are expressed as below, $$R_cP[n]=(R_cP1(a)[n]-R_uXj(a)[n], R_cP2(a)[n]-R_uXj(a)[n], \ldots R_cPn(a)[n]-R_uPj(a)[n],)$$

$$\alpha j=(\alpha 1j, \alpha 2j, \ldots \alpha nj)$$

The equation (9) can be expressed as below.

$$R_cXj(a)[n]=R_cP[n]\cdot\alpha j^t+R_uXj(a)[n] \tag{10}$$

RcXj(a) is calculated for the respective components Xj (j=1, 2, . . . ) accepted at the department, and consolidated contribution profit data is transmitted to the part production location from the component data transmission unit 20.

The production of the product P contributes to the profit gained solely by the department but not necessarily to the profit of the belonging division a. On the other hand, the production of the product P may contribute to the profit of the belonging division a even if the production does not contribute to the profit gained solely by the department. By use of the production control method according to the embodiment of the present invention, the user can precisely know the profit contribution of the belonging division of the product from the upstream consolidated contribution profit and the consolidated contribution profit.

(e) Calculation of αij in Equation (9)

The coefficients αij differ from one another depending on the kinds of profits. For example, in the case of obtaining the consolidated contribution profit for the effective surplus production quantity, αij is calculated as below. The effective surplus production quantity of the components Xj in the $n^{th}$ period is assumed to be $W_{Xj}$-eff[n]. When the surplus production quantity of the components Xj is assumed to be $W_{Xj}$[n], the effective surplus production quantity $W_{Xj}$-eff[n] can be calculated as below.

$$W_{Xj}\text{-eff}[n]=\min\{W_{Xj}[n], \Sigma_i W_{Pi}\text{-eff}[n]\cdot xij\} \tag{11}$$

In the equation (11), allocated quantities of the products Pi are assumed to be γi. In this event, the following equation is established.

$$\alpha ij = \frac{1}{xij} \cdot \frac{\gamma i}{W_{Xj} - \text{eff}[n]} \tag{12}$$

The number xij is the usage of the components Xj for the products Pi and thus 1/xij in the equation (12) is production quantities of the products Pi per unit production quantity of the components Xj. Moreover, γi/$W_{Xj}$-eff[n] is an allocation rate for the products Pi with respect to the effective surplus production quantity of the components Xj. By use of the above-described, "$\Sigma_i\{(R_cPi(bi)[n]-R_uXj(a)[n]\cdot xij)\cdot\alpha ij\}$" (hereinafter referred to as a "downstream consolidated contribution profit") of the equation (9) can also be described as below.

$$\frac{1}{W_{Xj} - \text{eff}[n]}\sum_i\left\{(R_cPi(a)[n] - R_uXj(a)[n]\cdot xij)\cdot\frac{\gamma i}{xij}\right\} \tag{13}$$

This is obtained by dividing the total of the downstream consolidated contribution profits, which are expected when γi of the components Xj are allocated to the respective products Pi, by the effective surplus production quantity $W_{Xj}$-eff[n], and thus is the downstream consolidated contribution profit (per unit production quantity) related to the effective surplus.

The user can increase the allocation rate for the products Pi largely contributing to the consolidated contribution profits RcPi (a) in the equation (9) and can conversely reduce the allocation rate for the parent products slightly contributing to the consolidated contribution profits. Alternatively, the allocation rate γi/$W_{Xj}$-eff[n] may be determined based on the past sales performance data. Note that, in the above calculations, γi/xij is the quantity of Pi produced when only γi of the components Xj are allocated to the products Pi. Thus, γi/xij is assumed not to exceed the effective surplus production quantities of the products Pi. The above is satisfied when γi/xij is equal to the effective surplus production quantity of the established products Pi. Thus, γi/xij may be set in such a manner.

Moreover, in the equation (12), when the effective surplus production quantity $W_{Xj}$-eff is replaced with the fixed sales quantity ZXj of Xj, the allocation rate is determined based on the allocation quantity γi of which sales are fixed.

Also in the case of obtaining consolidated contribution profits for the planned sales quantity and planned production quantity, αij is similarly calculated.

(f) Consolidated Contribution Profit in Each Production Period

Next, description will be given of a method for calculating a consolidated contribution profit of each production period by use of the production control method according to the embodiment of the present invention. It takes a lead time Δij[n] to complete the products Pi after the components Xj are received in the $n^{th}$ period. In consideration of the lead time, the consolidated contribution profit gained by the production of the products Pi in the $n^{th}$ period can be estimated as below. It is considered that the products Pi achieve the upstream consolidated contribution profit in the $(n-\Delta ij[n])^{th}$ period due to the production of the products Pi in the $n^{th}$ period. Therefore, in the upstream consolidated contribution profit RuXj(bj)[n] of the parts Xj in the right side of the equation (5) of the upstream consolidated contribution profit of the products Pi, n is replaced with n−Δij[n]. Consequently, the following equation is obtained.

$$R_uPi(a)[n]=\Sigma_j R_uXj(bj)[n\Delta ij[n]]\cdot xij+RPi(a)[n] \tag{14}$$

Each of $R_uXj(bj)[n-\Delta ij[n]]$ in the right side of the above equation may be multiplied by an interest rate corresponding to Δij[n].

On the contrary, when the components Xj are received in the nth period, the products Pi are considered to achieve the consolidated contribution profit in the $(n+\Delta ij[n])^{th}$ period. Therefore, also as to the equation (9) of the consolidated contribution profit, in RPi(a)[n] in the right side thereof, n is replaced with n+Δij[n]. Consequently, the following equation is obtained.

$$R_cXj(a)[n]=\Sigma_i\{R_cPi(a)[n+\Delta ij[n]]-R_uXj(a)[n]\cdot xij\}\cdot\alpha ij+R_uXj(a)[n] \tag{15}$$

Each of $R_cPi(a)[n+\Delta ij[n]]$ in the right side of the above equation may be multiplied by the interest rate corresponding to Δij[n]. Accordingly, the upstream consolidated contribution profit and consolidated contribution profit for each production period can be realized.

Figures 57, 58, 59:
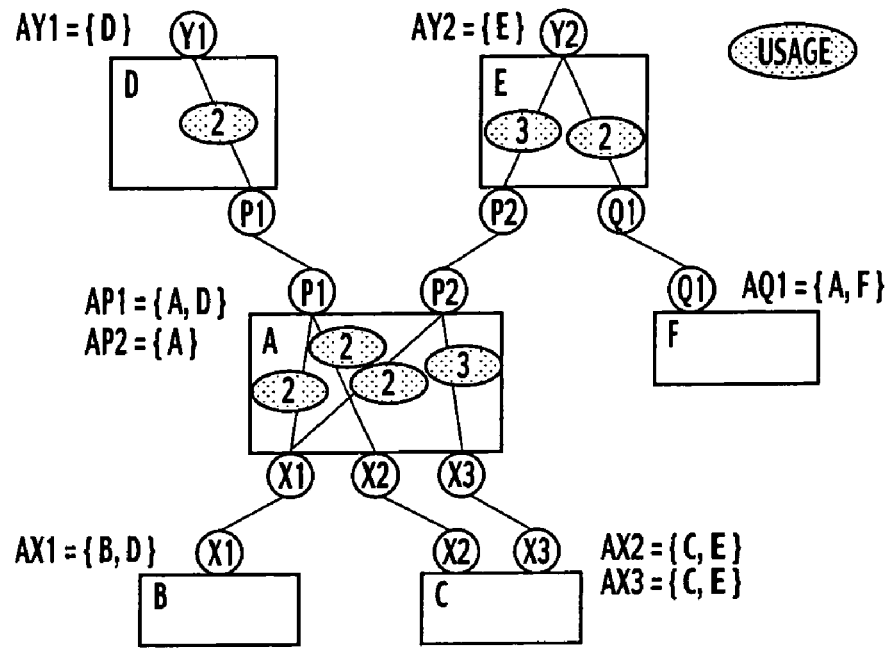
FIG. 57 is a view showing flows of products according to the second embodiment of the present invention.
FIG. 58 is a table showing an aggregation of departments according to the second embodiment of the present invention.
FIG. 59 is a table showing an aggregation of upstream departments according to the second embodiment of the present invention.

(g) Consolidated Belonging Department Set and Upstream Consolidated Contribution Profit and Consolidated Contribution Profit which Utilize the Same Next, description will be given of a method for calculating the upstream consolidated contribution profit and consolidated contribution profit, which utilize the consolidated belonging department set, by use of the production control method according to the embodiment of the present invention. As shown in FIG. 57, a case where six production locations A to F constitute the production flow is considered as an example.

First, belonging department sets for the respective products at the production locations are shown in FIG. 58. For example, the belonging department set of the product P1 at the production location A is AP1={A, D}. This data is retained in the product data at the respective production locations.

<Upstream Belonging Department Set>

The upstream belonging department sets are sequentially determined from the upstream of the products in accordance with the equation (3). First, the product X1 at the production location B has no upstream products and thus the upstream belonging department set of the product X1 is equivalent to the belonging department set of FIG. 58, which is AuX1=AX1={B, D}. Similarly, the products X2 and X3 at the production location C have no upstream products and thus the upstream belonging department sets of X2 and X3 are AuX2=AX2={C, E} and AuX3=AX3={C, E}, respectively.

The upstream products of the product P1 at the production location A are X1 and X2. The upstream belonging department sets of these components described above are transmitted as the product data from the production locations B and C, obtained by the component data obtaining unit 18 of the production location A and retained as items of the component data in the component data retention unit 19. By use of the above data, the upstream belonging department set AuP1 of the product P1 is obtained as below in accordance with the equation (3).

$$A_u P1 = A_u X1 Y A_u X2 Y AP1 \quad (16)$$
$$= \{B, D\} Y \{C, E\} Y \{A, D\}$$
$$= \{A, B, C, D, E\}$$

The upstream belonging department set AuP2 of the product P2 is similarly obtained as AuP2={A, B, C, D, E}. This data is transmitted as the product data to the parent product production locations D and E. As to the respective products at the other production locations, the upstream belonging department sets similarly obtained are shown in FIG. 59.

<Consolidated Belonging Department Set>

The consolidated belonging department sets are determined from the downstream according to the equation (4). First, the product Y1 of the production location D has no downstream, the consolidated belonging department set AcY1 of Y1 is equivalent to the upstream belonging department set AuY1. Thus, AcY1={A, B, C, D, E} is established. In the production location D, for P1 which is a component, the consolidated belonging department set AcP1 is obtained according to the equation (4).

$$A_c P1 = A_c Y1 Y A_u P1 \quad (17)$$
$$= \{A, B, C, D, E\} Y \{A, B, C, D, E\}$$

-continued
$$= \{A, B, C, D, E\}$$

The obtained consolidated belonging department set AcP1 of P1 is transmitted, as the component data, to A which is a component production location. At the component production location A, AcP1 is obtained by the product data obtaining module and is retained as the product data of P1.

The consolidated belonging department set AcP2 of P2 is similarly transmitted from the production location E. At the production location A, AcP2 is obtained by the product data obtaining module and is retained as the product data of P2. In this example, AcP2={A, B, C, D, E, F} is established.

At the production location A, the consolidated belonging department sets of X1 to X3 are obtained and transmitted as the component data to the production locations B and C. X1 is the component for P1 and P2 and thus the consolidated belonging department set AcX1 of X1 is obtained as below in accordance with the equation (4).

$$A_c X1 = A_c P1 Y A_c P2 Y A_u X1 \quad (18)$$
$$= \{A, B, C, D, E\} Y \{A, B, C, D, E, F\} Y \{B, D\}$$
$$= \{A, B, C, D, E, F\}$$

As to the respective products of the other production locations, the upstream belonging department sets similarly obtained are shown in FIG. 60.

<Upstream Consolidated Contribution Profit>

It is assumed that sole contribution profits for the belonging departments (FIG. 58) per unit production quantity of each product in a certain production period (hereinafter referred to as the $n^{th}$ period) are those shown in FIG. 61. Note that shadowed departments in the belonging departments of FIG. 61 are elements which do not belong to any belonging department set. For example, the belonging departments of the product X1 of the production location B are B and D which are not shadowed and are the same as those of FIG. 58. Similarly, as to the contribution profits shown in FIG. 61, only the belonging departments that are not shadowed have values. For example, the product X1 of the production location B makes profit contributions of 1.0 to the belonging departments B and D per unit production quantity. Similarly, the product X2 of the production location C makes profit contributions of 1.0 to its belonging departments C and E per unit production quantity. Here, for simplicity of calculations, it is assumed that the contribution profits earned by all the products per unit production quantity with respect to the respective belonging departments thereof are 1.0. However, in general, the contribution profits take different values from one another. The contribution profits are retained, as the product data, for each of the products at the respective production locations thereof.

Here, the component usages of the respective products in the $n^{th}$ period are assumed to be those shown in FIG. 62. For example, per unit production quantity, P1 uses 2 of X1 and 2 of X2 as its components. These values are retained, as the process master, in the process master storage unit per product at the respective production locations. In this event, the upstream consolidated contribution profits are calculated as below from the upstream in accordance with the equation (5).

First, the product X1 of the production location B has no upstream and thus the upstream consolidated contribution profits RuX1(B)[n] and RuX1(D)[n] of the product X1 to the upstream belonging departments B and D thereof in the $n^{th}$ period are equivalent to the sole contribution profits in FIG. 18, respectively, which are RuX1(B)[n]=RX1(B)[n]=1.0 and RuX1(D)[n]=RX1(D)[n]=1.0. Similarly, as to the products X2 and X3, the upstream consolidated contribution profits thereof are equivalent to their sole contribution profits. The contribution profits described above are shown in FIG. 63. Similar to FIG. 61, in FIG. 63, shadowed departments in the belonging departments have origins which belong to no belonging department set and have no value (or 0) for the contribution profit.

The obtained upstream consolidated contribution profits are transmitted as the product data from the product data transmission module to the respective parent product production locations.

The upstream consolidated contribution profits of the product P1 at the production location A for the respective upstream belonging departments (A, B, C, D, E) thereof are calculated as below in accordance with the equation (5).

$$RuP1(A)[n]=RP1(A)[n]=1.0 \quad (19)$$

$$RuP1(B)[n]=RuX1(B)[n] \cdot 2=1.0 \cdot 2=2.0 \quad (20)$$

$$RuP1(C)[n]=RuX2(C)[n] \cdot 2=1.0 \cdot 2=2.0 \quad (21)$$

$$RuP1(D)[n]=RuX1(D)[n] \cdot 2+RP1(A)[n]=1.0 \cdot 2+ 1.0=3.0 \quad (22)$$

$$RuP1(E)[n]=RuX2(E)[n] \cdot 2=1.0 \cdot 2=2.0 \quad (23)$$

As an example, RuP1(D)[n] is proven. P1 uses 2 of X1 per unit production quantity. Here, with reference to FIG. 61, X1 solely makes a contribution of 1.0 to D per unit production quantity. Thus, if P1 is produced for one unit production quantity, 2 of X1 are produced. Consequently, a contribution of 2.0 is made solely by X1 to D. P1 solely makes a contribution of 1.0 to D and thus a total contribution of 3.0 is made in the upstream to D. This is equal to RuP1(D)[n] and thus the consolidated contribution profit in the production flow is properly calculated by the equation (5).

As to the product P2, the upstream consolidated contribution profits for the respective upstream belonging departments are similarly calculated. The upstream consolidated contribution profits of the products P1 and P2 are shown in FIG. 63. The upstream consolidated contribution profits of the products P1 and P2 for the respective upstream belonging departments are transmitted to the parent product production locations D and E from the product data transmission module. As to the respective products of the other production locations, the upstream consolidated contribution profits are similarly calculated according to the equation (5). These are shown in FIG. 63.

<Consolidated Contribution Profit>

In accordance with the equation (9), the consolidated contribution profits in the $n^{th}$ period for each of the products of the respective production locations are calculated as below from the downstream.

First, the product Y1 of the production location D has no downstream and thus the consolidated contribution profits of Y1 for the respective consolidated belonging departments (A, B, C, D, E) are equal to the upstream consolidated contribution profits. Similarly, the product Y2 of the production location E has no downstream either, and thus the consolidated contribution profits of Y2 for the respective consolidated belonging departments (A, B, C, D, E, F) are equal to the upstream consolidated contribution profits. These are shown in FIG. 64.

At the production location D, the consolidated contribution profits of the component P1 for the respective consolidated belonging departments thereof (which are retained as the part data in D) are calculated as below in accordance with the equation (9). Note that the component P1 is used only for the product Y1 and thus the allocation rate of P1 at D is 1.0 and the usage thereof is 2. Consequently, in accordance with the equation (12), αij=(1/usage)×(allocation rate)=½×1.0=0.5 is assumed.

$$RcP1(A)[n]=(RcY1(A)[n]-RuA1(A)[n] \cdot 2) \cdot 0.5+RuA1(A)[n]=(2.0-1.0 \cdot 2) \cdot 0.5+1.0=1.0 \quad (24)$$

$$RcP1(B)[n]=(RcY1(B)[n]-RuA1(B)[n] \cdot 2) \cdot 0.5+RuA1(B)[n]=(4.0-2.0 \cdot 2) \cdot 0.5+2.0=2.0 \quad (25)$$

$$RcP1(C)[n]=(RcY1(C)[n]-RuA1(C)[n] \cdot 2) \cdot 0.5+RuA1(C)[n]=(4.0-2.0 \cdot 2) \cdot 0.5+2.0=2.0 \quad (26)$$

$$RcP1(D)[n]=(RcY1(D)[n]-RuA1(D)[n] \cdot 2) \cdot 0.5+RuA1(D)[n]=(7.0-3.0 \cdot 2) \cdot 0.5+3.0=3.5 \quad (27)$$

$$RcP1(E)[n]=(RcY1(E)[n]-RuA1(E)[n] \cdot 2) \cdot 0.5+RuA1(E)[n]=(4.0-2.0 \cdot 2) \cdot 0.5+2.0=2.0 \quad (28)$$

These values are transmitted as the component data to A from the component data transmission unit of D.

As an example, RcP1(D)[n] is proven. Two of P1 are used per unit production quantity of Y1. Thus, when P1 is produced for one unit production quantity, 0.5 of Y is produced. With reference to FIG. 61, the sole contribution profit of Y1 for D is 1.0 and the contribution profit in the case of producing 0.5 of Y is 0.5. Moreover, when P1 is produced for one unit production quantity, two of X1 and two of X2 are produced. In this event, the unconsolidated contribution profit of X1 for D is 1.0×2 and that of X2 for D is 0. Moreover, the sole contribution profit of P1 for D is 1.0. Based on the above data, the consolidated contribution profit for D in the case of producing P1 for one unit production quantity is 0.5+2.0+1.0=3.5, which is equal to RcP1(D)[n] previously obtained.

In the above calculations, the contribution profits and part usage amount of all the production locations and products related to the product P1 in the production flow are used. Meanwhile, in the calculation of the consolidated contribution profits by the equation (9), only the consolidated contribution profit of the target department, the upstream consolidated contribution profit and production of the parts are used. The part usage is the item in the process master of the target department, the consolidated contribution profit of the target department is data transmitted from the parent product production location and the upstream consolidated contribution profit of the part is data transmitted from the part production location. Thus, data required for the calculation of the consolidated contribution profits by the equation (9) includes only data transmitted from adjacent production locations in the production flow and data of the target department. When a plurality of production locations are related to a certain product and the production flow is complex, it is difficult to perform such calculations as the foregoing proof, including obtaining the data. By use of the production control system according to the embodiment of the present invention, the consolidated contribution profits can be easily calculated by use of only the data transmitted from the adjacent production locations and the data of the target department. Thus, the user can precisely know the value of the products of the target department in the whole production flow. The consolidated contribution profits similarly calculated for the respective products of the other production locations are shown in FIG. 64.

(h) Upstream Consolidated Contribution Profit and Consolidated Contribution Profit in the Case of Producing Effective Surplus Production Quantity Next, description will be given of a method for making a production plan for the surplus production quantity in consideration of not only the unconsolidated profit contribution of the target department but also the consolidated contribution profits gained in the upstream and downstream of the products in the case where there are the surplus production quantities for a plurality of products produced in the target department, by use of the production control method according to the embodiment of the present invention.

The effective surplus production quantities of the products Pi in the $n^{th}$ period are assumed to be $W_{Pi}\text{-eff}[n]$. The profit contributions of the belonging department a, which are expected in the case of producing the products Pi by $W_{Pi}\text{-eff}[n]$, are calculated as below.

As to the product upstream including the target department, $$W_{Pi}\text{-eff}[n] \cdot RuP(a)[n] \qquad (29)$$

As to the product downstream not including the target department, $$W_{Pi}\text{-eff}[n] \cdot RdP(a)[n] \qquad (30)$$

As to the whole product upstream and downstream, $$W_{Pi}\text{-eff}[n] \cdot RcP(a)[n] \qquad (31)$$

Here, the profit contributions can be calculated by use of the equation $RdP(a)[n]=RcP(a)[n]-RuP(a)[n]$. These profit contributions are calculated for each of the belonging departments and thus multilateral determination by the user is made possible.

(Third Embodiment)

Figure 65:
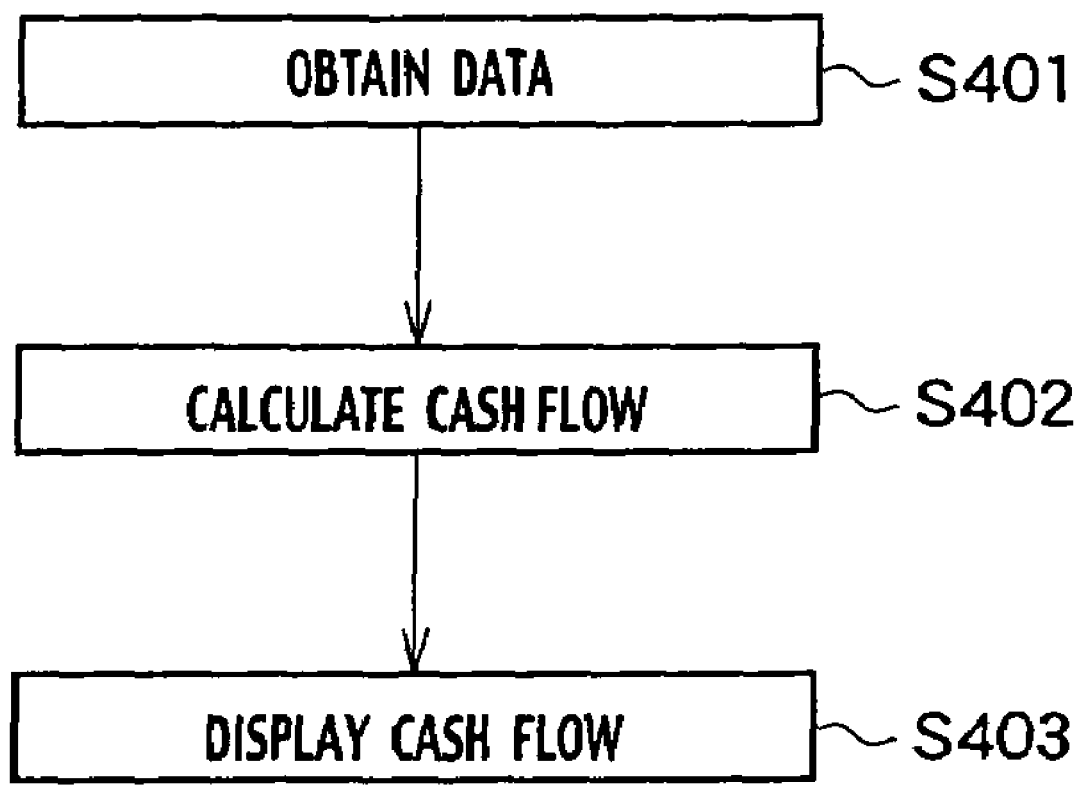
FIG. 65 is a flowchart of a production control method according to a third embodiment of the present invention (No. 1).
Figure 70:
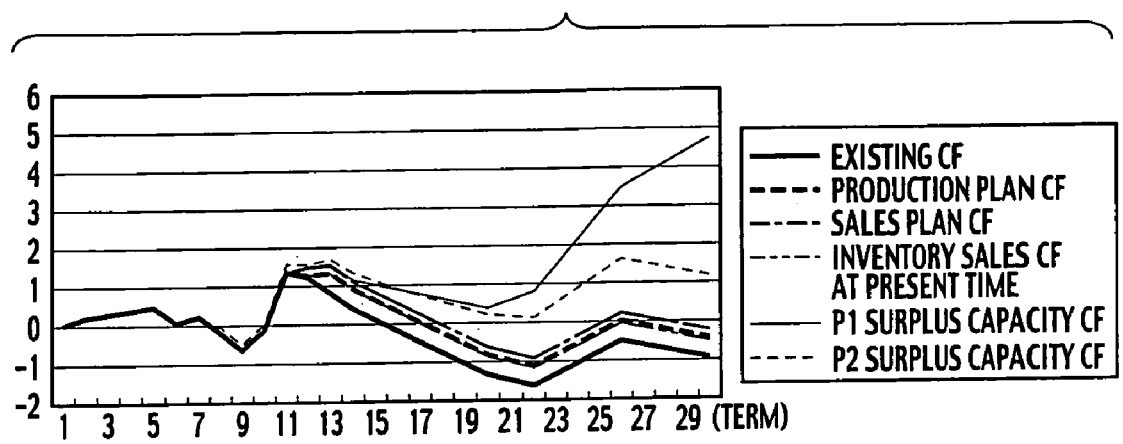
FIG. 70 is a line plot showing various cash flows according to the third embodiment of the present invention.

Next, as a third embodiment of the present invention, with reference to FIGS. 14 and 65, description will be given of a production control method for calculating various cash flows by use of the production control system according to the embodiment of the present invention.

(a) In Step S401 of FIG. 11, obtained are: the product data from the product data storage unit 12; the resource table from the resource table storage unit 14; the department data of the production department from the CF data storage unit 28; and the like.

(b) Next, in Step S402, based on the above data, the CF data calculation module 25 calculates cash flow data. The cash flows include an existing cash flow, a cash flow in production plan, a cash flow in sales plan, an inventory cash flow at the present time, a cash flow in surplus capacity and the like. A detailed calculation method for each cash flow will be described later.

(c) Next, in Step S403, the various cash flows calculated are retained in the CF data storage unit 28 and are displayed by the CF data display module 30 as the need arises.

According to the production control method by the calculation of the various cash flows, it is possible to know the cash flow time-series in various cases of future production and sales. The foregoing various cash flows can be updated at any time in accordance with a settlement of new sales and an update of the production plan. Thus, based on the latest information, the user can properly recognize the cash flow time-series.

(Calculation Example of Various Cash Flows)

As described above, in the product data, retained are: the product price for each production period of the respective products; the production direct costs and the marginal profit; planned production/sales/inventory quantities; and the like. Here, description will be given of a method for calculating/displaying various cash flow time-series of the department based on the production and sales plans from the product data.

(a) Data Used for Cash Flow Calculation

First, description will be given of an example of data used for calculations of the various cash flows. In FIG. 66, as to two kinds of products produced in the production department, examples of the planned sales quantity, planned production quantity, fixed sales quantity, surplus production quantity and inventory quantity, which are extracted from the product data, are shown. The production period of the first column represents, for example, date, week or month. FIG. 67 shows breakdown examples of the inventory quantities of the respective products in FIG. 66. In these examples, the inventory quantities are classified into a carried-over inventory quantity and a salable inventory quantity. The carried-over inventory is an inventory determined to be carried over to the next period and thus cannot be sold in the production period at the time. Meanwhile, the salable inventory is an inventory that can be sold in the production period. Such a breakdown of the inventory quantities is also retained in the product data. Moreover, prices per production unit of the respective products, direct production costs and inventory cost coefficients are shown in FIG. 68. Here, these values are set for each of the production periods. However, the values may not be changed over the entire production periods. Such data is also retained in the product data.

(b) Display of Target department Cash Flow and Time-Series Data of Deposited/Withdrawn Money in Each Production Period The production control system according to the embodiment of the present invention can calculate and display various cash flows (a) to (g) below based on a production plan scheduled by the production scheduler 16.

(a) $Z\_CF[n]$: Existing Cash Flow in the $n^{th}$ Period

An existing cash flow is a cash flow in the case of selling only products which are produced in accordance with a production plan and are fixed to be sold in the existing situation. The existing cash flow is a cash flow time series based on profits gained by the fixed sales and costs for planned production and inventory and fixed cost. By viewing this existing cash flow time-series, the user can estimate, so that cash flows never drop below the existing cash flow time-series under the present production plan. Assuming that $\alpha P[n]$ is a price of the product P in the $n^{th}$ period, $\beta P[n]$ is a marginal profit of the product P in the $n^{th}$ period, $\gamma P[n]$ is an inventory cost coefficient of the product P in the $n^{th}$ period, $YP[n]$ is a planned production quantity of the product P in the $n^{th}$ period, $ZP[n]$ is a fixed volume of sales in the $n^{th}$ period, $IP[n]$ is a inventory quantity of the product P in the $n^{th}$ period and $F[n]$ is a fixed cost common between departments in the $n^{th}$ period, the existing cash flow $Z\_CF[n]$ in the $n^{th}$ period is calculated by the following equation.

$$Z\_CF[n]=Z\_CF[n-1]+\Sigma_P\{\alpha_P[n]\cdot Z_P[n]-(\alpha_P[n]-\beta_P[n])\cdot Y_P[n]-\gamma_P[n]\cdot I_P[n]\}-F[n] \qquad (32)$$

(b) $Y\_CF[n]$: Cash Flow in Production Plan in the $n^{th}$ Period.

A cash flow in production plan is a cash flow in the case where products are produced in accordance with a production plan, all of the products are sold in each production period and there is no inventory of the products. The cash flow in production plan is a cash flow time-series based on an optimal sales scenario under the existing production plan. By viewing this cash flow in production plan time-series, the user can estimate that, under the production plan of the existing situation, cash flows become equal to the foregoing existing situation cash flow or more, and becomes equal to the cash flow in production plan or less. Assuming that PP[n] is an inventory quantity carried over to the next period of the product P in the $n^{th}$ period and SIP[n] is a salable inventory quantity of the product P in the $n^{th}$ period (=IP[n]−PP[n]), the cash flow in production plan Y_CF[n] in the $n^{th}$ period is calculated by the following equation.

$$Y\_CF[n]=Z\_CF[n]+\Sigma_P\Sigma_j(SI_P[j]-SI_P[j-1])\cdot(\beta_P[j])+ \gamma_P[j]) \quad (33)$$

(c) I_CF[n]: Cash Flow in Inventory Sales at Present Time in the $n^{th}$ Period A cash flow in inventory sales at present time is a cash flow in the case of selling products for a salable inventory quantity in the $n^{th}$ period in addition to those fixed to be sold in the existing situation. Products which are produced according to the production plan are planned to become inventories, except for the products fixed to be sold. The inventory sales cash flow at present time is a cash flow time-series in the case where salable products among those in inventory, which are accumulated by the $n^{th}$ period, are sold in the $n^{th}$ period, in addition to the products produced according to the production plan of the existing situation and the products fixed to be sold under the existing plan. The cash flow becomes equal to the existing cash flow or more, and becomes equal to the production plan cash flow or less. The inventory sales cash flow at present time I_CF[n] in the $n^{th}$ period is calculated by the following equation.

$$I\_CF[n]=Z\_CF[n]+\Sigma_P SI_P[n]\cdot\alpha_P[n]) \quad (34)$$

(d) X_CF[n]: Cash Flow in Sales Plan in the $n^{th}$ Period

A cash flow in sales plan is a cash flow in the case where products are produced in accordance with a sales plan, all of the products are sold in each production period and there is no inventory of the products. A production plan is prepared by a production scheduler based on the sales plan. However, in the preparation thereof, due to restrictions such as a production capacity of a factory and/or a delivery quantity of parts thereof, not all products planned to be sold can be produced. The cash flow in sales plan is a cash flow time-series based on an optimal sales scenario in the case where it is assumed that all the products planned to be sold are produced. Thus, the cash flow in sales plan becomes equal to the cash flow in production plan or more. When there is a huge difference between the cash flow in sales plan and the cash flow in production plan, it is expected that a sales plan that considerably exceeds the production capacity of the factory is being made. By comparing the cash flow in sales plan to the cash flow in production plan, the user can know whether or not the sales plan is appropriate for the production capacity. Assuming that XP[n] is a planned sales quantity of the product P in the $n^{th}$ period, the cash flow in sales plan X_CF[n] in the $n^{th}$ period is calculated by the following equation.

$$X\_CF[n]=Y\_CF[n]+\Sigma_P\Sigma_j(X_P[j]-Y_P[j])\cdot\beta_P[j]) \quad (35)$$

(e) Wp_CF[n]: Cash Flow in Production Capacity of Product P in the $n^{th}$ Period A cash flow in production capacity is a cash flow in the case of selling products P for a surplus production quantity under the existing production plan, in addition to the cash flow in production plan. A quantity that remains after subtracting productivity for a planned production quantity from a production capacity of a factory is the surplus production quantity. The cash flow in production capacity is a cash flow time-series in the case where certain products P are produced by use of this surplus production quantity and the products are sold without remaining in inventory. The production scheduler 16 makes a production plan in the case of allocating the surplus production quantity to each of the products. By comparing the production capacity cash flow time-series of the respective products, the user can obtain information on an optimal allocation of the products with respect to the surplus production quantity. Assuming that Wp[n] is the surplus production quantity of the product P in the $n^{th}$ period, the cash now in production capacity Wp_CF[n] of the product P in the $n^{th}$ period is calculated by the following equation.

$$W_P\_CF[n]=Y\_CF[n]+\Sigma_j W_P[j]\cdot\beta_P[j] \quad (36)$$

(f) $W_{p\text{-}eff}$_CF[n]: Effective Surplus Production Cash Flow of Product P in the $n^{th}$ Period In the calculation of the cash flow in production capacity $W_{Pi}$_CF[n] of the products Pi in the $n^{th}$ period, which is shown in the equation (36), a cash flow calculated by replacing the surplus production quantity $W_{Pi}[j]$ in the $j^{th}$ period with an effective surplus production quantity $W_{Pi\text{-}eff}[j]$ of the products Pi in the $j^{th}$ period, as shown in the equation (37), that is, one obtained by adding accumulated effective surplus production marginal profits to the cash flow in production plan is assumed to be cash flow in the effective surplus production: $W_{P\text{-}eff}$_CF[n] of the product P.

$$W_{P\text{-}eff}\_CF[n]=Y\_CF[n]+\Sigma_j W_{Pi\text{-}eff}[j]\cdot\beta_P[j] \quad (37)$$

From cash flow in the effective surplus production, information on an optimal allocation of products with respect to the effective surplus production quantity can be obtained.

(g) Consolidated Cash Flow

When the upper-level organization including the department is assumed to be a, according to the production control system of the embodiment of the present invention, the user can obtain consolidated cash flow time-series data of the department a by use of the upper-level department CF data obtaining module 24. This data is assumed to be CFa[n]. When an accumulation of consolidated profit contributions up to the $n^{th}$ period, which are expected in the product upstream and downstream in producing the products P for the effective surplus production quantity, is added to CFa[n], the following equation is obtained.

$$CFa[n]+\Sigma_j WP\text{-}eff[j]\cdot RcP(a)[j] \quad (38)$$

According to the above, the user can easily know not only the effective surplus production cash flow of the target department by itself but also cash flows of all related departments in the case of producing products by using a surplus production capacity. In addition, the user can make a precise production plan with respect to the surplus production capacity.

The foregoing calculations are performed by the CF data calculation module 25 and are retained in the CF data storage unit 28 as various cash flow time-series data within the department data as shown in FIGS. 69A and 69B. The planned production quantity YP[n] and the inventory quantity IP[n] which are required for the cash flow calculations are strictly calculated as the production plan by the production scheduler 16.

Moreover, the production control system according to the embodiment of the present invention can display each of the retained cash flow time-series data by use of the CF data display module 30. Display examples thereof will be shown in FIGS. 70 to 73.

By viewing such graphs, the user can know the cash flow time-series in various cases of future production and sales. Each of the foregoing cash flows can be updated at any time in accordance with a settlement of new sales and an update of a production plan. Therefore, the user can properly recognize the cash flow time-series based on the latest information. Moreover, from the comparison of the cash flow time-series to the surplus production quantity of each product, which is calculated by the production scheduler as needed, the user can know how to take advantage of the cash flow, such as considering to which products the production capacity of an available factory should be allocated under a production plan of the existing situation. Thus, the user can make a production plan appropriate for the surplus production capacity. Furthermore, from the data retained in the department data, sales, marginal profits, inventory costs and the like of each product in various cases of future production and sales can also be displayed. Moreover, not only an amount of money but also a sales quantity and an inventory quantity for each of the products can also be displayed.

(Production Control Method by Calculation of Various Cash Flows in Changing Input Data)

Next, description will be given of a method for calculating a target department cash flow in changing input data such as a product price and a production direct cost. Here, a production plan cash flow will be described as an example. The production plan cash flow is a cash flow in the case of selling all products produced under a production plan of the existing situation without any remaining inventory. It is assumed that the cash flow in production plan is negative in the final period of periods now considered. In this event, in order to make the cash flow in production plan positive, the following methods are considered, including: 1. changing of a sales price or increasing of a marginal profit by changing the production direct cost; 2. increasing of a production quantity; and the like.

By use of the production control method according to the embodiment of the present invention, the user can change various patterns as a simulation. For example, as to the foregoing method 1., for a copy of the product data shown in FIG. 6A, prices are changed regarding combinations of various products therein and preparation of schedule tables corresponding thereto and calculation of a cash flow in production plan are performed. Moreover, as to the foregoing method 2., similarly, for a copy of the product data, assuming, for example, that there is a new order, the planned sales quantities of FIG. 6B are changed, and preparation of schedule tables corresponding thereto and calculation of a cash flow in production plan are performed.

Next, with reference to FIGS. 14 and 74, description will be given of a production control method by using calculations of various cash flows in changing input data according to the embodiment of the present invention.

Figure 74:
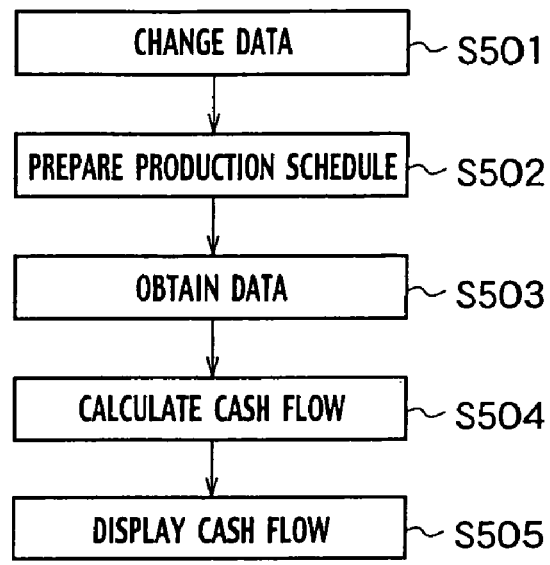
FIG. 74 is a flowchart of a production control method according to the third embodiment of the present invention (No. 2).

(a) First, in Step S501 of FIG. 74, cash flow data of a target department is examined and various data retained in the product data storage unit 12, the part data storage unit 19 and the like are changed. In this event, the product data and the like in the product data storage unit 12 and the like before the change are not updated unless this data is overwritten with data after the change. It is also satisfactory to adopt a data structure which retains data by separating the data before the change and the data after the change.

(b) Next, in Step S502, the production scheduler 16 prepares a schedule table by using the various data after the change as an input. The schedule table prepared here is one on a simulation and thus is different from an official schedule table. Moreover, at the same time, data on the simulation is also prepared for a resource table and the respective items of FIG. 10 are entered based on the schedule table in this simulation. Moreover, based on the schedule table and resource table in this simulation, the planned production quantity, the inventory quantity and the surplus production quantity of the product data after the change are updated. In this event, the change of the production plan is based on the schedule table, which is an output of the production scheduler 16. Thus, a strict and executable production plan is obtained.

(c) Next, in Step S503, the CF data calculation module 25 obtains data required for calculation of cash flows, the data including the product data from the product data storage unit 12, the resource table from the resource table storage unit 14, the department data from the CF data storage unit 28 and the like.

(d) Next, in Step S504, the CF data calculation module 25 calculates cash flows from the obtained data. The cash flows include an existing cash flow, a cash flow in production plan, a cash flow in sales plan, a inventory cash flow at present time, a surplus capacity cash flow and the like. In this event, various cash flow data before change and the like in the CF data storage unit 28 are not updated unless this data is overwritten with data after the change. It is also satisfactory to adopt a data structure which retains data by separating the data before the change and the data after the change.

Figure 71:
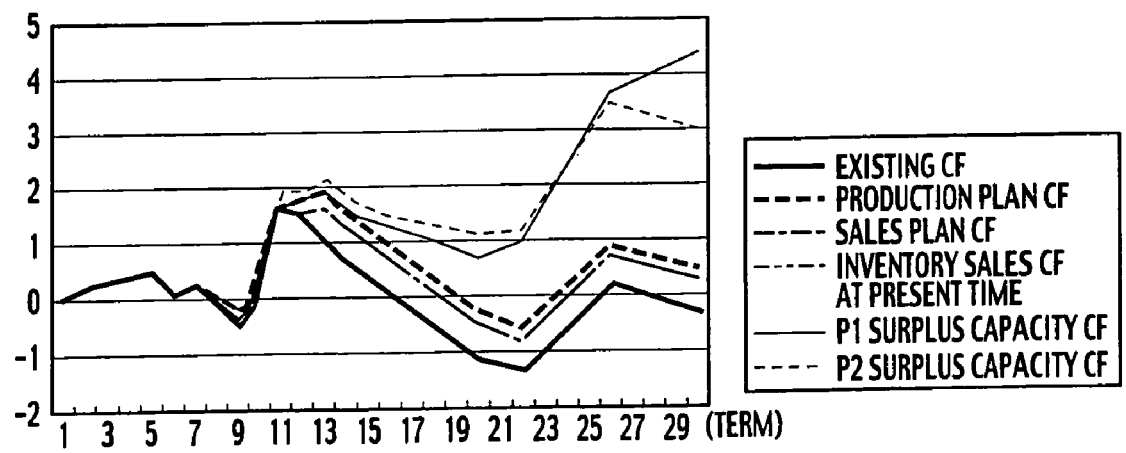
FIG. 71 is a line plot showing a target department cash flow in the case of changing the product price according to the third embodiment of the present invention.
Figure 72:
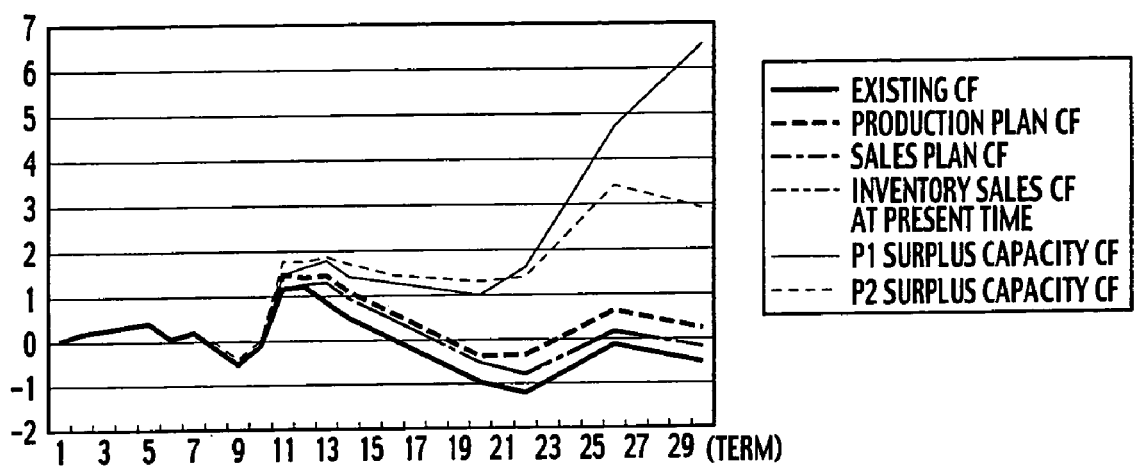
FIG. 72 is a line plot showing a target department cash flow in the case of changing the production direct cost according to the third embodiment of the present invention.

(e) Next, in Step S505, the calculated cash flows are retained in the CF data storage unit 28 and are displayed on the output unit 36 by the CF data display module 30 when needed. As to the various cash flows shown in FIG. 70, various cash flows in the case of changing the prices of FIG. 68 are shown in FIG. 71 and various cash flows in the case of changing the production direct costs thereof are shown in FIG. 72.

According to the production control method by use of the various cash flow calculations in changing this input data, the various cash flow time-series under changes of various patterns of production and sales plans can be accurately simulated. In addition, it is made possible to properly make and change the production plan in order to improve the cash flows.

Besides the above, in accordance with the elapse of production periods, the product price, the direct production cost, the sales plan or the like, which have been previously estimated, may be changed. By use of the production control method according to the embodiment of the present invention, these values are changed in the product data and the cash flow data is recalculated. Thus, a proper cash flow time-series can be provided to the user.

(Production Control Method by Consolidated Cash Flow Calculation Conforming to Department Constitution)

By use of the production control system according to the embodiment of the present invention, calculation not only of an unconsolidated cash flow of the department, but also of a consolidated cash flow conforming to a department constitution is possible. Moreover, display of the consolidated cash flow time-series is also possible.

Figure 75:
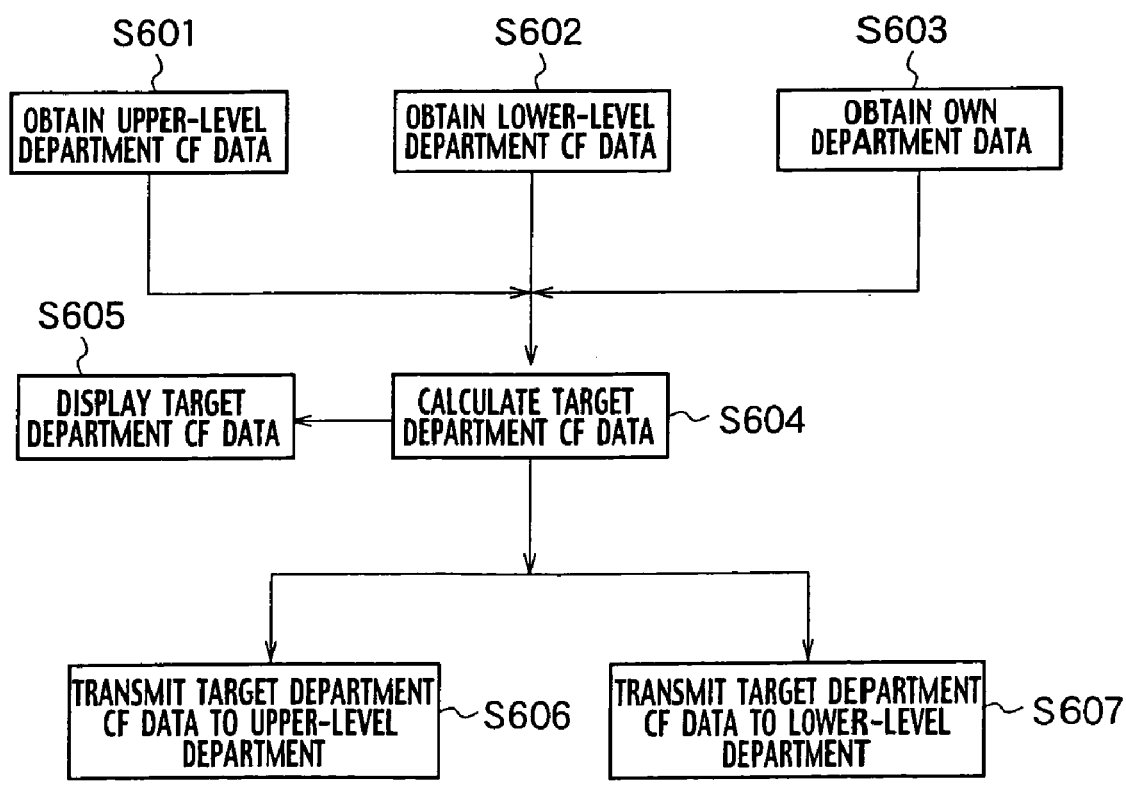
FIG. 75 is a flowchart of a production control method according to the third embodiment of the present invention (No. 3).

With reference to FIGS. 14 and 75, description will be given of a production control method by using the consolidated cash flow calculation conforming to the department constitution according to the embodiment of the present invention.

(a) In Step S601 of FIG. 75, the upper-level department CF data obtaining module 24 obtains the upper-level department CF data 7a from a parent department. This upper-level department CF data 7a is retained in the CF data storage unit 28. Moreover, in Step S602, the lower-level department CF data obtaining module 27 obtains the lower-level department CF data 7b from child departments. This lower-level department CF data 7b is also retained in the part data storage unit 19.

(b) Next, in Step S603, the CF data calculation module 25 obtains data required for calculation of cash flows, the data including the product data from the product data storage unit 12, the resource table from the resource table storage unit 14, the department data and the target department CF data from the CF data storage unit 28 and the like.

(c) Next, in Step S604, the CF data calculation module 25 calculates target department cash flow data based on the product data from the product data storage unit 12, the resource table from the resource table storage unit 14 and the department data from the CF data storage unit 28. Moreover, an upper-level department consolidated cash flow is calculated from the target department cash flow and the upper-level department CF data, and a lower-level department consolidated cash flow is calculated from the target department cash flow, the lower-level department CF data and the like. The various cash flows obtained here are retained in the CF data storage unit 28.

Figure 73:
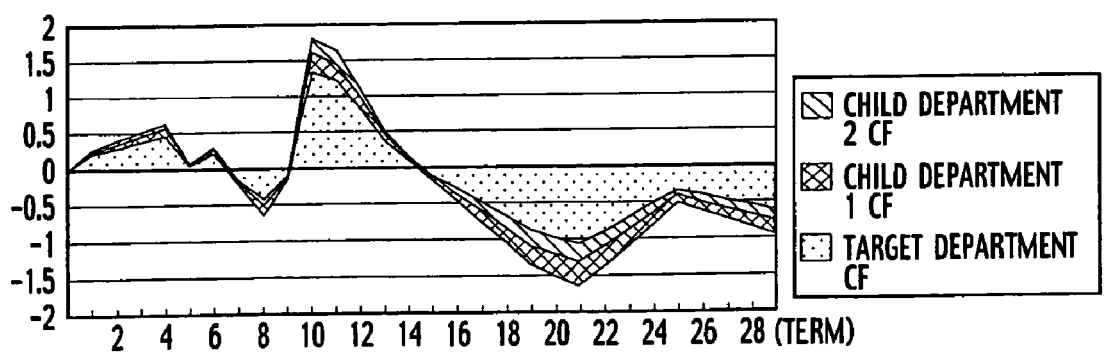
FIG. 73 is a stacked graph showing a consolidated cash flow according to the third embodiment of the present invention.

(d) Next, in Step S605, the calculated cash flows are retained in the CF data storage unit 28 and are displayed on the output unit 36 by the CF data display module 30 when needed. In FIG. 73, by use of a stacked graph of the cash flow time-series, the size of a lower-level consolidated cash flow of each child department, which occupies a share of the lower-level consolidated cash flow of the target department, is shown as an example. By similarly displaying a lower-level consolidated cash flow of the upper-level department, the user can know the size of a target department consolidated cash flow, which occupies a share of the lower-level consolidated cash flow of the upper-level department. By a similar display, it is also possible to know the size of an unconsolidated cash flow of the target department, which occupies a share of the lower-level consolidated cash flow of the upper-level department. In FIG. 73, the stacked graph related to the existing cash flow is displayed. However, as to the cash flow in production plan, the inventory cash flow at present time, the cash flow in sales plan and the like, similar graphs are also displayed.

(e) Next, in Step S606, the target department CF data 7c calculated by the CF data calculation module 25 is transmitted to the parent department by the upper-level department CF data transmission module 26. Moreover, in Step S607, the lower-level department CF data transmission module 29 transmits the target department CF data 7d calculated by the CF data calculation module 25 to the child department. The data transmitted here is not limited to the target department CF data 7c and 7d but the lower-level consolidated cash flows may be transmitted to the parent department. Similarly, the upper-level consolidated cash flows may be transmitted to the child department.

According to the production control method by using the consolidated cash flow calculation conforming to the department constitution, the consolidated cash flow data of the upper-level and lower-level departments can be obtained and displayed. The user can accurately and visually recognize, in line with the time-series, the ratio of contributions of the individual departments, which belong to the target department, to the target department consolidated cash flow. For example, when the ratio of contributions of a certain child department is high for several periods ahead, but is lower after that, meticulous management such as sending an instruction for improving cash flows after the production period to the child department and the like is made possible. Moreover, the user can accurately recognize the ratio of contributions of the target department consolidated cash flow to the upper-level department consolidated cash flow. Thus, the user can objectively recognize an evaluation of the target department among the belonging departments.

(Calculation Example of Consolidated Cash Flow Conforming to Department Constitution)

A specific calculation example of the above-described consolidated cash flow conforming to the department constitution will be described.

Cash flows of the department A, which are calculated by the equations (32) to (35), are assumed to be CFiA (i=1, 2, 3, 4), respectively. Moreover, assuming that N of child departments belonging to the department are Kj (j=1, 2, ... N), when lower-level consolidated cash flows of the department A for CFIA are expressed as CFciA, the following equation is established.

$$CF_{cA}^{i}=CF_{A}^{i}+\Sigma_j CF_{cKj}^{i} \qquad (39)$$

Specifically, CFciA is obtained by adding the lower-level consolidated cash flows of all the child departments to the unconsolidated cash flow of the target department. The lower-level department CF data obtaining module 27 obtains the lower-level consolidated cash flows. The obtained CF data of each lower-level department may be retained as part of the cash flow data of the department data.

As shown by the equation (39), the lower-level consolidated cash flows are sequentially determined from the lower-level departments. Moreover, when there is no child department belonging to the target department, the lower-level consolidated cash flows are equal to the target department cash flows calculated by the equations (32) to (35). The calculated lower-level consolidated cash flow data is retained in the target department CF data storage unit 28 as part of the department data. Moreover, the target department cash flow data including the lower-level consolidated cash flows are transmitted to the upper-level department from the upper-level department CF data transmission module 26 and are transmitted to the lower-level department from the lower-level department CF data transmission module 29. Items of the transmitted data may be restricted according to the destinations of the transmissions.

Similarly, when the upper-level consolidated cash flows of all the parent departments are added to the unconsolidated cash flows of the target department, the upper-level consolidated cash flows can be obtained. The upper-level department CF data obtaining module 24 obtains the upper-level consolidated cash flows. The obtained respective upper-level department Cf data may be retained as part of the cash flow data of the department data. The upper-level consolidated cash flows are sequentially determined from the upper-level department. Moreover, there is no parent department to which the target department belongs, the upper-level consolidated cash flows are equal to the target department cash flows calculated by the equations (32) to (35). The calculated upper-level consolidated cash flow data is retained in the target department CF data storage unit 28 as part of the department data.

Other Embodiments

The present invention has been described according to the foregoing first to third embodiments. However, it should be understood that the description and drawings which partially constitute the present disclosure do not limit this invention. From this disclosure, various alternative embodiments, embodiments and operational technologies will become apparent to those skilled in the art.

For example, description was made wherein the production control system according to the embodiments of the present invention includes the product data storage unit 12, the resource table storage unit 14, the schedule table storage unit 15, the process master storage unit 17, the part data storage unit 19, the CF data storage unit 28, the order table storage unit 31, the schedule table storage unit 32, the resource master storage unit 33 and the program storage unit 34 independently of each other. However, a single retention unit may be used in place of parts of these retention units or all of those.

Moreover, in the embodiments of the present invention, description was made wherein the product data obtaining module 11, the consolidated contribution profit calculation module 22, the CF data calculation module 25 and the like are included in the single CPU 100. However, the above-described units may be separated into two or more CPUs. In the separation thereof, it is assumed that devices are connected to each other by use of a bus and the like so as to enable data to be exchanged by those units between the CPUs.

Various modifications will become possible for those skilled in the art after receiving the teachings of the present disclosure without departing from the scope thereof.

What is claimed is:

1. A production control system for producing products from parts, the production control system comprising:
    a product data obtaining module configured to obtain product data including a consolidated contribution profit from a parent product production location, which is a location producing parent products using the products as direct parts;
    a part data obtaining module configured to obtain part data including an upstream consolidated contribution profit from a part production location producing parts;
    a consolidated contribution profit calculation module configured to calculate an upstream consolidated contribution profit of a production department producing the products from the parts based on the upstream consolidated contribution profit, and calculate a consolidated contribution profit of the production department based on the consolidated contribution profit and the upstream consolidated contribution profit;
    a product data transmission module configured to transmit product data including the upstream consolidated contribution profit of the production department to the parent product production location; and,
    a part data transmission module configured to transmit part data including the consolidated contribution profit of the production department to the part production location.

2. A production control system for producing products from parts, the production control system comprising:
    means for obtaining product data including a consolidated contribution profit from a parent product production location, which is a location producing parent products using the products as direct parts;
    means for obtaining part data including an upstream consolidated contribution profit from a part production location producing parts;
    means for calculating an upstream consolidated contribution profit of a production department producing the products from the parts based on the upstream consolidated contribution profit, and calculating a consolidated contribution profit of the production department based on the consolidated contribution profit and the upstream consolidated contribution profit;
    means for transmitting product data including the upstream consolidated contribution profit of the production department to the parent product production location; and,
    means for transmitting part data including the consolidated contribution profit of the production department to the part production location.

3. A production control method for producing products from parts, the method comprising:
    obtaining product data including a consolidated contribution profit from a parent product production location, which is a location producing parent products using the products as direct parts;
    obtaining part data including an upstream consolidated contribution profit from a part production location producing parts;
    calculating an upstream consolidated contribution profit of a production department producing the products from the parts based on the upstream consolidated contribution profit;
    calculating a consolidated contribution profit of the production department based on the consolidated contribution profit and the upstream consolidated contribution profit;
    transmitting product data including the upstream consolidated contribution profit of the production department to the parent product production location; and,
    transmitting part data including the consolidated contribution profit of the production department to the part production location.

4. The production control method of claim 3, further comprising:
    calculating upstream consolidated contribution profit and consolidated contribution profit for each production period in consideration of a lead time taken to complete the products.

5. The production control method of claim 3, further comprising:
    calculating an upstream consolidated contribution profit and a consolidated contribution profit in the case of producing an effective surplus production quantity.

6. The production control method of claim 3, further comprising:
    calculating cash flows of the entire related organizations based on a cash flow of an upper-level organization of the production department and upstream consolidated contribution profit and consolidated contribution profit in the case of producing the effective surplus production quantity.

7. A production control computer program product to be executed by a computer for producing products from parts, comprising:
    instructions configured to obtain product data including a consolidated contribution profit from a parent product production location, which is a location producing parent products using the products as direct parts;
    instructions configured to obtain part data including an upstream consolidated contribution profit from a part production location producing parts;

instructions configured to calculate an upstream consolidated contribution profit of a production department producing the products from the parts based on the upstream consolidated contribution profit;

instructions configured to calculate a consolidated contribution profit of the production department based on the consolidated contribution profit and the upstream consolidated contribution profit;

instructions configured to transmit product data including the upstream consolidated contribution profit of the production department to the parent product production location; and, instructions configured to transmit part data including the consolidated contribution profit of the production department to the part production location.

* * * * *